(12) United States Patent
Chapiro et al.

(10) Patent No.: US 11,155,031 B2
(45) Date of Patent: Oct. 26, 2021

(54) 5-AXIS CONTINUOUS CARBON FIBER 3D PRINTING AND META-MATERIALS, PARTS, STRUCTURES, SYSTEMS, AND DESIGN METHODS THEREBY ENABLED

(71) Applicant: Mantis Composites Inc., San Luis Obispo, CA (US)

(72) Inventors: Michael R. Chapiro, Palo Alto, CA (US); Michael J. Delay, Tuscon, AZ (US); Ryan C. Dunn, Albuquerque, NM (US); David M. Zilar, Kennewick, WA (US)

(73) Assignee: MANTIS COMPOSITES INC., San Luis Obispo, CA (US)

( * ) Notice: Subject to any disclaimer, the term of this patent is extended or adjusted under 35 U.S.C. 154(b) by 0 days.

(21) Appl. No.: 16/370,446

(22) Filed: Mar. 29, 2019

(65) Prior Publication Data

US 2019/0299522 A1 Oct. 3, 2019

Related U.S. Application Data

(60) Provisional application No. 62/650,606, filed on Mar. 30, 2018, provisional application No. 62/722,811, filed on Aug. 24, 2018.

(51) Int. Cl.
*B29C 64/209* (2017.01)
*B29C 64/295* (2017.01)
*B33Y 30/00* (2015.01)
*B29K 307/04* (2006.01)

(52) U.S. Cl.
CPC .......... *B29C 64/209* (2017.08); *B29C 64/295* (2017.08); *B33Y 30/00* (2014.12); *B29K 2307/04* (2013.01)

(58) Field of Classification Search
CPC .................................................. B29C 64/209
See application file for complete search history.

(56) References Cited

U.S. PATENT DOCUMENTS

| 9,126,367 B1 | 9/2015 | Mark |
| 9,149,988 B2 | 10/2015 | Mark |
| 9,327,453 B2 | 5/2016 | Mark |
| 9,370,896 B2 | 6/2016 | Mark |
| 9,579,851 B2 | 2/2017 | Mark |
| 9,956,725 B2 | 5/2018 | Mark |
| 2004/0003738 A1 | 1/2004 | Imiolek |

(Continued)

FOREIGN PATENT DOCUMENTS

| CN | 105666876 | 6/2016 |
| CN | 106915075 | 7/2017 |
| KR | 1020150098340 | 8/2015 |

OTHER PUBLICATIONS https://www.thorlabs.com/newgrouppage9.cfm?objectgroup_id=6973&tabname=PTFE (retrieved Apr. 10, 2020) (Year: 2020).*

(Continued)

*Primary Examiner* — Timothy Kennedy
(74) *Attorney, Agent, or Firm* — Fitch, Even, Tabin & Flannery LLP

(57) ABSTRACT

A nozzle for depositing fiber-reinforced polymer having a radiative chamber comprising an outer structure of a nozzle end; a cooling chamber coupled to the outer structure; and a filament guide tube extending into the cooling chamber.

14 Claims, 58 Drawing Sheets

(56) References Cited

U.S. PATENT DOCUMENTS

| | | | | |
|---|---|---|---|---|
| 2009/0273122 A1* | 11/2009 | Batchelder | ........... | B29C 48/865 |
| | | | | 264/401 |
| 2013/0209602 A1 | 8/2013 | Nye | | |
| 2013/0241102 A1* | 9/2013 | Rodgers | ................. | B29C 48/05 |
| | | | | 264/132 |
| 2014/0117575 A1 | 5/2014 | Kemperle | | |
| 2014/0263534 A1* | 9/2014 | Post | ..................... | B29C 64/227 |
| | | | | 226/196.1 |
| 2014/0265034 A1 | 9/2014 | Dudley | | |
| 2014/0328963 A1 | 11/2014 | Mark | | |
| 2015/0165691 A1 | 6/2015 | Mark | | |
| 2015/0251360 A1 | 9/2015 | Steele | | |
| 2015/0273768 A1 | 10/2015 | Wyatt | | |
| 2015/0331412 A1* | 11/2015 | Adair | .................... | B29C 64/106 |
| | | | | 700/126 |
| 2015/0367375 A1 | 12/2015 | Page | | |
| 2015/0375457 A1 | 12/2015 | Mark | | |
| 2016/0031159 A1* | 2/2016 | Church | ................ | B29C 64/106 |
| | | | | 264/308 |
| 2016/0136885 A1* | 5/2016 | Nielsen-Cole | ........ | B29C 64/118 |
| | | | | 226/168 |
| 2016/0185042 A1* | 6/2016 | Toh | ...................... | B29C 64/209 |
| | | | | 425/132 |
| 2016/0193778 A1* | 7/2016 | Lee | ...................... | B29C 64/364 |
| | | | | 425/378.1 |
| 2016/0236408 A1* | 8/2016 | Wolf | .................... | B29C 64/209 |
| 2016/0271880 A1 | 9/2016 | Bheda | | |
| 2016/0297110 A1* | 10/2016 | Wu | ........................ | B33Y 30/00 |
| 2016/0361873 A1 | 12/2016 | Maier | | |
| 2017/0173879 A1 | 6/2017 | Myerberg | | |
| 2017/0190109 A1* | 7/2017 | Holland | ................ | B29C 64/393 |
| 2017/0210074 A1* | 7/2017 | Ueda | ...................... | B33Y 10/00 |
| 2018/0345572 A1 | 12/2018 | Mark | | |

OTHER PUBLICATIONS

Extended European Search Report from the European Patent Office for EP Application No. 17764158.6 dated Nov. 14, 2019.

USPTO; Final Office Action for U.S. Appl. No. 15/455,102 dated Nov. 27, 2019.

International Search Report and Written Opinion of the International Searching Authority for PCT/US2019/024989 dated Jul. 11, 2019.

USPTO; Non-Final Office Action for U.S. Appl. No. 15/455,102 dated May 15, 2019.

International Search Report and Written Opinion of the International Searching Authority for PCT/US2017/021693 dated May 19, 2017.

Chapiro; U.S. Appl. No. 15/455,102, filed Mar. 9, 2017.

USPTO; Advisory Action for U.S. Appl. No. 15/455,102 dated Feb. 11, 2020.

USPTO; Non-Final Office Action for U.S. Appl. No. 15/455,102 dated Apr. 2, 2020.

USPTO; Examiner Interview Summary issued in U.S. Appl. No. 15/455,102 dated Sep. 16, 2020.

USPTO; Notice of Allowance issued in U.S. Appl. No. 15/455,102 dated Sep. 30, 2020.

* cited by examiner

5-AXIS CONTINUOUS CARBON FIBER 3D PRINTING AND META-MATERIALS, PARTS, STRUCTURES, SYSTEMS, AND DESIGN METHODS THEREBY ENABLED

This application claims the benefit of U.S. Provisional Application No. 62/650,606, filed Mar. 30, 2018, for 5-AXIS CONTINUOUS CARBON FIBER 3D PRINTING AND META-MATERIALS, PARTS, STRUCTURES, SYSTEMS, AND DESIGN METHODS THEREBY ENABLED, and U.S. Provisional Application No. 62/722,811, filed Aug. 24, 2018, for NOZZLE DEXTERITY AND UNOBTRUSIVENESS TO ENABLE TRUE HIGH PERFORMANCE CARBON FIBER 3D PRINTING, both of which are incorporated in their entirety herein by reference.

This application is related to U.S. application Ser. No. 15/455,102, filed Mar. 9, 2017, for ADDITIVE MANUFACTURING OF COMPOSITE MATERIALS, which claims the benefit of U.S. Provisional Application No. 62/306,072, filed Mar. 10, 2016, for ADDITIVE MANUFACTURING OF COMPOSITE MATERIALS, both of which are incorporated in their entirety herein by reference.

BACKGROUND OF THE INVENTION

1. Field of the Invention

The present invention relates generally to additive manufacturing systems and methods, and related systems and methods.

2. Discussion of the Related Art

Engineering and design of physical devices (e.g., mechanical devices or parts) has for decades required (often in order to validate or research the performance of designs under real loads, or in real environments) a process of prototyping the devices using available materials. Sometimes these devices are assembled from smaller parts fastened, adhered, welded, or bonded together, and sometimes these devices were hewn from raw materials that are worked, molded, cast, cut or machined.

As advances in technology have progressed, so too have technologies used to prototype these designs become more numerous, and capable, and have allowed for the more rapid prototyping of such devices, and even for final production of designs requiring limited numbers of units. Where once small batches of handmade parts needed to be worked, molded, cast, cut or machined, often by hand, highly automated computer systems are now able to machine parts by milling parts from raw blocks of material in a rapid and efficient manner, allowing the design process to progress through many design iterations in order to produce parts that are tested, redesigned, and then new parts made based on the redesign. This process is repeated until designs are sufficiently optimized and finalized, for mass production.

Computer Numerical Control (CNC) milling machines are computer controlled vertical mills with the ability to move a spindle (relative to a workpiece) vertically along a Z-axis, and horizontally in an XY-plane in order to remove material in a programmed manner from a block or raw material. This extra degree of freedom permits their use in forming so-called 2.5-D surfaces such as relief sculptures. CNC and other such technologies, even those performed by hand, that remove material from a block of raw material are referred to as subtractive manufacturing techniques or machines.

Directed Energy Deposition (DED) covers a range of terminology: 'Laser engineered net shaping, directed light fabrication, direct metal deposition, three-dimensional laser cladding'. It is a more complex printing process commonly used to repair or add additional material to existing components (Gibson et al., 2010).

Directed Energy Deposition (DED) machines consist of a nozzle mounted on a multi-axis arm that deposits melted material onto a specified surface, where it solidifies. The process is similar in principle to material extrusion, but the nozzle can move in multiple directions and is not fixed to a specific axis. The material, which can be deposited from any angle using 5 axis machines, is melted upon deposition with a laser or electron beam. The process can be used with polymers or ceramics but is typically used with metals, in the form of either powder or wire.

Stereolithography (SLA or SL) is a form of 3-D printing technology used for creating models, prototypes, patterns, and production parts in a layer by layer fashion using photopolymerization, a process by which light causes chains of molecules to link together, forming polymers. These polymers then make up the body of a three-dimensional solid.

Stereolithography is an additive manufacturing process that works by focusing an ultraviolet (UV) laser on to a vat of photopolymer resin. With the help of computer aided design software (CAD), the UV laser is used to draw a pre-programmed design or shape on to the surface of a liquid photopolymer in a vat. Because photopolymers are photo-sensitive under ultraviolet light, the resin is solidified and forms a single layer of the desired three-dimensional object. This process is repeated for each layer of the design until the three-dimensional object is complete.

In some applications, an elevator platform descends a distance equal to the thickness of a single layer of the design into the photopolymer vat. Then, a resin-filled blade sweeps across a cross section of the layer, re-coating it with fresh material. The subsequent layer is traced, joining the previous layer. A complete three-dimensional object can be formed using this process.

More recently, 3-D printing technology has enabled designers to produce parts directly using materials deposited on stacked planes using a pen-like nozzle to extrude liquefied material in patterns. Three-dimensional printing, also known as additive manufacturing (AM), refers to processes used to synthesize a three-dimensional object in which successive layers of material are formed under computer control to create an object. Objects can be of almost any shape or geometry and are produced using digital model data from a three-dimensional model or another electronic data source such as an Additive Manufacturing File (AMF) file or an (STereoLithography) STL file.

One example of digital model data is G-code. G-code (also RS-274), which has many variants, is the common name for the most widely used numerical control (NC) programming language.

Before printing a three-dimensional model from an STL file, it must first be examined for errors. Most CAD applications produce errors in output STL files: holes, inverted or inconsistent face normals, self-intersections, noise shells or manifold errors. A step in the STL generation known as "repair" fixes such problems in the original model.

Once error checking is completed, the STL file needs to be processed by a piece of software called a "slicer," which converts the model into a series of thin layers and produces a G-code file containing instructions tailored to a specific type of three-dimensional printer. This G-code file can then be printed with three-dimensional printing client software (which loads the G-code, and uses it to instruct the three-dimensional printer during the three-dimensional printing process).

Traditional techniques like injection molding can be less expensive for manufacturing polymer products in high quantities, but additive manufacturing can be faster, more flexible and less expensive when producing relatively small quantities of parts. Three-dimensional printers give designers and concept development teams the ability to produce parts and concept models using a desktop size printer.

Some three-dimensional printing apparatuses and methods melt or soften the material to produce layers. In fused deposition modeling (FDM), the model or part is produced by extruding small beads or streams of material which harden immediately to form layers. A printer filament of thermoplastic, metal wire, or other material is fed into an extrusion nozzle head (three-dimensional printer extruder), which heats the material and turns the flow on and off. FDM is somewhat restricted in the variation of shapes that may be fabricated. Another technique fuses parts of the layer and then moves upward in the working area, adding another layer of granules and repeating the process until the piece has built up. This process uses the unfused media to support overhangs and thin walls in the part being produced, which reduces the need for temporary auxiliary supports for the piece.

SUMMARY OF THE INVENTION

Several embodiments of the invention advantageously address the needs above as well as other needs by providing a nozzle for depositing fiber-reinforced polymer comprising: a radiative chamber comprising an outer structure of a nozzle end; a cooling chamber coupled to the outer structure; and a filament guide tube extending into the cooling chamber.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
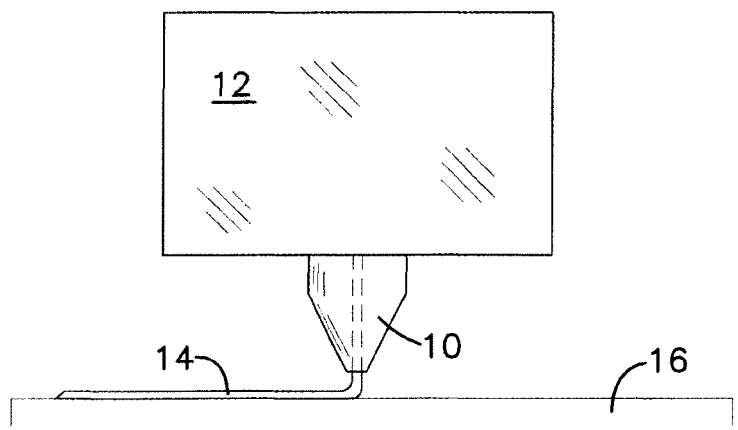
FIG. 1 is a side view of a nozzle assembly dispensing a printer filament in accordance with one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Additive Manufacturing of Composite Materials

Referring first to FIG. 1, shown is a side view of a nozzle in accordance with one embodiment of the present invention. Shown is the nozzle 10, a generalized container 12, a printer filament 14 and a surface 16.

Not shown are electronic components and mechanical components of the container 12. Also not shown are components of the nozzle 10 such as metallic fins. Not shown are motors that can be in the container 12 to assist in movement of materials within the container 12 and motors than can be coupled to the container 12 for movement of the container 12. Also not shown is a resistive heating element, and, in accordance with one variation, a plurality of sensors that may include thermocouples, luminance sensors, resistance change thermometers, and other sensors which may be used to determine the incident energy on a surface.

Figure 4:
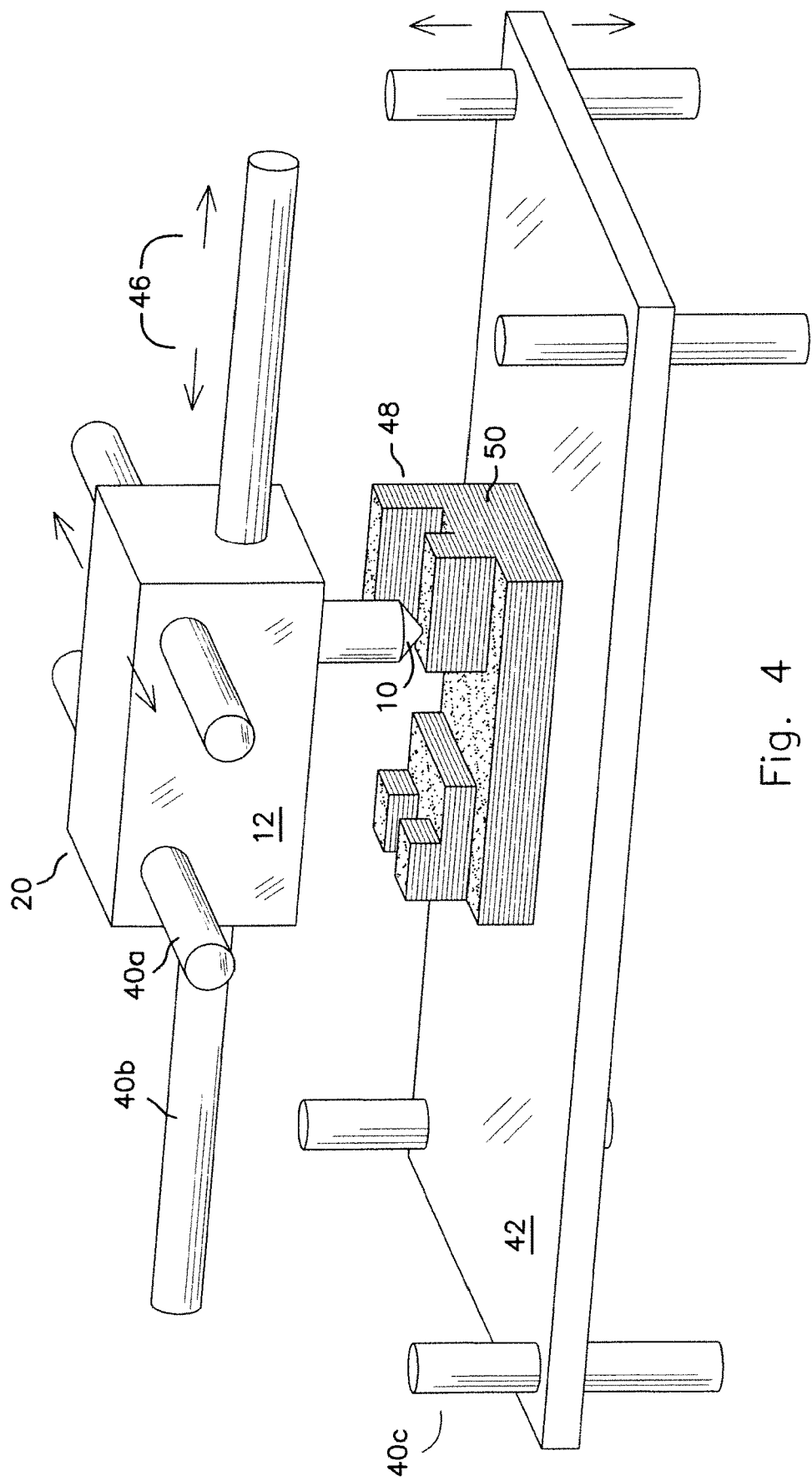
FIG. 4 is a perspective view of a 3D printing system in accordance with one embodiment of the present invention.
Figure 8:
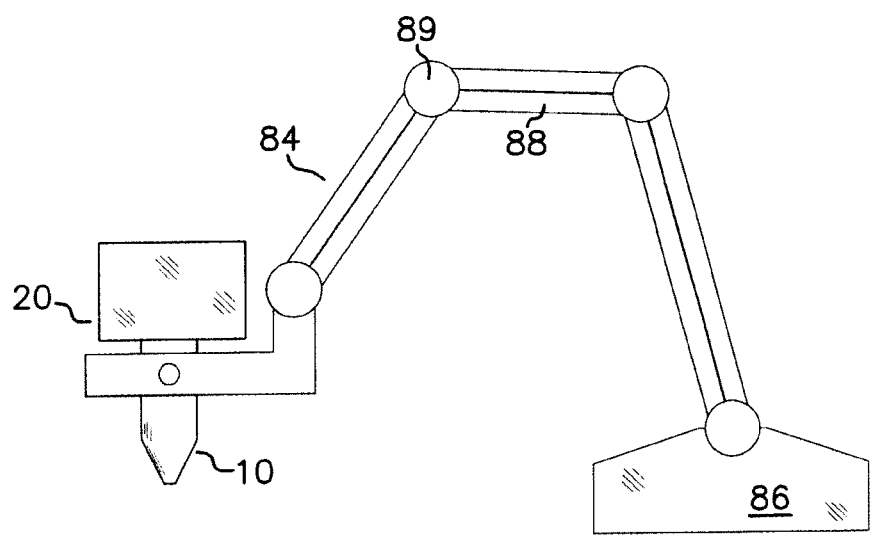
FIG. 8 is an elevational view of a robotic arm in accordance with one embodiment of the present invention.

The printer filament 14 is within the nozzle 10. The container 12 encloses and supports the nozzle 10. The container 12 can contain various elements such as a fan, gears, levers, and other mechanical systems. The nozzle 10 is coupled to and held in place by the container 12, permitting fluid material to flow from the container into the nozzle where the fluid material is formed into the printer filament. The fluid material can be, for example, at least in part thermoplastic. The container 12 is attached to a mechanical system (not shown) that can be comprised of, for example, rails 40a, 40b, 40c, such as is shown in FIG. 4. The container 12 can also or alternatively be connected to a robotic arm 84 such as is shown in FIG. 8. The printer filament 14 is positioned axially through the nozzle 10. The nozzle 10 is connected to an electronic control system (not shown). The heating element is a component of the nozzle 10. Cooling fans (not shown) are positioned on the outside of the nozzle 10, or, alternatively, nearby. Sensors, which may include thermocouples, luminance sensors, resistance change thermometers, and other sensors which may be used to determine the incident energy on a surface, can be positioned within the container 12.

In operation, the container 12, by connection to a movement system of rails 40a, 40b, 40c, or an arm 130, which moves the container 12, moves the nozzle 10, which is coupled to the container 12, along a computer-controlled path. The computer-controlled path can be mathematically derived by firmware given geometric instructions. The container 12 can contain a plurality of mechanical subsystems that enable the efficient feeding of the printer filament 14 into the top entrance 18 of the nozzle 10. Electronic systems control a resistive or combustion based heating element or a plurality of resistive or combustion based heating elements, which bring the nozzle 10 to a temperature at which the printer filament 14 material has the mechanical properties that are sufficient for extrusion, feeding, or chemical reaction among multiple filaments 14, as is necessary for the given application. The nozzle 10 can be metal or another thermally conductive material, or thermally insulating material, or a combination of metals, thermally conductive or insulating materials or any combination thereof. The mechanical systems feeding the printer filament 14 to the nozzle 10 allow a continuous and controlled feeding of the material from the nozzle 10. The nozzle 10, in heating the printer filament 14, allows the printer filament 14 to pass through a hole, which can be, in accordance with some variations, of narrower diameter than the unheated printer filament 14. The electronic system, in conjunction with the sensors, can control the temperature of the nozzle 10 through proportional-integral-derivative (PID) or other control to ensure consistent temperature. The electronic control system can also control the fan as a cooling system, if cooling is necessary.

Figure 2:
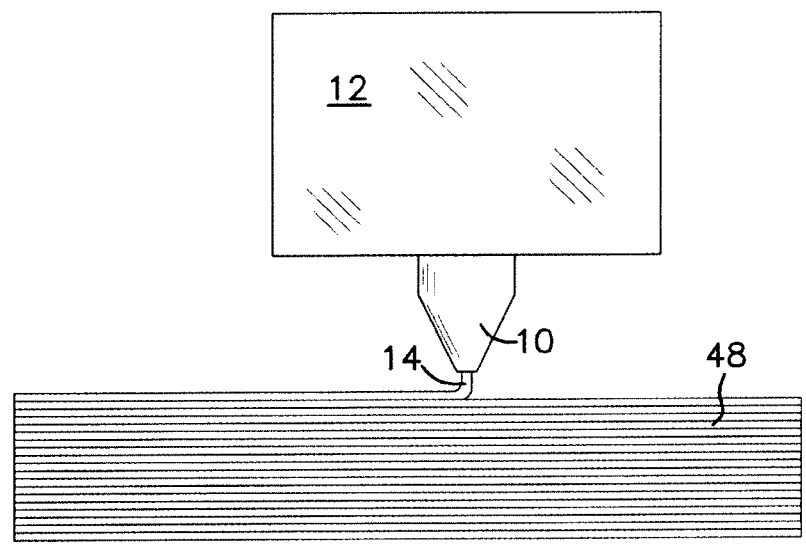
FIG. 2 is a side view of a nozzle assembly dispensing a printer filament in accordance with one embodiment of the present invention.

Referring to FIG. 2, a side view is shown of a nozzle 10 in accordance with one embodiment of the present invention. Shown is the container 12 and nozzle 10 as described in FIG. 1. Also shown is a simple part 48, and a small section of the printer filament 14.

The nozzle 10 is within the container 12, which together form a nozzle assembly 20. The simple part 48 is below the nozzle assembly 20. The small section or piece of the printer filament 14 extends from the nozzle 10 to the part 48.

The nozzle 10 is used to print the simple part 48, which, as shown in the present variation, is a block-shaped part. The relation between the nozzle 10 and container 12 is as described for FIG. 1.

The printer filament 14 is laid down along parallel planes 32 to construct the part 48 in three dimensions. The structure and use of these parallel planes 32 are elaborated upon in the description of FIG. 3.

Figure 3:
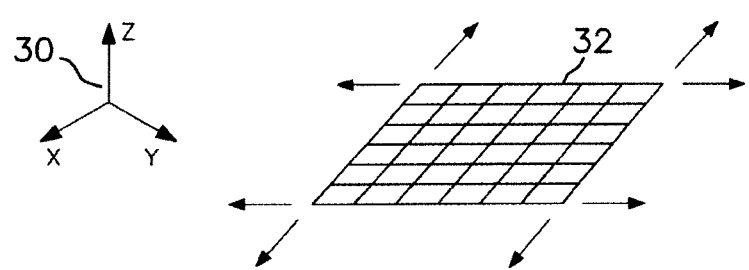
FIG. 3 is an isometric view of a system of coordinates and a plane.

Referring next to FIG. 3, a system of coordinates 30 is shown, such as Cartesian coordinates, and a plane 32.

The plane 32 is oriented parallel to an XY plane defined in the system of coordinates 30. (It should be noted that in general the label of an axis, or definition of a coordinate system, does not alter the system itself. Any consistent coordinate system used to describe or control some real system will be precisely the same as any other. Therefore, relabeling the axes of the system of coordinates, or using other systems of coordinates, other than Cartesian, including, but not limited to polar or spherical, is also contemplated within the scope of the present embodiment.)

The plane 32 defines the path along which the nozzle 10, such as of the variety shown in FIG. 1 and FIG. 2 move. The movement, for example, can include any combination of movements in the X and Y directions to form curves within the plane 32, but quasi-continuous movements do not extend to the Z direction. The Z-axis is considered only when switching into a new a XY plane of movement that is a standard delta (in the Z direction) from the prior position in space, typically chosen to be approximately equal to the thickness of the printer filament 14 used or the thickness of an extruded bead from the nozzle 10. Unless otherwise specified, the coordinates 30 also will be the definitive coordinates used when describing other parts, with the Z-axis being the vertical axis, and the X and Y axes 120 horizontal. The orientation of the figures will be such that reference to X, Y, or Z axes 120 for other figures can be understood with respect to this coordinate system, but alternate coordinate systems are also contemplated regardless of their equivalence to any other coordinate system such as this one.

Referring next to FIG. 4, the nozzle 10 and container 12 (together the nozzle assembly 20), as described in FIG. 1 and FIG. 2, are shown. Shown are a plurality of horizontal rails 40a, 40b, a flat plate 42, and a plurality of vertical rails 40c.

Shown are directional arrows 46, and a part 48 with layers 50. Not shown is a heating system 74 (FIG. 16B) and a plurality of electro-mechanical components 80 (FIG. 16A).

The vertical rails 40c are connected to the flat plate 42. The part 48 is directly on top of the plate 42. The nozzle container assembly 20 is above the part 48, and by extension, the flat plate 42 as well. The nozzle container assembly 20 is connected to the horizontal rails 40 that is shown in the horizontal axes 120, with the horizontal rails 40a, 40b going through the container 12. The arrows 46 are shown relationally to the flat plate 42. A heating system 74 is incorporated into the flat plate 42. The flat plate 42 and vertical rails 40c can connect to electro-mechanical components 80 or assemblies.

The vertical rails 40c are used to move the flat plate 42 in discrete steps enabling aspects of the description in FIG. 3. The flat plate 42 holds the part 48 and provides heating to prevent warping and residual stresses as the printer filament 14 cools and consolidates onto the part 48. Furthermore, the time for complete cooling might be such that the flat plate 42 is beneficial for the parts of the printer filament 14 and part 48 that are already consolidated. The vertical movement of the flat plate 42 along the horizontal rails 40a, 40b allows the nozzle container assembly 20 to stay in a single plane without moving in the Z-axis. Movement in this XY plane occurs by the use of the horizontal rails 40a, 40b in conjunction with electro-mechanical system that may be controlled by a control system.

The movement occurs in conjunction to the extrusion described in FIG. 1 and FIG. 2 to facilitate printing a planar layer of material. After the discrete downward movement of the flat plate 42, which holds the part 48, along the Z-axis, the nozzle container assembly 20 may be moved along some other path in the XY plane, such that the printer filament 14 forms a layer on top of a prior layer. By induction, this process, if properly determined with full constraints and set to execute by a computation system that controls the electro-mechanical systems herein, the part 48 in three-dimensions will be formed without the need for smooth movement along the third axis, which in this case is the Z-axis. The part 48 shown is one which is constructed of well-connected layers 50, but the astute reader will notice that any two parallel layers 50 in which the shape of one layer has a hole or cutout of the full planar space available that differs from an adjacent layer by an amount greater than the thickness of the printer filament 14 will not be well-supported. There exists an arbitrarily large number of plane structures by which this method fails and the attempt to lay printer filament 14 along the plane results in the printer filament 14 falling since the printer filament 14 has no surface to which to adhere and counter gravitational force acting on it.

Figure 5:
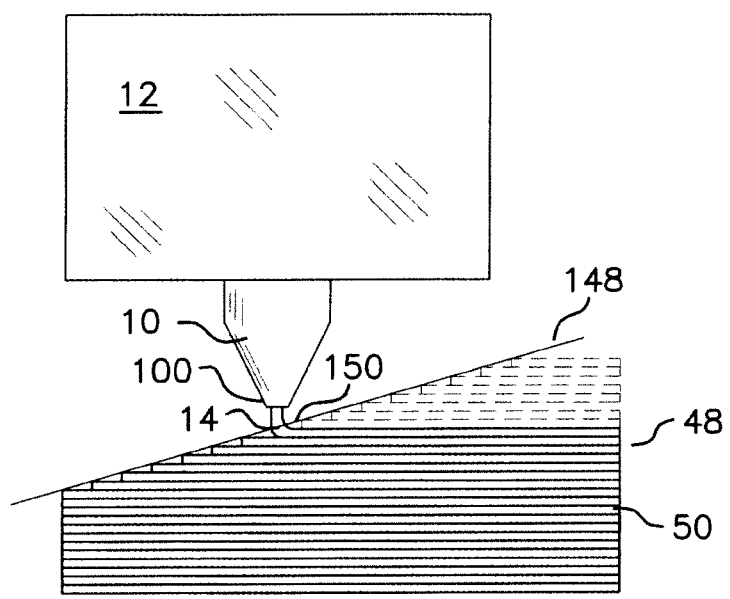
FIG. 5 is a side view of a nozzle assembly dispensing a printer filament in accordance with one embodiment of the present invention.

Referring next to FIG. 5, a side view is shown of a nozzle container assembly 20 of the type described in FIG. 2 and FIG. 1. Shown are parallel layers 50 of a part 48 of various lengths.

The layers 50 are adhered to each other and the tip 100 of the nozzle 10 connects to the end of the last component of printer filament 14 at a highest point 150.

The nozzle container assembly 20 prints the parts as described in FIG. 4. The layers 50 are made to be increasingly shorter to form a slant in the part 48, which creates a surface 148 outside of the XY plane. This is a demonstration of how one might produce more complex parts with a more complex surface 149 using the methods described in FIG. 4.

Figure 6:
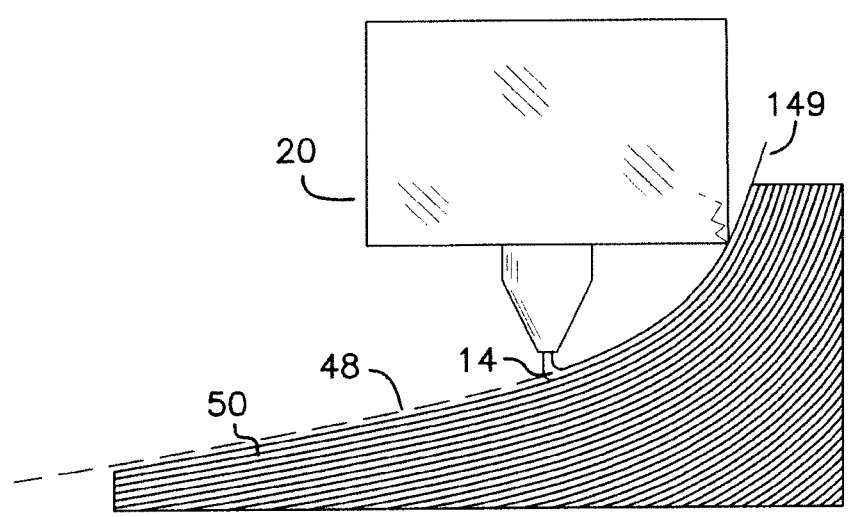
FIG. 6 is a side view of a nozzle container assembly dispensing a printer filament in accordance with one embodiment of the present invention.

Referring next to FIG. 6, a side view is shown of a nozzle container assembly 20. Shown is a part 48, and a piece of printer filament 14.

The nozzle container assembly 20 is connected to the part 48 via the printer filament 14 as the printer filament is extruded, and is therefore connected to the part 48. The edge of the container 12 of the nozzle container assembly 20 is shown touching the surface 149 of the part 48, and therefore unable to move unabated through the XY plane.

The nozzle container assembly 20 has printed the part 48 shown and is continuing to add layers 50 to this part 48, with movements that facilitate greater complexity as described in FIG. 5. However, because the container 12 of the nozzle container assembly 20 should not touch the part 48 and thereby possibly damage the part 48, the complexity of the part 48 is limited by a nozzle 10 being rotationally fixed relative to the XY-plane. In such an arrangement, the slope of a surface being printed on is limited by the size (width) of the nozzle container assembly 20, which must come into contact with the part 48 at some sufficiently large slope. Furthermore, since the printer filament 14 is shown as outside the XY plane this piece of printer filament 14 could only have been laid down by the system described in FIG. 4 if somehow a continuous Z-movement or rotational movement relative to the XY-plane in conjunction with XY movements is enabled. This shows that even continuous Z-movement, while potentially beneficial, still has seemingly simple parts that cannot be printed with filaments aligned arbitrarily. Of course, the part 48 shown could be printed with solely parallel layers 50 of printer filament 14 without running into the problem of the container 12 impinging on the part 48, as the nozzle 10 would stay normal to the printed layers. However, this approach severely limits the strength characteristics of the part 48, which, depending on its application may require printer filament 14 orientations outside of the XY plane, such as is shown. As used above, the term "strength characteristics" is used as a catchall to describe beneficial properties, which can include many other such mechanical properties, such as vibrational damping, interesting strain behavior such as more geometrically complex versions of extension-twist coupling, stiffness, or toughness, as well as non-mechanical properties, such as thermal expansion, or reactive metal infiltratability, all of which are related to printer filament 14 orientations within a part 48.

Figure 7:
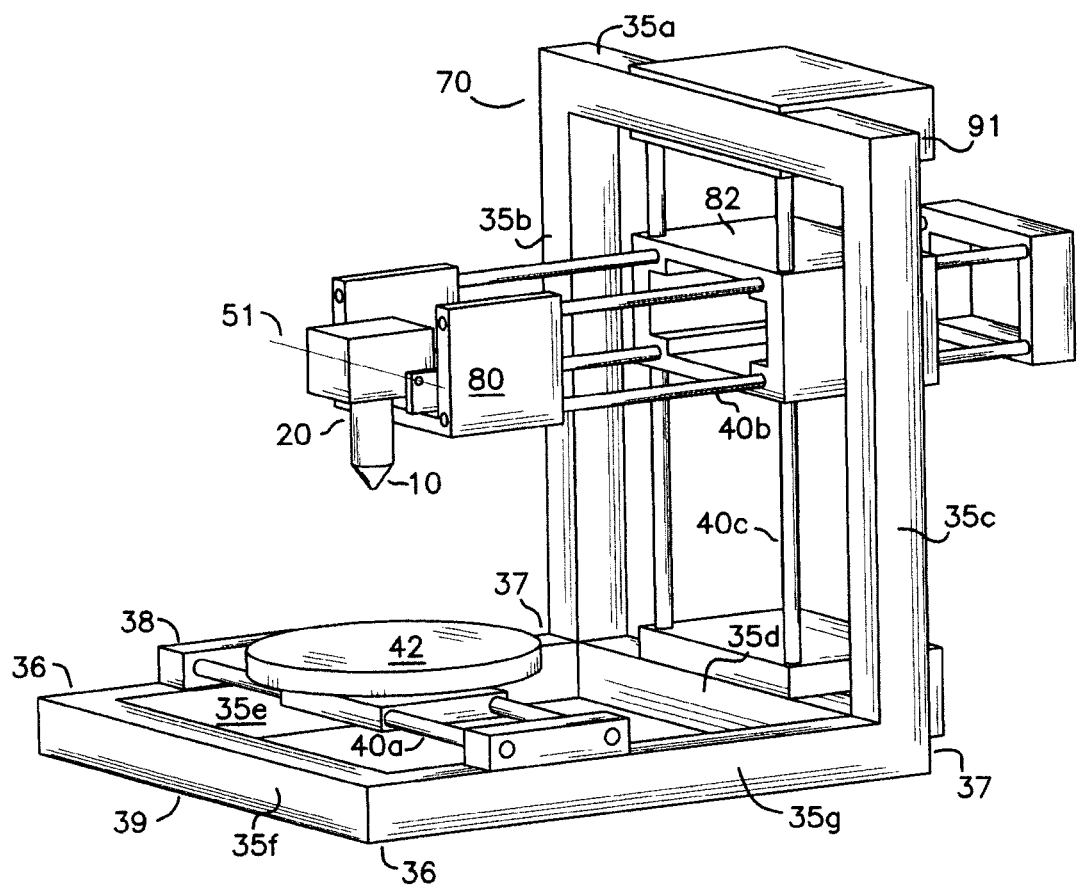
FIG. 7 is a perspective view is shown of a 3D printing system in accordance with one embodiment of the present invention.

Referring next to FIG. 7, a perspective view is shown of a system in accordance with one embodiment of the present invention including a plurality of bars 70, a plurality of connectors 38, and a plurality of fasteners (not shown). Also shown are a plurality of rails 40a, 40b, 40c, a build plate 42, a plurality of enclosures (not shown), a nozzle 10, and a plurality of electro-mechanical assemblies 80 that can independently move along linear axes and rotate the build plate 42. Further shown is a cross brace 82, which is shown with several of the plurality of rails 40b, 40c going through it. Now shown are various other electromechanical pieces and componentry elaborated upon herein.

A first rectangular set of four of the plurality of bars 35d, 35e, 35f, 35g is rigidly fastened together at ends 36, 37, at ninety degrees (90°) relative to one another to form a rectangular structure. The rectangular structure makes up a planar base 39 of the system, which may have various dimensions, depending on application and design choices. One of the four bars 35d that make up the plurality of bars 70 that comprise the planar base 39 is attached rigidly to two parallel upright bars 35b, 35c of the plurality of bars that extend in a perpendicular direction from the planar base 39. These two parallel upright bars 35b, 35c are terminated by a perpendicular crossbar 35a at their other end 91, such that the two parallel upright bars 35b, 35c are fastened in their parallel configuration. Attached to the planar base 39 is a plurality of parallel rails 40c, placed parallel to the upright bars 35b, 35c. Attached to the parallel rails 40a is an electro-mechanical sub-assembly 39, which supports the build plate 42 and allows for both rotation of the build plate 42 and motion along the parallel rails 40a. Attached to and running parallel to the upright bars 35b, 35c is a plurality of parallel rails 40c. The parallel rails 40c support and allow for the linear motion of an electro-mechanical sub-assembly 82 (which also serves as a cross brace) which in turn supports and allows for the linear motion of an arm 80. The arm 80 is an electro-mechanical sub-assembly that moves in a direction parallel to the planar base 39 and perpendicular to bar 35d. The electro-mechanical sub-assembly 80 includes the nozzle 10, electro-mechanical components necessary to drive filament through the nozzle 10, and electro-mechanical components that allow the nozzle 10 to also rotate around an axis 51.

Shown is an embodiment of a 5-axis printer in accordance with one variation of a multi-axial manufacturing device 151. The three sets of rails 40a, 40b, 40c enable movement of the nozzle 10 in the X, Y, and Z directions, while the build plate 42 and nozzle 10 both rotate in axes 120 referred to herein as A and B, respectively. This set of axes is sufficient for the nozzle 10 to reach a point in space above and around the build. This machine is controlled by a custom language similar to G-code that defines coordinates and feed rates for the movement of the nozzle 10, while the electro-mechanical sub-systems facilitate these movements. Therefore, in operation, the 5-axis printer is able to feed the printer filament 14 along any arbitrary curve in 3-dimensional space, rather than being limited to planar layers 50. This allows many more design possibilities with the generation of novel structures.

Using the custom language for the 5-axis printer, slicing software is able to consider any planes since the 5-axis printer can feed a printer filament 14 from any angle.

In operation, the type of nozzle 10 on the machine determines the structure of the printer filament 14 and several possible printer filament 14 structures are described, including those that benefit from the 5 axes of this machine. This rail structure, in accordance with some embodiments, can achieve accelerations exceeding 750 mm/s$^2$, which is very fast compared to robotic arms 84 capable of greater than 3 axis movement. This system also has the benefit of lower costs and increased reliability compared to many typical robotic arms 84 due partially to the high rigidity of this system. This rigidity comes in part from the utilization of linear axes rather than radial axes, as well as from the utilization of rotational axes on both the part and the additive manufacturing head, i.e., the nozzle 10. Other embodiments have different shaped build plates as well as other variations that can be seen as instances of the embodiment disclosed.

Referring next to FIG. 8, shown is a robotic arm 84 with a base 86, a plurality of rods 88 and joints 89 and a nozzle assembly 20.

The rods 88 and joints 89 connect to form a robotic arm 84 that includes a mechanically grounded base 86 at one end. The other end of the arm 84 holds the nozzle assembly 20, composed primarily of a heated nozzle 10 and an extrusion motor (not shown), which may alternately be mounted externally. A plurality of electrical and mechanical components may be included in the nozzle assembly 20, including but not limited to radial joints, and stepper, piezoelectric, or BLDC motors with shaft encoders.

In operation, this robotic arm 84 is another embodiment of the machine described in FIG. 7. Since the number of axes on a robotic arm 84 can be greater than 5, the present embodiment is beneficial for the additive manufacturing techniques described herein. A robotic arm 84 system is beneficial in that it can be easier to implement using one of the many robotic arms known in the art for various purposes other than additive manufacturing and could be retrofitted for additive manufacturing rather than being designed from the ground up. Some auxiliary systems, which in accordance with some variations, consists of a computer using purpose-built or modified software to interface the arm to g-code or other machining command language instruction sets, in addition to various control electronics, motors, mechanical assemblies and software to control the elements of the machine which are not normally incorporated into the arm assembly are used in operation to control the movement of the arm 84 and the feeding of the printer filament 14 material.

Figure 9:
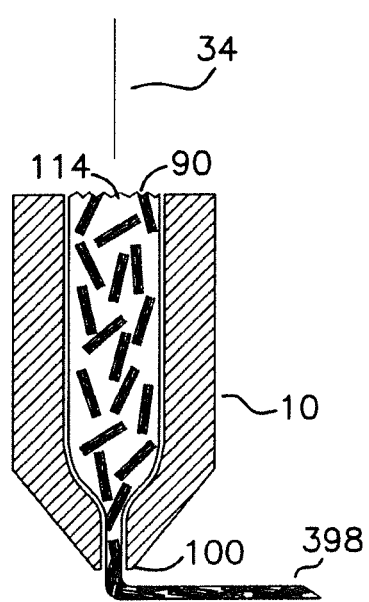
FIG. 9 is a cross-sectional view of an end of a nozzle and a reinforced printer filament in accordance with one embodiment of the present invention.

Referring next to FIG. 9, a cross-sectional view is shown which includes the tip 100 of the nozzle 10, a reinforced printer filament 398. Also shown are short reinforcements 90, and a polymer matrix 114. Not shown is a heating mechanism 92.

The reinforced printer filament 398 is a reinforced filament that comprises an additional material in a polymer matrix 114. The polymer matrix 114 is the material that is not the reinforcement and in accordance with one variation of the present embodiment is a polymer. Reinforcement comprises additional material 90 that may be discontinuous fiber filaments or other structurally reinforcing material. Reinforced fiber filament variations of the printer filament 14 are depicted as such with short line segments representing fibers. However, the reinforcement can also be a short reinforcement material comprising flakes or material of a more complex morphology. Short reinforcements that are not structural are also contemplated. For instance, carbon black could be added to increase electrical conductivity. A wide variety of materials exist that can be added to a polymer in a printer filament 14 which may act as reinforcement, as selected based on each application of the present embodiment.

A printer filament that is reinforced 398 is similar to a printer filament that is consolidated 112 in that both printer filaments are in a final form that can be the direct input into additive manufacturing machines in accordance with the embodiments described herein. Many methods are described for consolidated printer filaments 112 as well as reinforced printer filaments 398, and the use of all those methods with the style of those two printer filament not mentioned (when only one is mentioned) is also contemplated. Furthermore, the concept of a reinforced printer filament 398 and consolidated printer filament 112 are described as if only two materials comprise the printer filament 14. However, hybrids of these printer filaments or various compositions of printer filaments that have more than two constituent materials are also contemplated.

The printer filament 398 passes through the downstream end of the nozzle 10 at a constriction 100. Part of the printer filament 398 is shown downstream of the end 100 of the nozzle 10 and been laid on a surface 16 after being extruded through the end of the nozzle 10 via the constriction 100. The short reinforcements 90 are contained within the printer filament 398. The heating mechanism 92 is contained within the nozzle 10.

In operation, the printer filament 398 is passed through the constriction 100 in the nozzle 10 and laid onto the surface 16, with the nozzle 10 moved by a computer controlled machine (not shown). The short reinforcements 90 are dispersed uniformly in the printer filament 398.

In accordance with one embodiment, the reinforced printer filament 398 comprises fiber filaments 90 in a thermoplastic polymer. Fiber filaments 90 are the individual filaments in a fiber tow 388 or roving. A fiber 388 tow is a bundle of filaments 90 and is a common form for fiber filaments. Fiber tows 388 can contain a wide range of numbers of filaments ranging from hundreds to tens of thousands. Fiber filaments 90 can be any material, for example, carbon fibers, Kevlar fibers, extended chain polyethylene fibers, glass fibers, carbon nanofibers, diamond nanothreads, carbon nanotubes, or combinations of any of these. Thin coatings on these or other printer filaments that would improve adhesion or other forms of bonding between layers to improve interlaminar shear strength or other properties, as would be feasible with a coating that can be thermoplastic compatible, containing nano-reinforcements such as carbon nanotubes is also contemplated.

Such a reinforced printer filament 398 can be heated to an appropriate temperature to allow the deformation or flow of the reinforced printer filament 398 through the constriction 100. This deformation and flow of the printer filament 398 through the constriction 100 aligns the short reinforcements 90 with one another and parallel to the flow of the printer filament 398 (reinforcement axis 34) through the constriction 100, which previously might not have a high degree of alignment along the reinforcement axis 34.

If the short reinforcements 90 are spherical such as that from a powder where a primary axis along the length of each piece of short reinforcement material does not exist, then the aforementioned concept of alignment is no longer relevant. Alignment of short reinforcements has the benefit of increasing the mechanical properties along the primary reinforcement axis since the short reinforcements provide most of their mechanical properties such as increased strength and stiffness along their axis. This beneficially allows a higher degree of optimization since the part 48 application and associated loading will be known. Therefore, less material may be used in meeting the design constraints, saving weight in the final part 48 and time in its manufacture. This increase in anisotropy also has the benefit of making the properties more predictable so optimization can occur at all since the existing models for composite parts often assume unidirectional lamina. This high degree of alignment can provide a near-unidirectional structure to allow a better understood representative volume 180 element in structural optimization or generative design.

Figure 10:
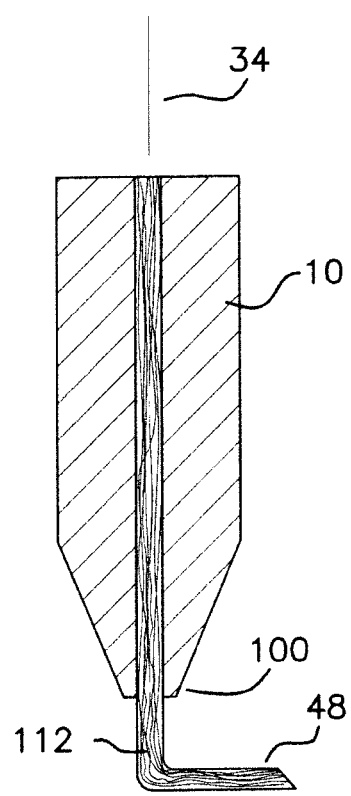
FIG. 10 is a cross-sectional view of an end of a nozzle and a consolidated printer filament in accordance with one embodiment of the present invention.
Figure 11:
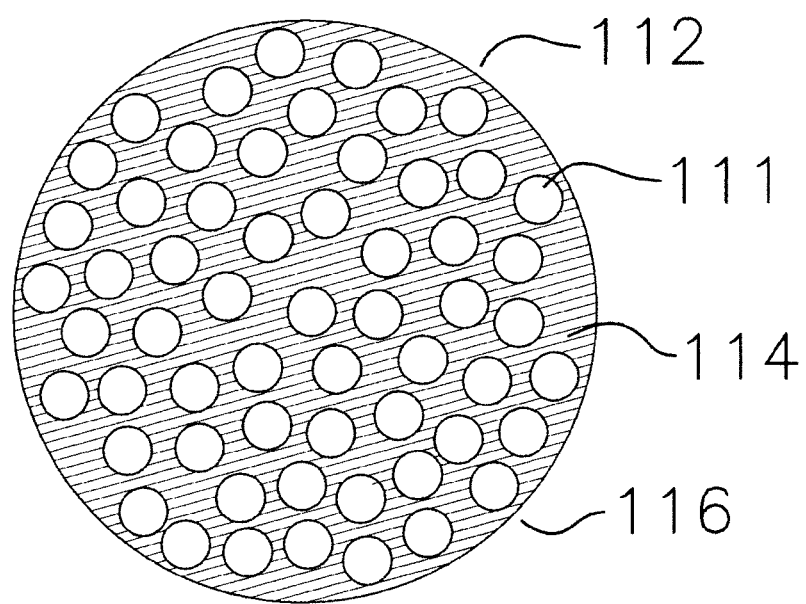
FIG. 11 is a cross sectional view of a consolidated printer filament in accordance with one embodiment of the present invention.

Referring next to FIG. 10, shown is a cross-sectional view of an end (or constriction 100) of the nozzle 10 and the consolidated printer filament 112. The term consolidated printer filament 112 used herein to refer to a printer filament that is suitable for the additive manufacturing machines of the present embodiment. More specifically, consolidated printer filament 112 means a printer filament 14 that comprises a matrix 114 reinforced by fiber filaments 111 that are continuous along the length of a segment of the printer filament 14. Consolidated in this context means that a cross-section comprises the matrix and fiber filaments, ideally having no gaps, as shown in FIG. 11. Further elaboration can be found in reference to FIG. 32, which illustrates the morphology of a consolidated printer filament 112. Shown are fiber tows 388. A heating element 92 exists, but is not shown.

The printer filament 112 is aligned with the center of the nozzle 10 with a segment of the printer filament 112 extending from the nozzle 10, part 48 of which segment is laid perpendicular to the nozzle's 10 center axis 34. The printer filament 112 moves in a direction substantially parallel to the center axis 34 as it passes through the nozzle 14. The printer filament is substantially coaxial with the center axis 34 as it moves through the nozzle 10. The fiber filaments are distributed throughout the printer filament 112, preferably uniformly. As shown in accordance with the present embodiment, the printer filament 14 is a consolidated printer filament.

A non-reinforcement component of the consolidated printer filament 112, or the matrix 114, contains the fiber filaments 111 in such a way that, preferably, the fiber filaments 111 are not in contact with one and another (that is, there is matrix materials between adjacent fiber filaments) and spacing between the fiber filaments 111 is minimized, thereby maximizing the density of the fiber filaments 111 within the matrix 114.

With close-packing of the fiber filaments 111, fiber filaments 111 can fill about 90% of a volume of the printer filament 112. However, the volume of reinforcement material in the consolidated printer filament 112 is typically less than 90% of volume. Percent volume and percent weight of the fiber filaments 111 within the printer filament 112 are used interchangeably herein as is common when discussing composites. However, this is technically slightly incorrect since density in semi-crystalline thermoplastic polymers varies as a function of percent crystallinity (crystalline phase is denser). Nevertheless, this minute variation is insufficient to detract from conveying the relevant ideas. In case the structure of the consolidated printer filament 112 is still unclear, a cross-section view is provided in FIG. 14.

In operation, the printer filament 112 is passed through the nozzle 10 with a similar mechanism as described in reference to FIG. 9, however there is no constriction 100 in the present embodiment. Therefore, the conductive heating mechanism 92 may be difficult to implement and other heating mechanisms may be preferred. Some such alternate heating mechanisms include radiative heating with laser, microwave infrared, or other radiant energy, or convective heating by application of a heated gas. Inductive heating can also be used if there is a conductive fiber filament or if the overall printer filament 112 is conductive. Any combination of these heating methods could be used as well. The consolidated printer filament 112 is fed from the nozzle 10, typically with controlled movement. The present embodiment can be used as a component in an additive manufacturing system.

Figure 10A:
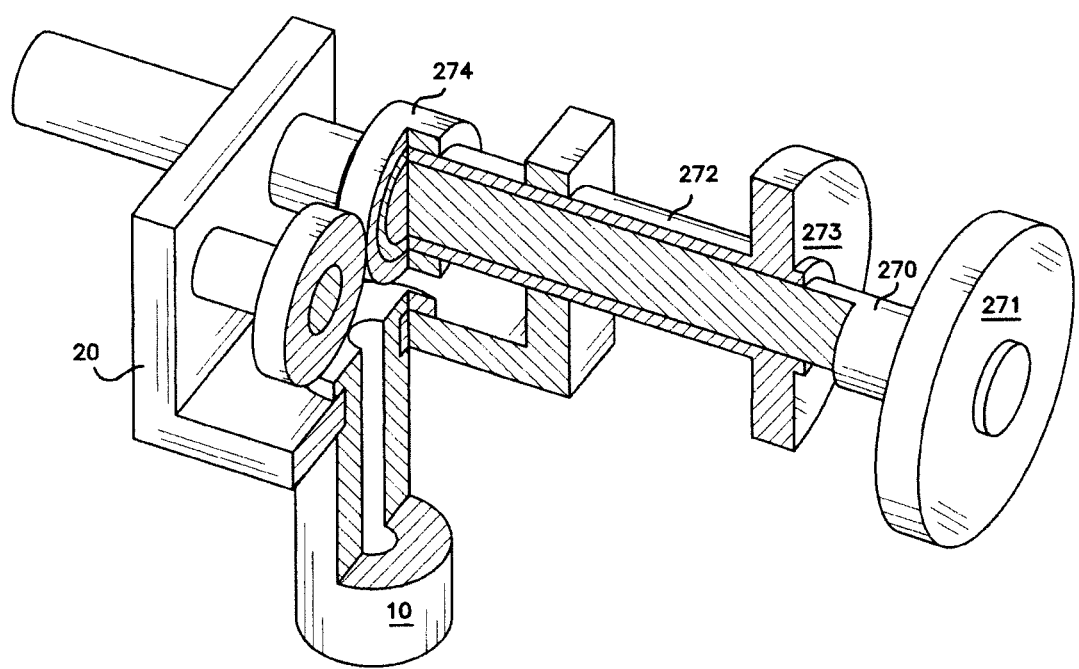
FIG. 10a is a perspective view of a nozzle rotational assembly showing independent shafts for filament feeding and nozzle 10 rotation.

Referring next to FIG. 10A, a perspective view is shown of a nozzle rotational assembly showing independent shafts for filament feeding and nozzle 10 rotation.

Shown is a main shaft 270 and a secondary shaft 272, with respective input wheels 271, 273; two drive wheels 274; shown is a nozzle 10 and nozzle housing 20.

The secondary shaft surrounds a portion of the main shaft. Each shaft has an input wheel on one end. Both shafts pass through one wall of the nozzle housing, and only the main shaft extends through the opposite wall of the nozzle housing. One drive wheel is on the end of the secondary shaft within the nozzle housing, and the other drive wheel is next to this one such that they contact at a point if one were to consider these wheels infinitely thin, or at a line if they have thickness and a constant diameter throughout, which might not always be the case. There is also a small gap between the two drive wheels, which can have a zero, positive, or even negative size with an interference fit of an elastic material. The drive wheels are within the nozzle housing. The nozzle extends downward from the base of the nozzle housing where it is mounted.

This system discloses how to decouple an additional axis in the three-dimensional printing system, where the additional axis comprises rotation of the nozzle about an axis perpendicular to the central axis of the nozzle, from the feeding mechanism for the printer filament. This enables the nozzle to rotate without yanking the filament from the part in a way that would ruin the print and possibly damage the nozzle. Furthermore, it enables rotation of the nozzle along with precise filament feeding that does not allow excessive slack in the post drive section of the printer filament, and this prevents buckling and subsequent jamming of the printer filament.

The input wheels 271, 273 allow the shafts to be independently rotated. Rotation of the main shaft rotates the entire nozzle housing since it is fixed at the nozzle housing wall opposite the input wheel. The secondary shaft can rotate freely with respect to both the nozzle housing and the main shaft. This enables a rotation of the secondary shaft input wheel 273 to rotate the secondary shaft along with one of the drive wheels 274. The rotation of the drive wheel 274 that is connected to the secondary shaft causes the other drive wheel 274 to rotate in the other direction. The two drive wheels 274 can effectively drive a printer filament from a spool into the nozzle 10. The feeding rate can be modulated in conjunction with the movements of the nozzle tip during printing, which enables a particular tension to exist in the printer filament.

Figure 10B:
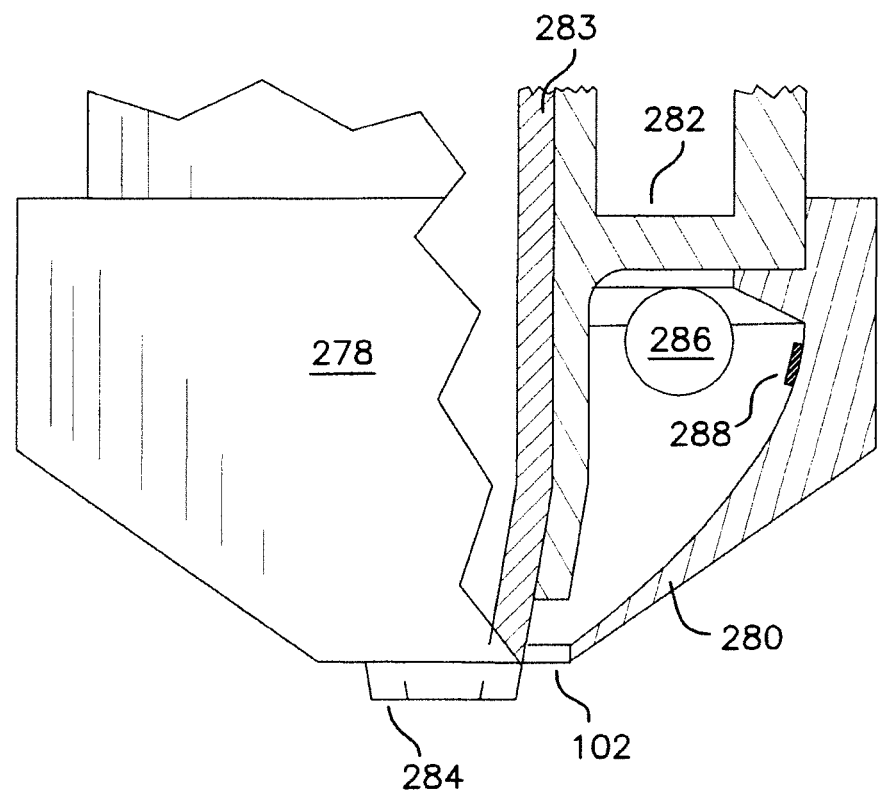
FIG. 10B is a cross-sectional view is shown of a nozzle radiative chamber and associated energy sources in accordance with one embodiment of the present invention.

Referring next to FIG. 10B, a cross-section view is shown of a nozzle radiative chamber 278 and associated energy sources 286. Shown is the nozzle end 102; the flanges 280 of the radiative chamber of the nozzle end 102; the end 282 of the cooling chamber of the nozzle shaft; the end of a filament guide tube 284; a circle 286, representing a radiant heating source; and a radiation sensor 288.

The radiative chamber flanges 280 comprise the outer structure of the nozzle end 102. The end of the cooling chamber 282, which comprises the main nozzle shaft, extends downwards into the radiative chamber 278 along the outside of the filament guide tube 283. The filament guide tube 283 passes through the radiative chamber 278 and protrudes below the flanges 280 of the chamber 278. The radiation sensor 288 is positioned facing inward in the radiative chamber 278, attached to the inner flange wall, or in an optically equivalent or proportional location.

The radiation source 286 emits radiant energy, or it may represent an opening in the radiative chamber 278 into which radiant energy is directed. Methods of obtaining suitable radiative energy includes lasers or heating filaments, or other materials such that they radiate as a black body radiator. Heating filaments such as tungsten could be used while embedded in a ceramic. Heating elements in lightbulbs such as halogens or other lights would also be effective. A radiant source external to the radiative chamber is beneficial since it enables the diameter of the nozzle end to be greatly reduced, which enables a narrower nozzle for greater geometric mobility in multiple axes.

Except for the filament guide tube 283, it is beneficial that the surfaces of the interior of the radiative chamber are highly reflective across whatever frequencies are being used. The filament guide tube 283 is made of a radiatively transparent material to enable the radiation to hit the printer filament, which the carbon fiber effectively absorbs and transfers to the matrix material, allowing it to flow and bond to the build plate or previous layers of the part. The extension of cooling chamber along the filament guide tube 283 enables this radiative absorption to be concentrated and take place near or after the end of the filament guide tube 283. Efficient reflection of radiation enables the radiative chamber to minimize heat absorption, which in conjunction with active cooling, ensures the heat does not rise.

The filament guide tube 283 is shown to contract near the end 284, which when operated with a continuous fiber reinforced printer filament 112 will have a final exit diameter equal or nearly equal to that of the input printer filament. This has the benefit that the filament 14 can easily pass through the filament guide tube 283 prior to the heating zone 278 with minimal resistance. It is beneficial that the filament guide tube 283, in addition to being transparent to radiation, be refractive. This enables the filament guide tube 283 to operate as the tip of the nozzle during a printing operations. It is also beneficial if the tube has poor thermal conductivity to limit upward heat flow since the tube contacts the heated section of the printer filament near the tip. Any non-radiative heat transfer method would likely have to be conductive and therefore by unable to limit upward heat flow as much as the various designs that embody these disclosures.

It is beneficial to precisely control the amount of heat transferred into the filament 14 as it passes through. Excessive heat damages or even burns the thermoplastic, and insufficient heat results in poor bonding. Thermistors on an outer surface do not correspond directly to heat input into the filament, and due to variation of resistivity of resistive radiation heating elements (if that is the type of heating element), and the fact that temperature 4th power of the temperature of the radiative source is related to the output power in the 4th order, controlling heating output by varying current and voltage without additional feedback cannot achieve the same precision as a radiation sensor. With other radiative heating elements, a radiation sensor 288 is also extremely precise. This precise feedback control loop enables the functionality of the overall nozzle 10 during printing. This is because the radiation (in part) hits the filament 14 just as it exits the nozzle 10, and passing through an opening means that the radiative efficiency will vary based on how 'closed' this exit is. Therefore, the sensor 288 enables measurement of the precise amount of radiant flux that is delivered into the filament. This enables superior interlayer adhesion since the filament can be made to reach the maximal melt temperature that does not cause damage without a risk of burning the filament.

Figure 10C:
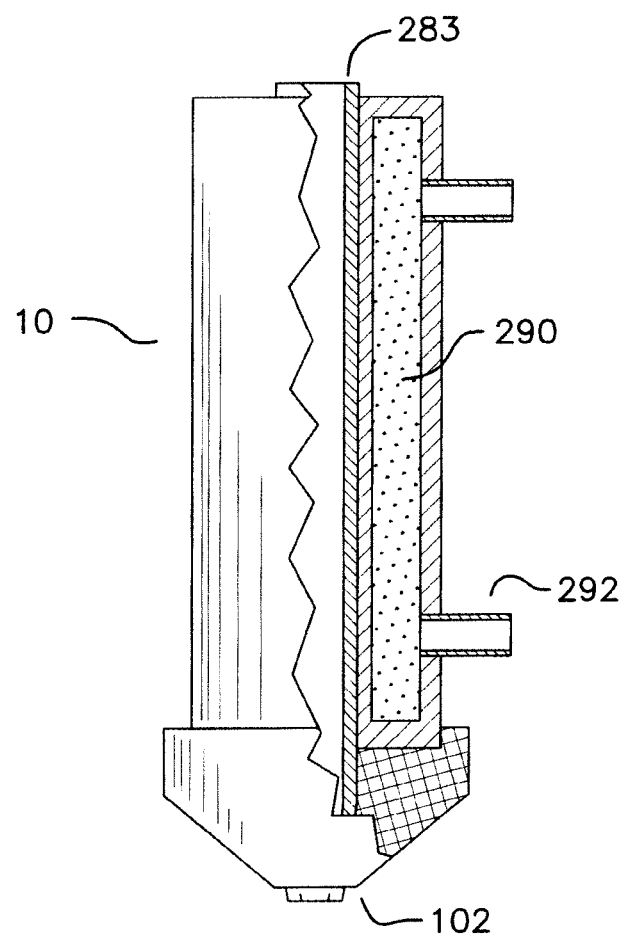
FIG. 10C is a cross-sectional view of a liquid cooling chamber within the nozzle in accordance with one embodiment of the present invention.

Referring next to FIG. 10C, shown is a cross-sectional view showing a liquid cooling chamber 290 (cooling mechanism) within the nozzle 10.

Shown is the nozzle 10; a cooling chamber 290; the nozzle end 102; two inlets 292; and a filament guide tube 283.

The nozzle 10 comprises an assembly of the other pieces shown. The two inlets 292 connect to the cooling chamber 290. The nozzle end 102 is attached below the cooling chamber 290, and the filament guide tube 283 goes through the cooling chamber 290 and the nozzle end 102.

In operation, the cooling chamber 290 is filled with a cooling fluid such as water, which enters through one inlet 292 and exits the other. It is beneficial if a pump is used to cause an active flow of the cooling fluid. This system is beneficial in enabling the three-dimensional printing of a composite filament 14 without the need for a melt-pool. Obviating the need of a melt-pool enables higher fiber to matrix ratios to be used since the filament can be wet-out in prior printer filament processing steps to ensure that there are not excessive voids or fiber clumping within the printer filament. This cooling system enables the portion of the printer filament in the filament guide tube above the printer end to remain at a lower temperature, which prevents buckling, and enables active feeding of the filament with some amount of force rather than operating purely in tension. This active feeding mechanism is disclosed in FIG. 10A.

By preventing excessive upward heat flow from the nozzle end, this active cooling system has the benefit of enabling a higher aspect ratio nozzle to be implemented. It is particularly beneficial to have a nozzle with a high aspect ratio when three-dimensional printing with 5 axes since it expands the angular motion that the nozzle can undergo without running into the part or build plate. This cooling system is particularly beneficial when using continuous carbon fibers since this greatly decreases the thermal resistivity along the length of the printer filament. Finally, the cooling system, by ensuring that heating of the printer filament occurs primarily at the nozzle end, minimizes any possible thermal damage to the thermoplastic matrix material.

Referring next to FIG. 11, a cross sectional view is shown of a printer filament 14 that is a consolidated printer filament 112. A larger circle 116 represents the cross section of the printer filament 112, and small circles 111 within the larger circle represent fiber filaments 90. Parallel cross-hatching 114 within the larger circle 116, the bit outside the smaller circles (i.e., in the volume between the fiber filaments) represent the polymer matrix 114.

The circles 111 show a near uniform distribution of the fiber filament across the cross-sectional volume of the printer filament 112. Furthermore, the polymer matrix 114 fills all gaps between the fiber filaments.

This is the same consolidated printer filament 112 of FIG. 10, shown is a cross-sectional view. In accordance with the present embodiment, having a sheath (not shown) of the polymer matrix surround a bundle of the fiber filaments as a core shell structure, with the polymer as the shell and the fiber filaments as the core, is not desirable and results in very poor properties.

If the polymer matrix 114 surrounds the fiber filament 111 in a bundle that forms the fiber tow only as an outer layer with little penetration, loads cannot be effectively transferred to or between the strong and stiff individual fiber filaments. Furthermore, uncoated individual fiber filaments in the core are not protected from damage due to fiber filaments abrading against one another since fiber filaments are fragile without the protection of the polymer matrix. Failure to have all fiber filaments coated can lead to premature part failure and low durability. Having the polymer within the gaps between strands of the fiber filaments 90, and not just enveloping the bundle of fiber filaments means that one obtains the full benefits of reinforcement of the fiber filaments rather than a marginal improvement over neat polymer properties. This structure is particularly beneficial for functional parts that are subject to repeated stress or are in failure critical applications since having the polymer distributed within these gaps is necessary for adequate fatigue resistance. It is also beneficial in preventing damage from impacts.

Figure 12:
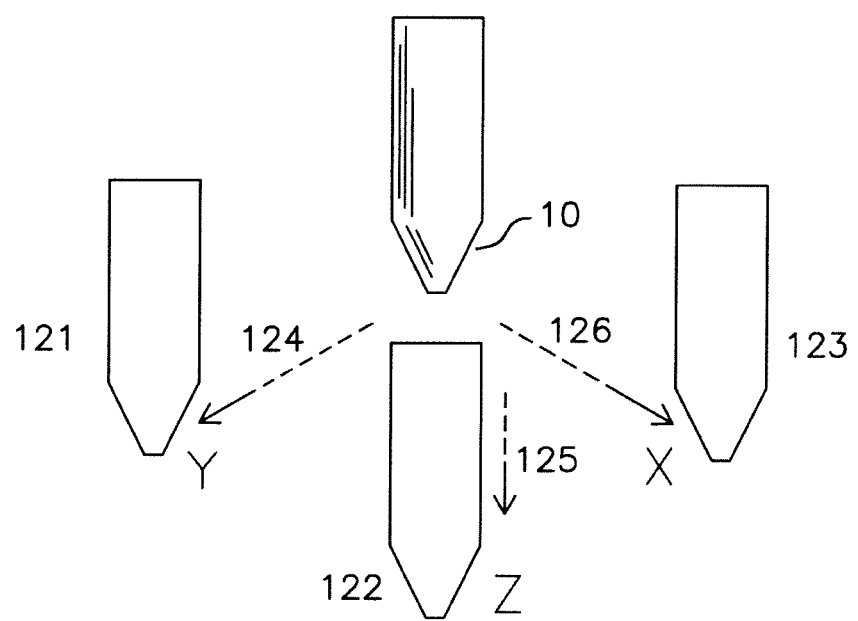
FIG. 12 is a schematic view of a nozzle with a Cartesian set of coordinate axes in accordance with one embodiment of the present invention.

Referring next to FIG. 12, a schematic view is shown of a nozzle 10 with a Cartesian set of coordinate axes 120.

The nozzle 10 is shown pointing in a direction of the XY plane and superimposed in three additional locations 121, 122, 123 as indicated by arrows and dashed lines 124, 125, 126.

In operation, the nozzle 10 is moved in three dimensions, as measured along the 3-axes 120, as can be performed in an additive manufacturing machine of the present embodiment.

Figure 13:
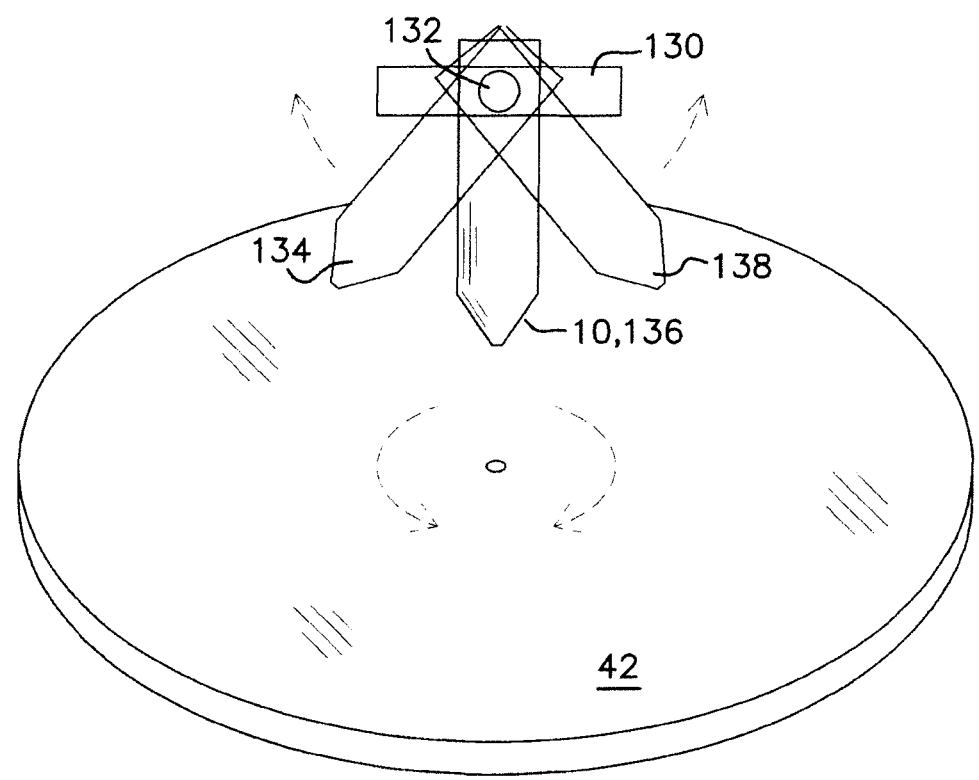
FIG. 13 is a schematic view of an arm, a joint, a round build plate, and the nozzle assembly in accordance with one embodiment of the present invention.

Referring next to FIG. 13, a schematic view is shown of an arm 130, a joint 132, and the nozzle assembly 20. A round build plate 42 is also shown.

The nozzle 10 is shown rotating through three angles 134, 136, 138, partially indicated by dashed lines 134, 138.

The nozzle 10 is part of a nozzle assembly 20, and attached to the arm 130 with a connection at the joint 132. Arrows are used to indicate rotation of the nozzle 10. Other arrows on the build plate 42 show rotation of the build plate 42 around a center point.

In operation, this demonstrates how two axes 120 in addition to the three Cartesian axes shown in FIG. 12 are implemented in accordance with the present invention. The rotation of the nozzle 10 and build plate 42 is controlled in conjunction with the movement illustrated in FIG. 12 to enable full five axis movement of the nozzle 10. The benefits of these additional two axes 120 is described in reference to the embodiments of FIG. 7 and FIG. 8. The benefits generally relate to the augmented engineering capabilities from not only being able to have a nozzle 10 take an arbitrary path, but to do so with an arbitrary set of angles along that path, which is a critical step necessary to form complex conformal layers 50 that tend to exist in optimized parts.

Figure 14:
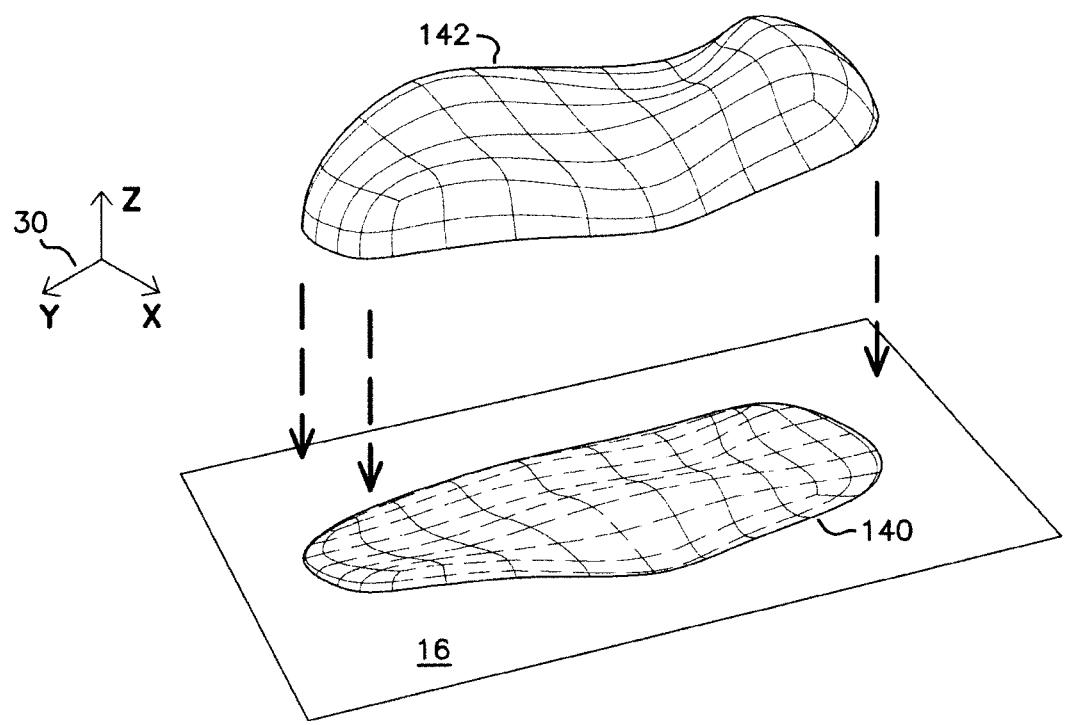
FIG. 14 is a perspective three-dimensional view of a surface in accordance with one embodiment of the present invention.

Referring next to FIG. 14, a perspective three-dimensional view of a surface is shown. A set of Cartesian coordinates 30, the surface 142, a flat surface 16, and a projection 140 is shown.

The surface 142 exists within the coordinate space and the projection 140 is that of the surface 142 onto the XY plane surface 16.

In the additive manufacturing process, surfaces such as these may occur which can only be formed by traditional 3-axis printers by following contour lines. Lines that follow arbitrary paths can however be formed with a 5-axis printer of the present embodiment.

The additional axes described in FIG. 13 allow filaments to conform to arbitrary surfaces instead of the single flat surface 16 of the XY plane to which 3-axis printers are limited.

Figure 15:
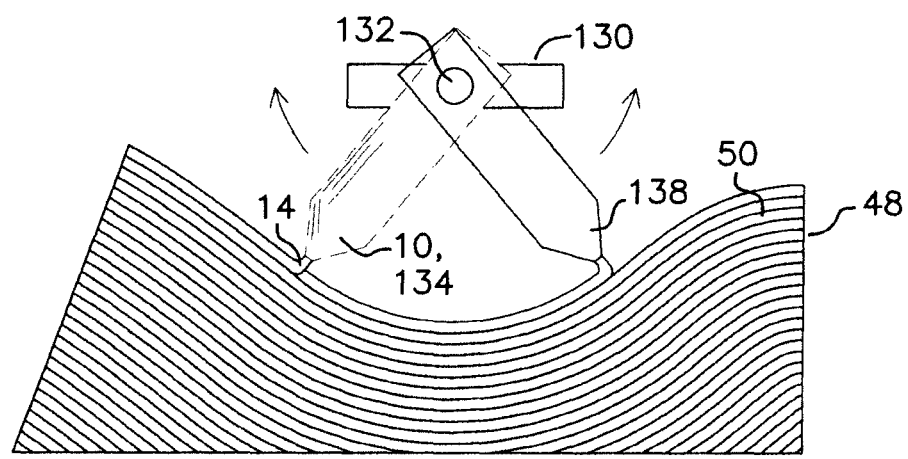
FIG. 15 is a side view of a nozzle assembly dispensing a printer filament shown at two points in time in accordance with one embodiment of the present invention.

Referring to FIG. 15, a nozzle assembly 20 is shown with the nozzle assembly 20 shown at two points 134, 138 in time. Shown is the rotation joint 132 of a device 130 that holds the nozzle 10. A 2-dimensional slice of a set of conformal printer filament 14 layers 50 is also shown.

The device 130 that holds nozzles 10 holds the nozzle assembly 20. The two points in time shown with an arrow illustrating movement of the nozzle 10. The printer filament 14 layers 50 form a part 48.

In operation, the nozzle 10 is able to form conformal layers 50 because of the two additional axes of movement as between stacked 2-dimensional movements to 5-dimensional movements. These conformal layers 50, being anisotropic, especially if they comprise a reinforced printer filament 14 or a consolidated printer filament 14, result in a part 48 whose properties differ from those of a part 48 filling the same volume printed from stacked 2-dimensional layers 50. Being able to vary the properties in this way is beneficial in improving the performance of the final parts that an additive manufacturing machine, of which this system can be a component, of can produce. This figure highlights some of the benefits of one of the additional axes 120 that can be included in addition to X, Y, and Z. Another benefit is that even if a similar surface could be produced solely with X, Y, and a more sophisticated Z axis, this additional axis 120 allows more complexity in the form of smaller feature details. FIG. 6 shows how even a relatively wide shape might not be able to be produced with conformal layers 50 since the nozzle assembly 20 would hit the part 48. Nozzle 10 rotation in conjunction with software that considers the shape of the part 48 and the space taken up by the nozzle 10 allows various parts that would be unprintable using additive manufacturing systems without this feature.

Figure 16:
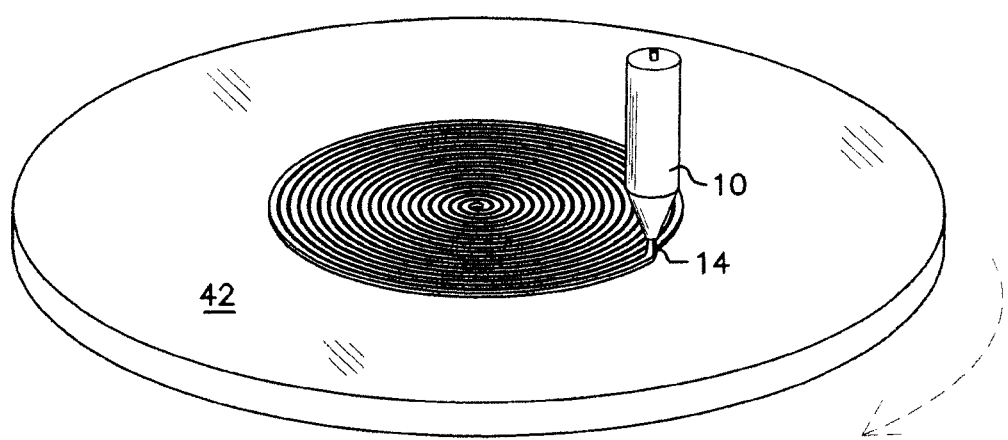
FIG. 16 is a perspective view of a nozzle assembly, a build plate, and a printer filament in accordance with one embodiment of the present invention.
Figure 16A:
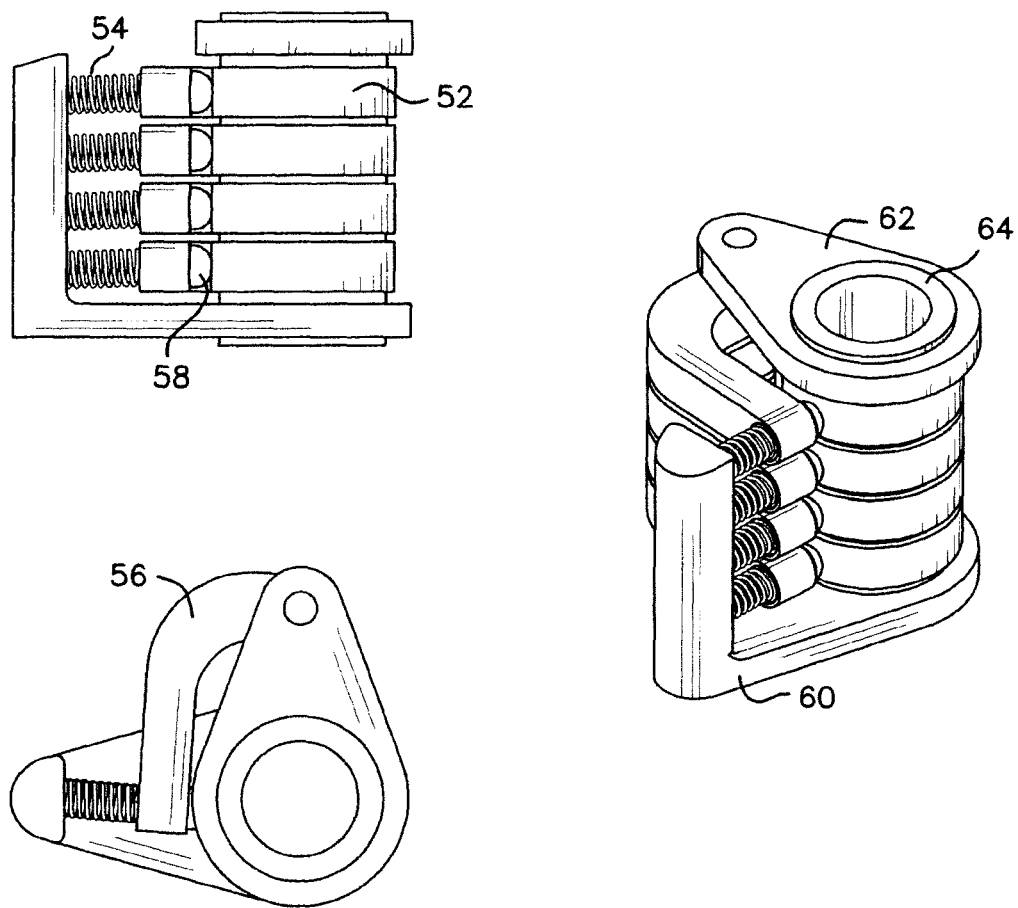
FIG. 16A is a side, perspective, and top view of an interface between spring-loaded contact and slip rings in accordance with one embodiment of the present invention.

Referring to FIG. 16, a perspective view is shown of a nozzle assembly 20, a build plate 42, and a printer filament 14.

The printer filament 14 is in a coil shape on top of the build plate 42, and the nozzle 10 positioned above the end 150 of the printer filament 14.

In operation, a typical additive manufacturing machine is able to create 2-dimensional layers 50 by 2-dimensional movement of the nozzle 10, where this movement can be considered with respect to anything stationary, which would include the build plate 42. However, if the build plate 42 rotates, either the X or Y axis in conjunction with this rotation can form any 2-dimensional layer. However, rotation and linear movement, when reduced to practice might be able to execute the same path in different amounts of time. With the rotation, X, and Y axis all simultaneously in operation, the fastest possible relative movements between a point on the built plate and the nozzle tip 100 may be achieved for any fixed level of print quality that one needs to achieve. Complex movements with many changes in direction tend to slow down the print rate and as more complex shapes are produced with a 5-axis machine, it is beneficial to enable the fastest possible movement so that parts can be manufactured in the shortest possible time. There may also be benefits in complexity of paths that are feasible with combined movements.

Furthermore, when one considers the Z axes 120 movement, which is the first axis to be mentioned within this description, it becomes apparent that the build plate 42 rotation enables print paths along arbitrary curves in a 3-dimensional space that would otherwise be highly impractical or impossible. This might be particularly beneficial if the part 48 is to be produced with layers 50 of printer filament 14 that wrap around the part 48. Other figures such as FIG. 18, FIG. 19, and FIG. 20 that illustrate the fiber orientation at a smaller scale show the great benefits of being able to print along these complex rotational paths due to the large degree of printer filament 14 anisotropy, which particularly relevant when the printer filament 14 is a reinforced printer filament or a consolidated printer filament. When the term orientation is referred to herein in regards to printer filaments that are reinforced printer filaments it refers to the printer filaments orientation, which is specified to distinguish it from orientation of short reinforcements within a reinforced printer filament. Inner-printer-filament orientation distributions are often approximately radially symmetric and thus can still be modeled by defining the on-axis and off-axis properties of that reinforced printer filament.

Referring next to FIG. 16A, is a perspective view showing an interface between spring-loaded contact and slip rings. Shown are a plurality of slip rings 52, a plurality of springs 54, a plurality of rocker arms 56, and a plurality of electrical contacts 58; shown is a housing 60 and a housing cap 62; shown is a central shaft 64.

The central shaft is positioned on the housing and is covered by the housing cap. The slip rings are axially aligned with the central shaft and are stacked and spaced along the central shaft within the housing and housing cap. The electrical contacts are each adjacent to one of the slip rings. The springs are attached to the upward rising arm of the housing on one side, and on the other connect to the end of the rocker arms that connects to the electrical contacts. The other end of the rocker arms is held on a pin 66 in between the housing and housing cap.

In operation, this interface allows the transfer of energy to a continuously rotating build plate. Each spring and rocker enables continuous contact of the electrical contacts with the slip rings to allow uninterrupted electrical energy transfer. This enables the central shaft to continuously rotate, which enables multiple useful printing operations such as winding.

Figure 16B:
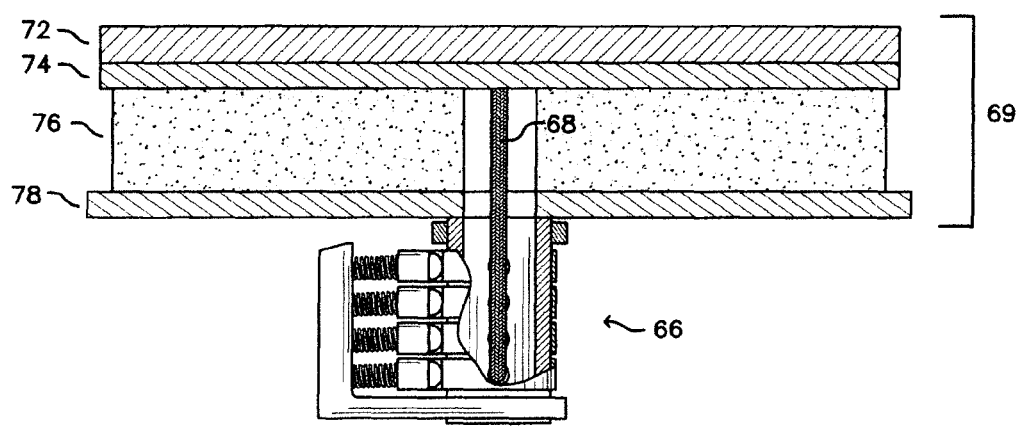
FIG. 16B is a cross-sectional view of a build plate assembly in accordance with one embodiment of the present invention.

Referring next to FIG. 16B, a cross-sectional view is shown of a build plate assembly 69 showing material composition of each layer, the slip ring assembly of FIG. 16A; a plurality of cables 68; a build plate 69; a top layer of the build plate 72, a heating layer 74, a thick insulating layer 76, and a final insulating layer 78.

The slip ring assembly 69 is positioned below the build plate 69. The build plate 69 is attached to the slip ring assembly 66 by being fixed to the main shaft 64 of the slip ring assembly 66 that is disclosed in FIG. 16A. The final insulating layer 78 is positioned on the bottom of the build plate 69. Directly above that is the thick insulating layer 76. Above the thick insulating layer is the heating layer 74, and above that is the top layer of the build plate 72.

In operation, this system enables effective heating of the build plate in conjunction with continuous rotation. The multiple insulation layers and thickness of the thick insulating layer enable higher surface temperatures on the build plate surface 72, which is beneficial for three-dimensional printing materials with high temperature thermoplastics such as polysulfones, polyimides, or polyaryletherketones. The top layer 72 can be a metal or metal alloy such as aluminum or steel. On top of the top layer, a coating can be applied to improve build plate adhesion during printing. This coating is typically a thermoset polyimide adhesive backed sheet, or an adhesive or melted on sheet of the same thermoplastic that is being printed or one that is thermally bondable to the material being printed. Other materials are also contemplated for the top layer of the build plate. Ceramics (e.g. graphite), ceramic metals (e.g. tungsten carbide or silicon carbide), or metalloids (e.g. silicon), or a combination of different materials to form a multi-layer 'top layer'. The use of these materials are beneficial in ensuring effective and rapid heat transfer, thermal stability, non-warping, and possibly even adhesion without the aforementioned additional coating, and such a system would beneficial allow rapid swapping of a thin plate that comprises the top plate of the top layer as might be implemented in an automated, arbitrarily large parallel manufacturing facility.

The heating layer 74 can be any number of heating elements such as nichrome wire, an induction heater, a resistive plate heater, an open flame heater, a digitally controlled frame, infrared radiation or microwaves. The thick insulating layer 76 can be an air gap, but it is beneficial to fill this space to reduce or eliminate convective cooling of the heating layer. Suitable materials include mineral wool, asbestos, foamed silica, fiberglass, or Nomex. These materials are beneficial since they have low density, which enables rapid acceleration of the build plate. The final insulating layer can be made of concrete fiberglass composite with refractory high temperature sides, and unlike the thick layer, it is beneficial for this layer to have greater rigidity. The slip ring assembly allows the heated layered to be powered though wires 68 passing through the build plate 69 through the main shaft 64.

Figure 17:
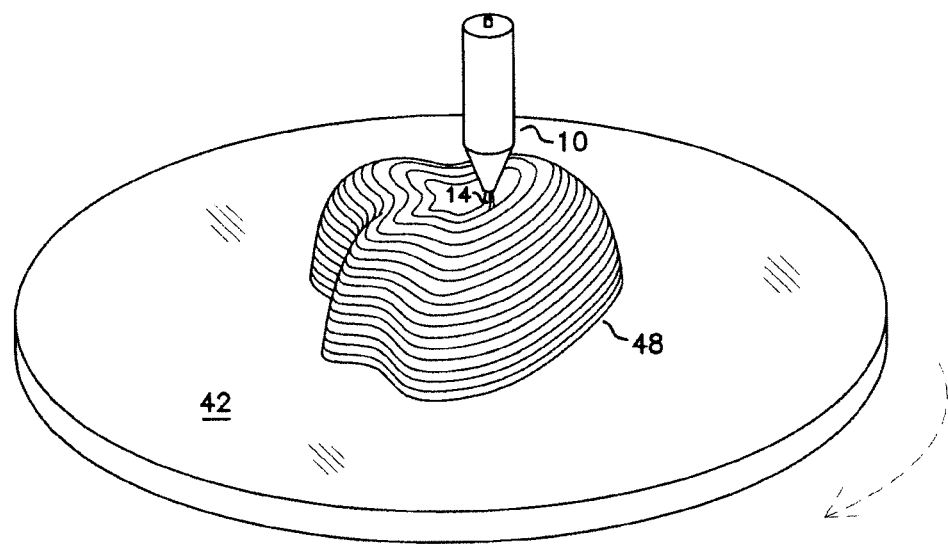
FIG. 17 is a perspective view of a nozzle assembly, build plate, printer filament, and printer-filament-comprised subpart in accordance with one embodiment of the present invention.

Referring next to FIG. 17, a perspective view is shown of a nozzle assembly 20, build plate 42, printer filament 14, and printer-filament-comprised sub-part 48.

The perspective view is looking down at the build plate 42 with the printer filament 14 comprised sub-part 48 shown with contour lines. The printer filament 14 is connected to the base of the part 48 at an edge that connects to the build plate 42 on one end, and the other end is going into the nozzle 10.

This figure is similar to that which was described in FIG. 16, but it shows another example of how the rotation of the build plate 42 might be combined with movement in X, Y, and Z. Of course, there exist parts in which these four 120 plus the rotation of the nozzle 10 from FIG. 15 would be implemented.

Figure 18:
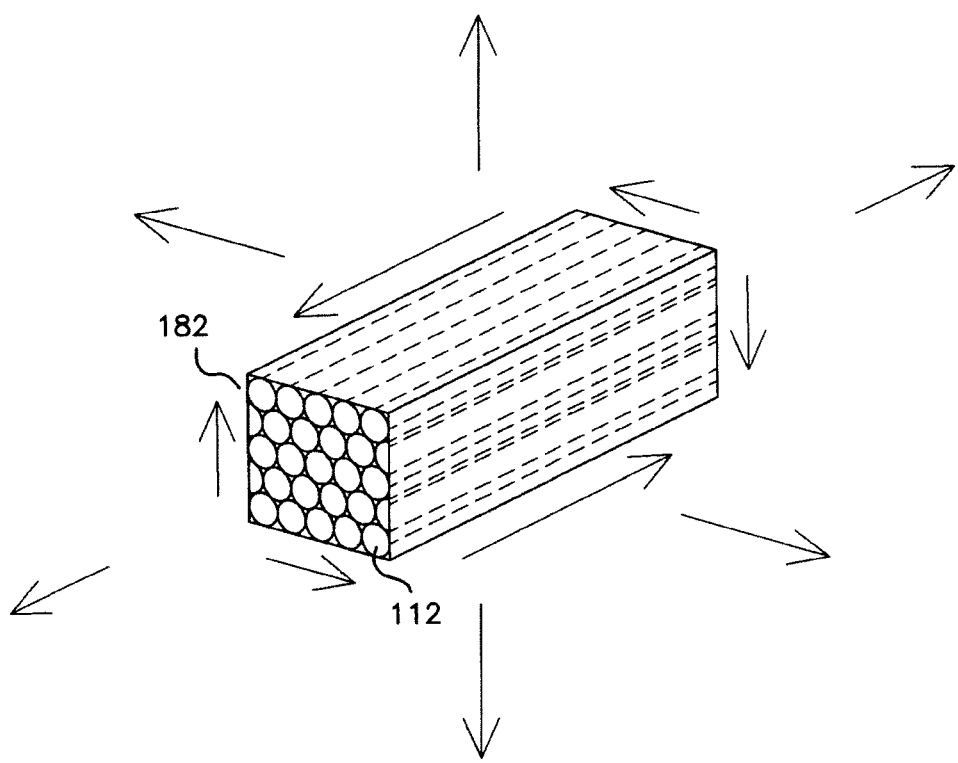
FIG. 18 is a perspective view of a representative volume of a continuous fiber reinforced polymer composite in accordance with one embodiment of the present invention.

Referring next to FIG. 18, a perspective view is shown of a representative volume of a continuous fiber reinforced polymer composite 182 that could be produced from consolidated fiber filaments 112. Fiber reinforced polymer composite is a term that is known in the art and it is an apt term to describe the product of some of the manufacturing methods of the present embodiment.

The volume is shown with arrows that indicate the 6 primary forces that can act on the volume: 3 tensile forces (negative is compression) and shear in the 3 planes.

In many mathematical models of solid objects, representative volume elements 190 are considered. There are various theories that make a connection between the properties of such an element and the bulk properties of a structure comprising these volume elements. This block, being comprised of continuous unidirectionally reinforced fiber filaments 111 is anisotropic, meaning the properties vary based on the direction. In fact, this type of structure is not fully anisotropic, but is known as transversely isotropic since it has one axis of symmetry. It is worth noting that short reinforcements could be approximated as transversely isotropic, though the short reinforcements do not exhibit isostrain at a micro-level. See FIG. 19 for more details. The mechanical properties along the reinforcement axis can easily end up being an order of magnitude higher than the directions orthogonal to the reinforcement axis or continuous fiber axis. As such, models that utilize this sort of representative volume 182 element cannot simply create a mesh that asks if there is or is not material at a given location, the model must also take into account the angle of the fiber filaments 111 in that element, and these angles may be continuously varied throughout the part 48, as determined by the printer filament 14 orientations.

Even for printer filaments 14 that are not reinforced printer filaments and are also not consolidated printer filaments, i.e., for printer filaments 14 that include only the matrix 114, the transversely isotropic nature of the printer filament 14 must be considered because: (1) the production of polymeric filaments (depending on the material) may have a tendency to align polymer chains causing a similar effect as continuous reinforcement or short reinforcement especially if liquid crystalline phases are present; (2) imperfect bonding between printer filaments in parts means that off-printer filament axis properties can be weaker than on-printer filament 14-axis properties. However, without continuous fiber reinforcement or short reinforcement this might only be a small factor and the parts could be thought of as equally bad in all directions. The printer filaments described herein that are reinforced printer filaments or are consolidated printer filaments benefit from having the part 48 models and subsequent print paths consider the anisotropy. This is beneficial because it allows substantial improvement not solely along one direction, but improvement of properties in any direction that one wants. Furthermore, it is because of the 5-axes 120 of the disclosed additive manufacturing systems that these benefits can be realized in conjunction with novel computational techniques that generate novel physical structures.

Figure 19:
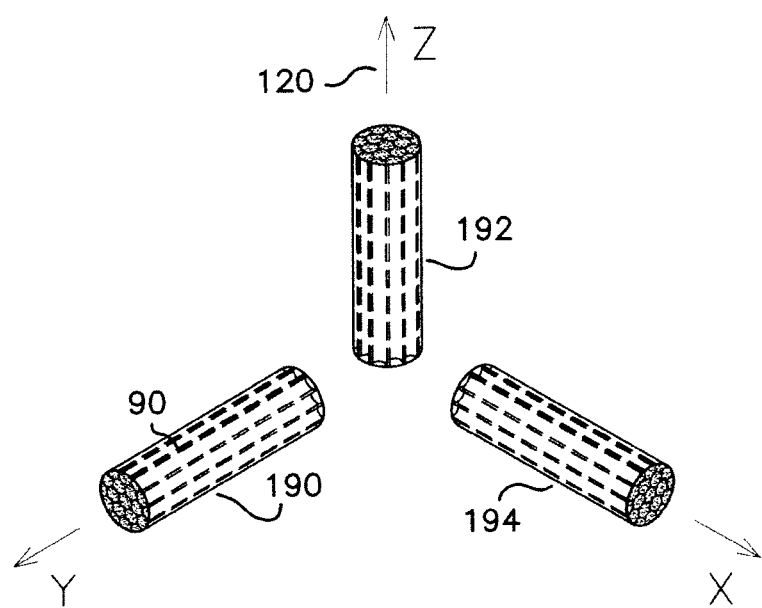
FIG. 19 is a perspective view of printer filaments aligned along three axes in accordance with one embodiment of the present invention.

Referring next to FIG. 19, a perspective view is shown of three representative volume elements 190, 192, 194. Short reinforcement fiber filaments 90 are shown. Cartesian coordinates 30 are also shown.

The short reinforcement fibers 90 are aligned within each volume element and the volume elements are each aligned with one of the axes 120 shown.

These elements are similar to those from FIG. 18. The short reinforcements do not meet the isostrain condition, but the reinforced printer filaments 14 that comprise short reinforcements will still have properties that are well defined along the primary loading paths. Since short reinforcements are not continuous, they do not have isostrain at a micro-level because for a uniform stress field, polymer sections adjacent to reinforcement sections will have greater reinforcement than those polymer sections that might be in between reinforcement ends at a local scale. However, in macroscopic parts these effects average out, but must still be considered in order to accurately predict the bulk level properties. The elements shown can be thought of as a projection of any single element in an arbitrary orientation. That element then exists properties of all the individual elements to varying degrees proportionally to the amount of alignment.

Figure 20:
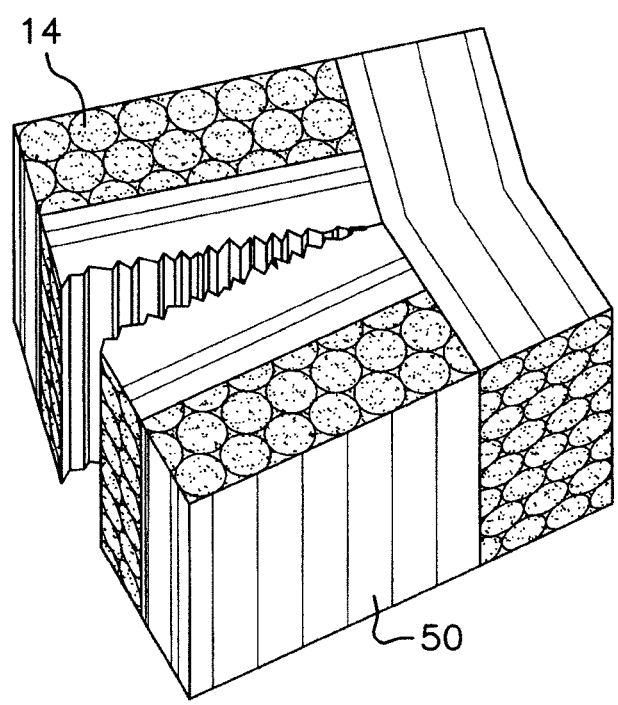
FIG. 20 is a perspective view of a cracked structure comprised of printer filaments in accordance with one embodiment of the present invention.

Referring next to FIG. 20, a perspective view is shown of printer filaments 14, aligned along three axes.

A structure is formed from the printer filaments 14. The figure comprises three sections with printer filaments 14 substructures in three different alignments.

The right side of the figure shows a layer 50 of vertically aligned reinforcement material. On the bottom and top of the left side of this figure are short reinforcements that go into and out of the page as indicated by showing the ends of the short reinforcements. The layers 50 in between those are separated by a gap and have reinforcements that go left and right. Together, the layers 50 on the left side are essentially two 2-ply laminates that are separated from each other. These sub-laminates may have any orientation, but the 90-degree offset was chosen arbitrarily to illustrate a particular mechanism. It is worth noting that in this structure, the reinforcement may be continuous, discontinuous, or not at all, in which case the intrinsic printer filament 14 transverse isotropy inherent to these anisotropic systems may still be marginally relevant.

In operation, this figure can be seen as implementations of aspects of the representative elements of FIG. 18 and FIG. 20 in conjunction with the design freedom enabled by the various elements that comprise these systems of 5-axis additive manufacture of transversely isotropic filaments. This particular structure was chosen to illustrate specific aspects of these systems which are beneficial, but of course there are various other aspects that can be formulated through the computational methods suggested herein that would consider the novel representative volume 180 in conjunction with the manufacturing process.

The figure shown is not only is beneficial for the field of manufacturing, but also provides a mechanism to solve some of the problems that have plagued the composites industry for decades. This figure demonstrates how multi-axially printed composites may be effective in preventing delamination. Both in additive manufacturing and composite manufacturing, parts are produced layer by layer. Since composites typically have strong reinforcement materials, but a relatively weak matrix, this means that excellent planar properties may be achieved, but the through thickness properties are vastly limited since the reinforcements do not provide much reinforcement when loaded orthogonally to their length. Therefore, composites layers 50 may separate causing part 48 failure and engineers are limited in their design because they must account for this. Furthermore, there is a limitation to creating parts that are essentially curved planes since the mechanical properties are only good in the plane. It is highly impractical to create bulk three-dimensional composite structures with such layers 50 that are effectively reinforced in all directions so many parts are instead made of inferior metallic materials.

This figure on the left solves these problems. By being able to orient filaments along any direction, the reinforcement fibers 90 can go in all directions in a bulk three-dimensional part 48. Then anywhere that might delaminate, consolidated printer filaments or reinforced printer filaments with reinforcements orthogonal to that delamination plane can be placed that will arrest propagation of a crack, and thus prevent catastrophic part 48 failure. Furthermore, the part 48 can be strong and stiff in any direction that is needed instead of just in a plane. One might observe that this figure can be viewed as a composition of three representative volume elements 190 as described in FIG. 18 and FIG. 20, and this configuration shows substantial benefits over existing options. When used in conjunction of computational optimization and possibly generative design, many more such sub-structures with beneficial properties arise and the applications of these materials expand not only for additive manufacturing, but manufacturing in general.

Figure 21:
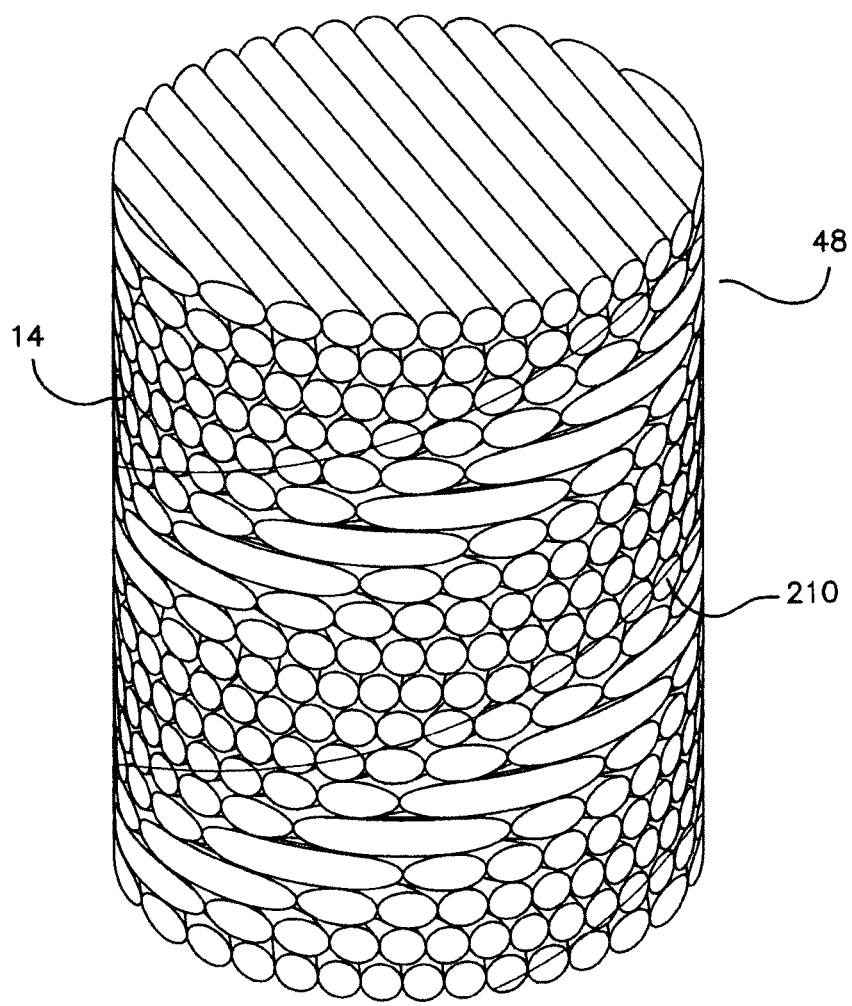
FIG. 21 is a perspective view of a cracked structure comprised of printer filaments in accordance with another embodiment of the present invention.

Referring next to FIG. 21, a perspective view is shown of a structure comprised of printer filaments 14 that could be either reinforced printer filaments or consolidated printer filaments. The figure does not show the structural arrangement of the individual printer filaments. The figure shows the path a crack 210 might follow if the part 48 underwent fracture.

Figure 36:
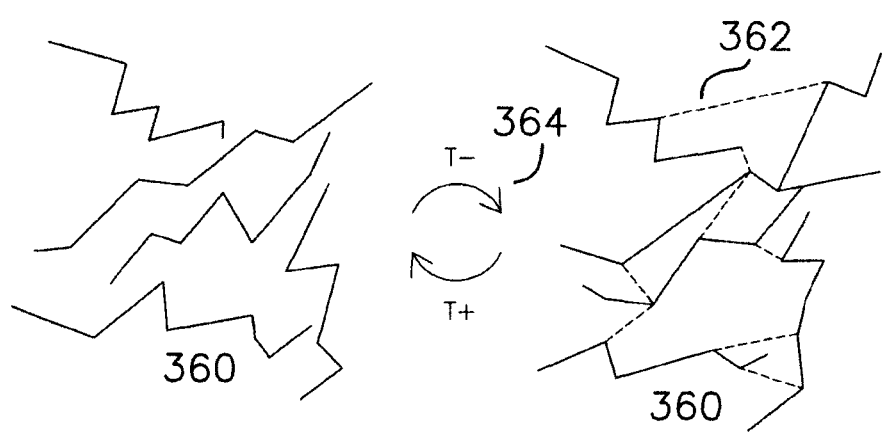
FIG. 36 is a schematic diagram of several polymeric molecules in accordance with one embodiment of the present invention.

This figure illustrates a lamina of filaments that are parallel within each layer and then rotated by some angle in each subsequent layer. The crack 210 shown is a helical curve that passes through inter-printer filament 14 gaps in each layer without splitting any individual printer filament 14 along its length. Although such a crack 210 path could also split individual printer filaments 14, it is less likely given that inter-printer filaments are often not as well adhered as the bulk material (see FIG. 36 illustrates an exception to this heuristic). It is worth noting that in this structure, the reinforcement scheme may be continuous, discontinuous, or unreinforced, in which case the intrinsic printer filament 14 transverse isotropy inherent to these anisotropic systems may still be marginally relevant.

This figure can be seen as implementations of aspects of the representative elements of FIG. 18 and FIG. 20 in conjunction with the design freedom enabled by the various elements that comprise these systems of 5-axis additive manufacture of transversely isotropic filaments. This particular structure was chosen to illustrate a particularly beneficial aspect of these systems, but of course there are various other aspects that can be formulated through the computational methods suggested herein which would consider the novel representative volume 180 in conjunction with the manufacturing process.

This figure solves a critical problem faced by composites manufacturers. This figure is merely another example of the benefits of complex orientations, this one benefiting from the material anisotropy, and producible with only three of the five axes 120. First, some background information: Fiber reinforced polymer composites are known for having extremely high specific strength and specific stiffness compared to other material choices such as steel, aluminum, or even titanium alloys. However, their weakness is their relatively low toughness, especially when the polymer is a thermosetting matrix, which has dominated the composites industry due to its ease of processability compared to thermoplastics (some of the later printer filament 14 figures will discuss how the systems described herein also beneficially increase the usability of thermoplastics in composites). Various toughening mechanisms have been developed to lessen this problem, but it is still the case that dropping a wrench in a composite airplane or crashing on a carbon fiber bicycle could cause irreparable damage due to the inability of composite to absorb the impact energy, the very definition of toughness. This has an associated component of energy absorption under failure. For instance, in an automobile with a primary composite structure undergoing a collision may fail suddenly, essentially, the opposite of what a crumple zone does. It would be beneficial to extend the time in which the material fails since distributing impacts in time reduces peak acceleration, which has been shown to be beneficial for humans.

The structure shown in this figure, which can be produced from the systems described herein shows how all these problems could be overcome. Traditional composites are made with a small number of angles for the unidirectional lamina since it is difficult to work with small angles. An additive manufacturing machine can easily shift by a small angle to form a helical composite. This helical composite then might have a crack 210 that follows a helical curve, which has a greater surface area than a flat curve for any given volume. Fracture energy released during fracture is related to the strain energy release rate, which is proportional to the energy in forming new surfaces, which is proportional to the surface area. Furthermore, these structures can absorb more elastic energy without fracture or developing of micro-cracks that compromise a part's structural integrity, which is clearly a problem in composites as shown by the decrease in compression strength after an impact. The formation of composites with complex orientations such as these, which may be extended to incorporate the capabilities of the additional two axes 120 will be able to produce parts tougher than those produced by any existing process.

Figure 22:
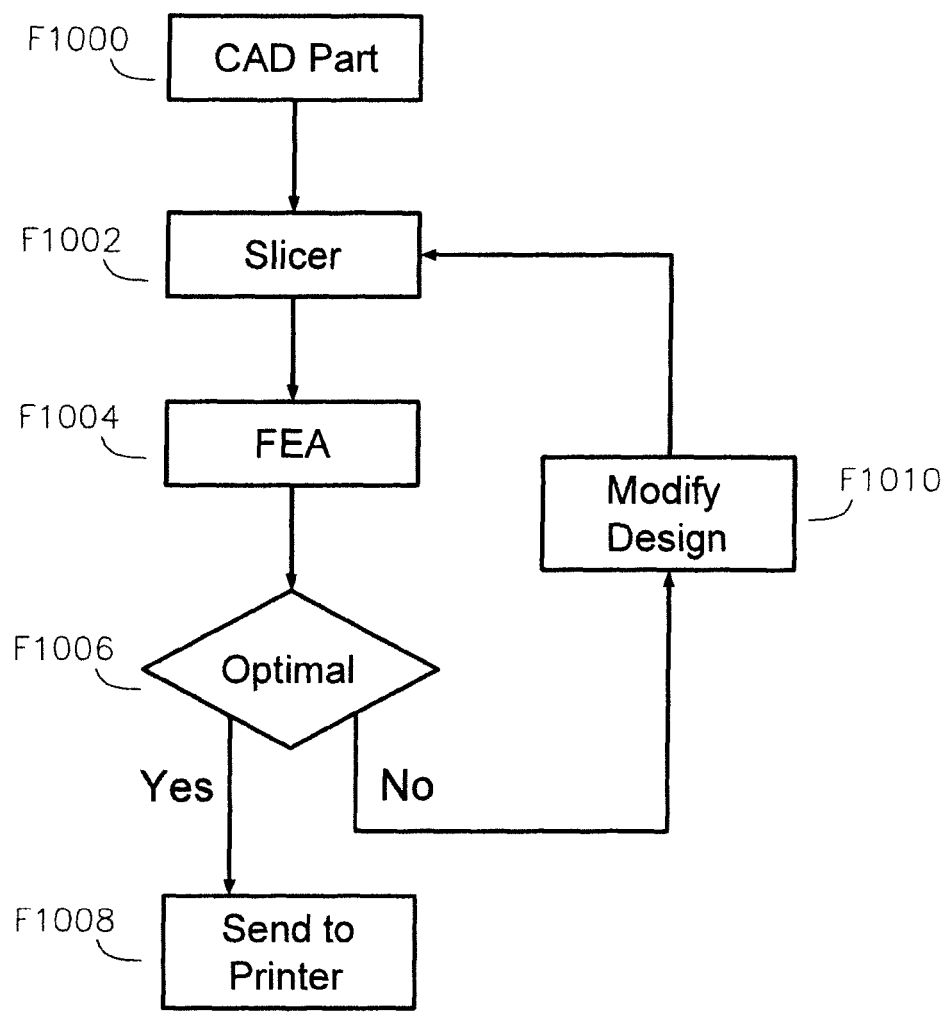
FIG. 22 is a flow diagram for a process to produce optimized anisotropic additively manufactured parts is shown in accordance with one embodiment of the present invention.

Referring next to FIG. 22, a flow diagram is shown.

Each block of the flow diagram can be considered a piece. Arrows connect the blocks and one block has two arrows with Boolean values of 'yes' and 'no' to determine which arrow to follow.

The first block is a CAD part design 1000, which is input into a slicer, the output of which is input into a FEA. The output of the FEA is input into an optimal test. If the output of the FEA is optimal, the FEA output is sent to the additive manufacturing machine. If the output of the FEA is not optimal, the process modifies the geometry, and outputs the modified geometry to the slicer.

In operation, this flowchart is one implementation of a computational structural optimization system that can be used to produce anisotropic additively manufactured parts optimized for some plurality of objectives. This process begins with a CAD part 48 that could either be produced by a person or by a generative design process. The slicer 1002 generates a path that would allow the additive manufacturing machine to form the geometric part 48. The slicer 1002 has heuristics regarding principles of structural design. For instance, the slicer does not suggest the collection of parallel layers 50 used in typical 3-axis printers since this has terrible z-directional strength, impact toughness, and delamination resistance. Instead the slicer creates a path that is good for many situations that balances conflicting objectives. This slicer step alone might be sufficient for some applications, but it is not likely to be fully optimized for the particular application.

The subsequent step suggests finite element analysis (FEA), but this could be any sort of analysis on the structure suggested by the slicer to determine if it meets some criteria or where the primary weaknesses are so those can be improved. The next step is checking whether the FEA showed acceptable performance. If the structure is adequate, the path is sent to the printer to produce the part 48. Otherwise, the process goes to a perturbative step that changes the geometry in order to move closer to a design that is optimal for the given application. This perturbed design is fed back into the slicer. This is a feedback loop where many minor changes can quickly change the design with consideration for the manufacturing constraints of the printer to arrive at highly optimized parts. Other optimization processes can also be used that iteratively discover the best part 48 structure and path to form the structure. It may be beneficial to use multiscale models.

Figure 23:
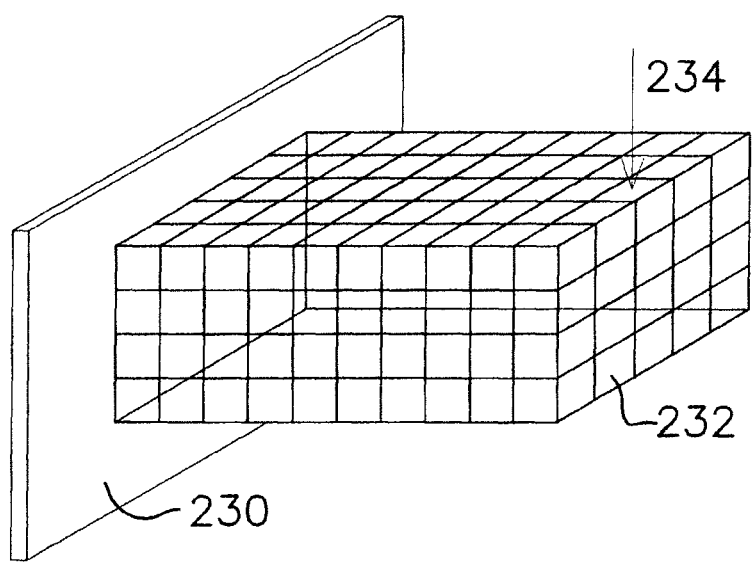
FIG. 23 is a perspective view of a load applied to a mesh extending from a fixed wall in accordance with one embodiment of the present invention.

Referring next to FIG. 23, a perspective view is shown of a fixed wall 230, a mesh 232 and a load 234.

The mesh 232 extends out from the wall and the load 234 is directed downwards at the end of the mesh 232 on the side farthest from the wall as indicated by the force vector.

This represents part of the design process in accordance with one embodiment for generating a print path for a final part 48. The mesh 232 is the geometric boundary within which the part 48 must be contained. The area where the mesh contacts the wall is where it would be joined to some other structure. The load 234 is that which the part 48 needs to withstand in operation. The mesh 232 forms unit cells, each of which can be filled with material or be empty. The angle of reinforcements within the unit cell is variable. The unit cells can be considered at multiple scales. For example, a unit cell can be an arrangement of the most basic unit cells that is constructed to be quasi-isotropic and able to tile the volume. Multiscale models can beneficially achieve greater optimization when computational resources are limited. It needs to be noted that the unit cells are not independent since the structure, or substructure, needs to be connected and possible to manufacture with the additive process. Therefore, a complex systems approach can be employed for effective topological optimization.

Figure 24:
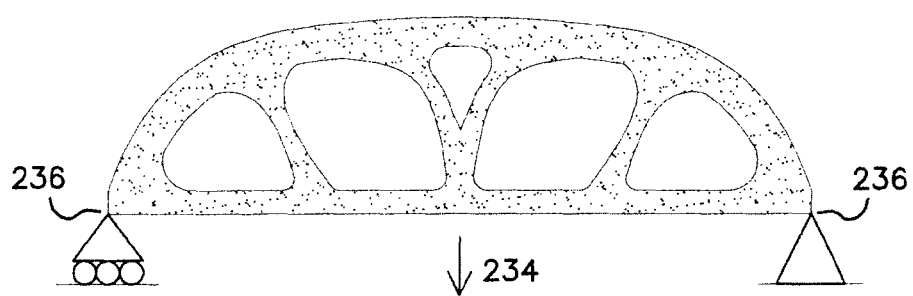
FIG. 24 is a side view of a loading configuration in accordance with one embodiment of the present invention.

Referring to FIG. 24, shown is a loading configuration with two fixed points 236 and one load 234. Shown is an example with the likeness of one, which may arise from a topological optimization.

The generated structure rests on the two fixed points 236 and supports the downward load 234.

This is an example of what a simple topological optimization scheme would create. Beginning with just the fixed points 236 and load 234, the software would generate some optimal structure. This figure does not in fact show an exact representation of the actual structure that would be generated. The actual structure would take into account not just any form of arbitrary unit cells with some set of microscale material properties such as those described in FIG. 23, but optimization process would generate structures that are compatible with the additive manufacturing machines described herein.

Figure 25:
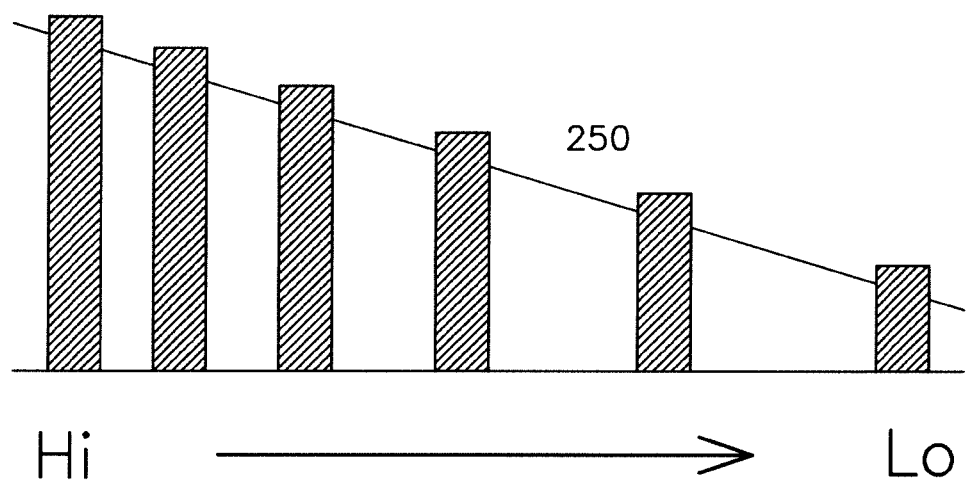
FIG. 25 is a diagram showing a variation in a gradient property of a structure in accordance with one embodiment of the present invention.

Referring next to FIG. 25, shown is an abstract representation 250 of a structure that represents a gradient property throughout a structure. This is depicted by showing a variation in relative density. Shown is a one-dimensional scale with the labels "hi" and "lo".

If the property being varied in relative density is a cellular structure, each vertical bar could be solid material with the lines on top and bottom also solid material so that the part represents a connected structure. The "lo" indicates the direction in which a property decreases, which is shown to be the direction of increasing spacing between solid parts of the structure.

Functional gradation describes a non-homogeneity of some aspect of a component, where the aspect might be deliberately varied to benefit the operation of the final part 48. The figure shows a change in relative density, but the part 48 can be functionally graded with any property, which would typically be controlled by manipulation of the component structure. Thus, aspects of this figure might be incorporated into computational design systems described in FIG. 22, FIG. 26, and FIG. 27. Functional gradation beneficially allows the minimally sufficient amount of material to be used to achieve the design constraints, and can also beneficially enable unique properties such vibrational damping, which would have acoustic implications as well, and absorption of electromagnetic radiation in stealth applications, among others.

In the same way a bridge has beams in some places and other places are empty, it is desirable to have parts with a similar sort of 'micro-architecting.' When relative density is varied, it allows design constraints to be met with less overall material, or improvement in performance at the same weight by varying where the material is placed. Another benefit would be considering energy absorption in plastic failure of the overall part.

These are some of the mechanical properties one would consider when functionally grading a part and non-mechanical properties could also be optimized.

Figure 26:
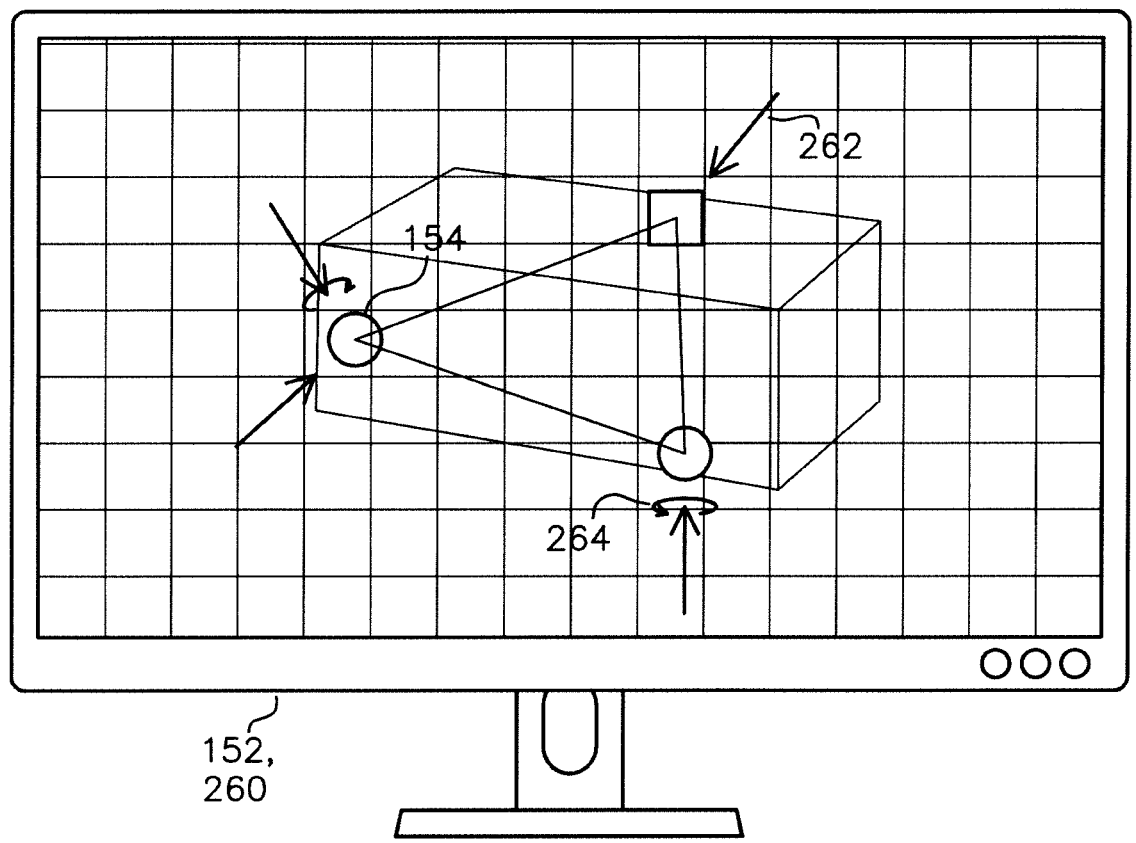
FIG. 26 is a schematic diagram of vectors and moments displayed on a device that transmits information in a primary visual mode in accordance with one embodiment of the present invention.

Referring next to FIG. 26, shown is a schematic diagram of a device 152 that transmits information in a primary visual mode, for example a computer monitor 260. Shown displayed on the computer monitor 260 are a plurality of attachment points 154. Also, shown displayed on the computer monitor 260 are a plurality of vectors 262 and moments 264.

All elements described in reference to FIG. 26 that are not the computer monitor 260 are displayed on the computer monitor 260. It is presumed that the computer monitor 260 is connected or coupled to a computer, such as a personal computer.

The attachment points 154 and loading conditions are shown on the monitor with forces acting at the attachment points 154.

This represents a computer aided engineering system that enables generative design of components with consideration for the manufacturability constraints inherent in the additive manufacturing systems described herein. A person designing a component to be manufactured using the additive manufacturing system and method described herein first determines how that component would be a fixed to other components of a system and then specifies the loading conditions that occur at each attachment point. Next, the designer inputs that attachment points 154 and loading conditions into the computer and the computer generates a part 48 geometry for an optimized design that meets the structural requirements. This can be achieved via the use of intelligent genetic algorithms, neural networks, or purely analytical design, or a combination thereof which uses the constraints the user has input to find optimal loading paths through the space in which the part may exist, and produce more structure where the load is delivered, within some margin of error. This can be achieved by functional gradation of structure density and anisotropy in given regions of a part, as detailed in FIG. 25. This geometry could include aspects of the slicing technology and integrate with the process described in FIG. 22. This figure describes a system that would replace the initial step of CAD part 48 in FIG. 22 with the more abstract structural information. Since FIG. 22 begins with some design, it may converge on local maximums.

The generative process in FIG. 26 represents a larger search space with a greater ability to obtain optimized designs. Various implementations of this system might include genetic processes, iterative processes, or heuristic processes. Furthermore, the monitor is suggested because it is a common interface between humans and computers. However, there could be various other interfaces that will be more practical in the future, and some that are particularly well suited to these engineering processes. For instance, holographic images or other forms of augmented or virtual reality are a useful visual way to interact with data and part 48 designs. Any other interface with other network paradigms could be beneficial.

Figure 27:
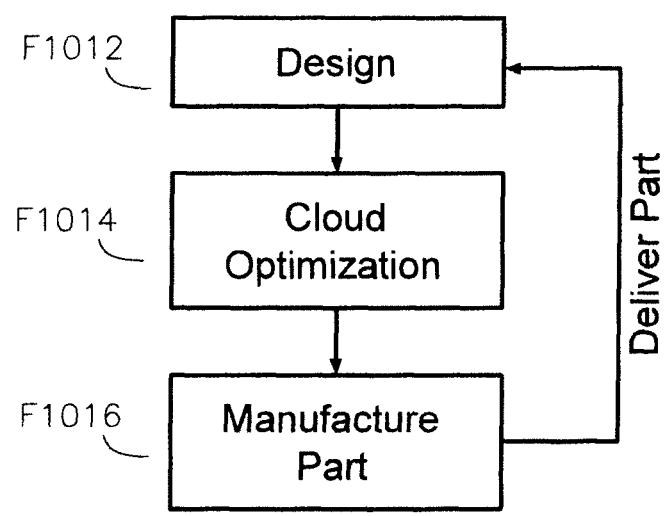
FIG. 27 is a flow diagram for a process for optimizing a design in accordance with one embodiment of the present invention.

Referring next to FIG. 27, a block diagram is shown. There are three blocks 600 labeled cloud optimization 1014, design 1012, and manufacture 1016, respectively. Shown are arrows 800, one of which has the label deliver part 48.

The design points to the cloud optimization, representing a designer sending out a design, and the optimization operated on the design that is received. The optimized structure of the design is provided to the additive manufacturing machine, which produces the part 48. Then the manufactured part 48 is delivered to the original designer.

This figure describes a set of high level operations that could enable efficient industrial implementation of the additive manufacturing system described so that they can be of the greatest benefit. This system is one that can have varied amounts of automation. In operation, a design is provided, as produced by some method that could involve some aspects of that mentioned in FIG. 22 and FIG. 26, with the added benefit that some components of those figures are implemented in cloud-based hardware/software systems. Using cloud-based technology has the potential benefit of adding more computational power to some of the elements that might be included in the optimization process, and this enables, in accordance with the present embodiment, a greater degree of optimization. The present embodiment consists of a front-end software which allows the user to up-load designs, specify design requirements, and configure constraints on the additive manufacturing process. Portions of this step may be performed by customer service representatives or engineers, depending upon the customer's requirements. Then, the part or constraints is obtained from the customer, either via automated upload or by personal communication with the customer. Once the part or constraints have been received, the structural optimization, generative design, and slicing mechanisms shown in FIG. 22, FIG. 23, and FIG. 24 will be used to generate a printable geometry and convert the geometry to the finalized part design and "G-Code".

These computational steps will be performed on higher power, or more computationally optimized devices at a location which is remote to the client, in order to increase the speed of the process and increase the software designer's flexibility. In this system, as soon as the part 48 design is finalized, and optionally confirmed by a customer or other method, the design can then be produced on an additive manufacturing system that might be operating in parallel to many other such systems in a large facility. A finished part 48 or parts is optionally packaged and shipped to the customer. This system beneficially allows one to rapidly change part 48 designs to create better systems. Furthermore, the system can beneficially reduce the amount of engineering expertise to produce optimized parts, especially if generative design is substantially involved.

Figure 28:
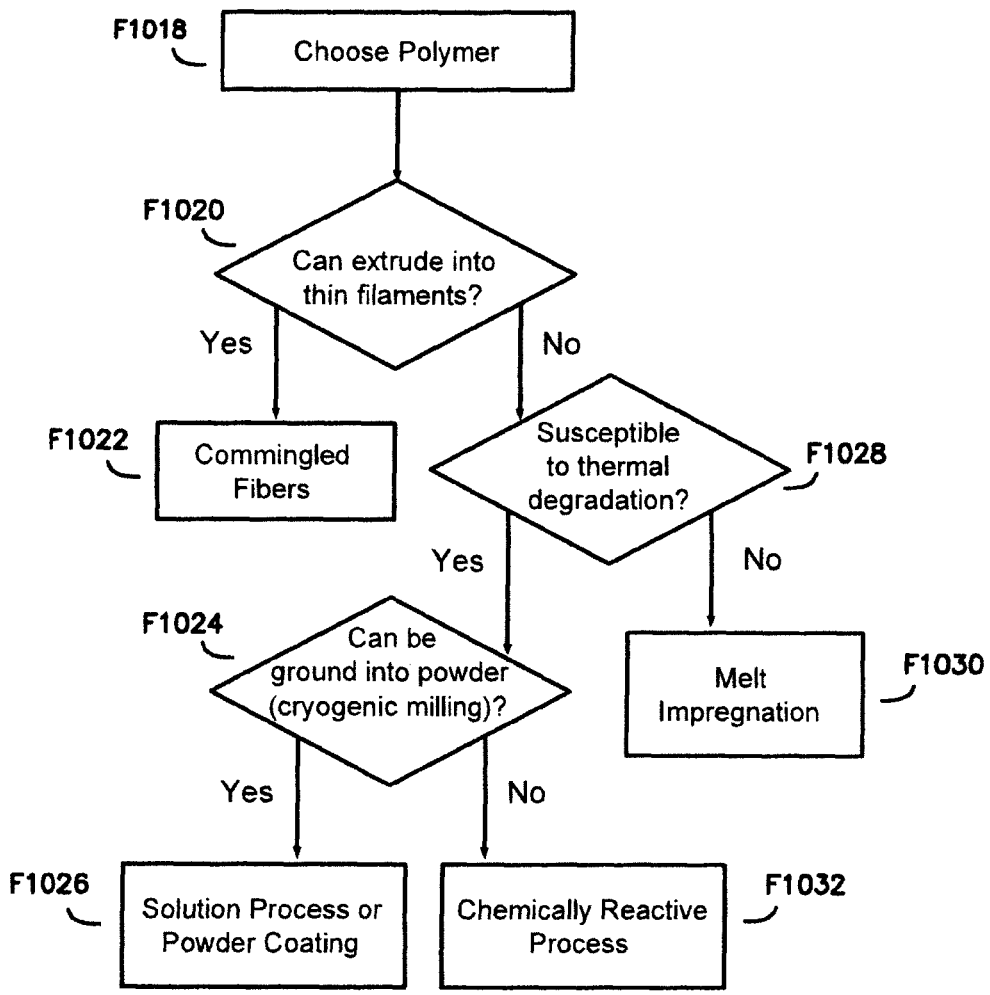
FIG. 28 is a flow diagram for a process to produce consolidated printer filaments in accordance with one embodiment of the present invention.

Referring next to FIG. 28, a flowchart is shown comprising labeled boxes 600, arrows 800, and Boolean truth values in the form of the words 'yes' and 'no'. The labels are specified in the structure.

The connections between the boxes 600 are shown as well as prompts to the user to determine the path to follow along the flowchart 280. The first step is choose polymer 1018, which points to the question easily extruded in thin filaments? 1020. If the answer is yes, an arrow points to commingled fibers 1022, which terminates the tow. If the response is no, the arrow points to the question highly susceptible to thermal degradation? 1028. If the answer to the prior question is no, then an arrow points to melt impregnation 1030 and the chart terminates. If the answer to the prior question is yes, then an arrow points to the question can be ground into powder (cryogenic milling)? 1024. If the answer to the prior question is no, an arrow points to chemically reactive process 1032, and if it points to yes an arrow points to solution process or powder coating 1026.

This flowchart describes a methodology for determining aspects of the process to produce consolidated printer filaments that are one of the feedstock materials for some of the additive manufacturing machines described herein. Printer filament will be used to refer to arbitrary filaments. Printer filaments could be ordinary pure polymer filaments, consolidated printer filaments, unconsolidated printer filaments, or reinforced printer filaments. The concepts of a 'printer filament' is a convenient method for referring to the material especially when its state may be transferring in some process such as the conversion from an unconsolidated printer filament to a consolidated printer lament. Furthermore, all printer filaments have similarities and many of the descriptions herein apply to all forms of printer filaments.

The methodology is beneficial when one is considering the use of different thermoplastic polymers. For each thermoplastic polymer under consideration, consideration of whether such thermoplastic polymer is easily extruded is first considered. If such thermoplastic polymers can be extruded into strands of polymer filaments, then such thermoplastic polymer can be commingled with fiber filaments of a fiber tow. Whether the polymer can be extruded is dependent on its melt-processability, and this data can be obtained for common polymers. If the polymer cannot be processed by this method, melt impregnation is used, but this risks thermally degrading the polymer. If the polymer can be finely ground, powder coating or solution processing are effective. Reactive processing is another method, which is effective for certain polymers that exist as reactive monomers or oligomers. Reactive processing is different from the other processes in that the matrix material on the fiber is pre-polymeric and becomes a polymer, usually from heat, and this step might not occur until the consolidated printer filament 14 is printed. Each of these processes has different benefits that will be considered subsequently as it is described how each process might be applied to produce the necessary consolidated printer filament 14.

Figure 29:
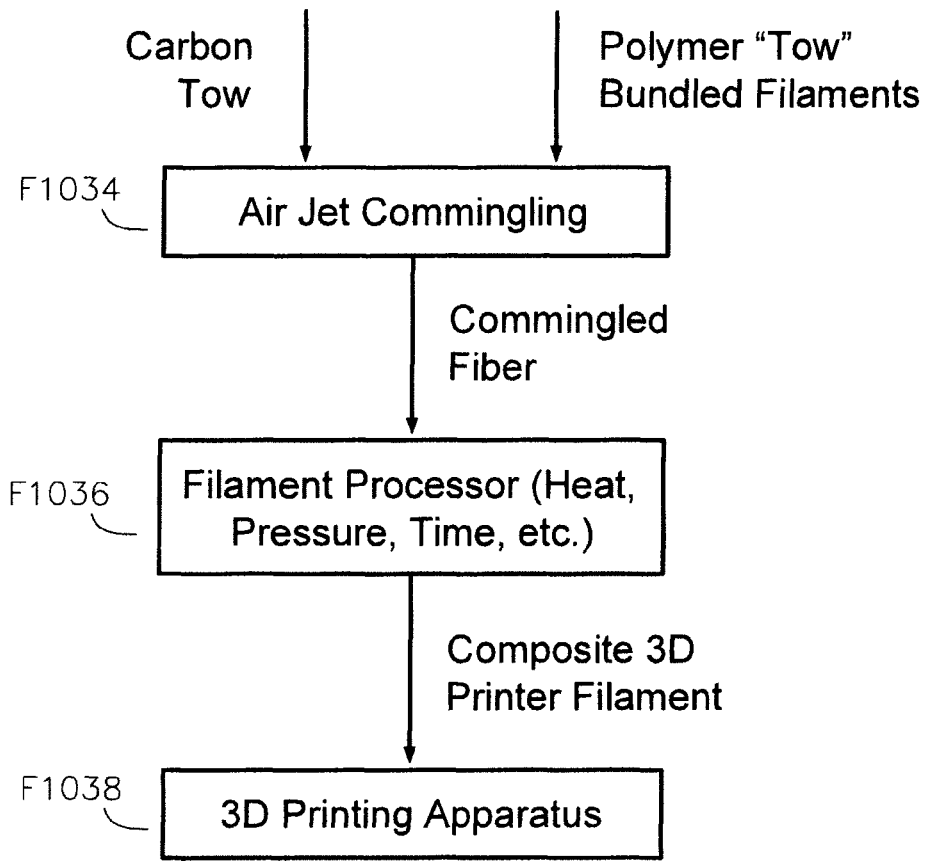
FIG. 29 is a flow diagram for a process for processing comingled fiber for a 3D printer in accordance with one embodiment of the present invention.

Referring next to FIG. 29, a flowchart is shown comprising labeled boxes 600 and arrows 800, as well as words near arrows 800. The labels and words are specified in the structure.

The connections between the boxes 600 are shown to define a process flowchart and words next to arrows specify the form of the material at each stage. The first set of words are 'carbon tow' and 'polymer "tow" bundled filaments', which each serve as an input to air jet commingling 1034. This first set of words can more generally refer to 'fiber tow' and 'polymer filaments,' respectively, as described previously. 'Commingled fiber' is output from the air jet commingling 1034 step, and serves as an input to a filament processor (heat, pressure, time, etc.) 1036, which generates 'composite three-dimensional printer filament' (also referred to here as a consolidated printer filament) as an input to a three-dimensional printing apparatus 1038 (also referred to herein as an additive manufacturing machine).

In operation, one begins with a carbon tow and polymer filaments. The fiber tow is commingled 1034 with the polymer filaments, which in one embodiment is done with an air-jet process. The commingled fiber combines carbon tow and polymer filaments so that they are interspersed as uniformly as possible without excessive processing to avoid fiber filament breakage. In order to have the commingled fiber, which is a somewhat loose bundle of individual polymer filaments become a consolidated printer filament 112, the printer filament must be melt impregnated 1036 such that as many of the fiber filaments 90 as possible are surrounded by the polymer matrix 114. This is a percolation problem modeled by Darcy's law, which indicates some combination of heat and pressure, after some time will effectively percolate the polymer throughout the fiber filaments 90. This process could resemble that of pultrusion by passing the commingled fiber through a constriction 100 along with heating the printer filament 14 by some method.

Figure 30:
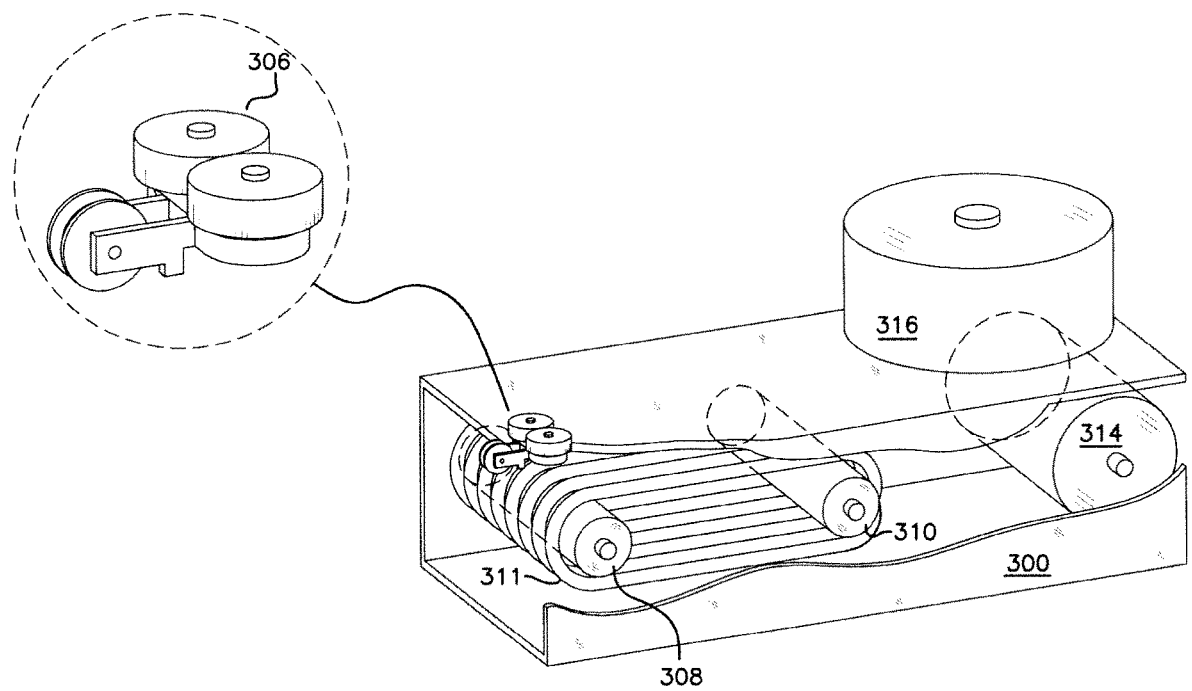
FIG. 30 is a perspective view of a filament processor apparatus in accordance with one embodiment of the present invention.
Figure 31:
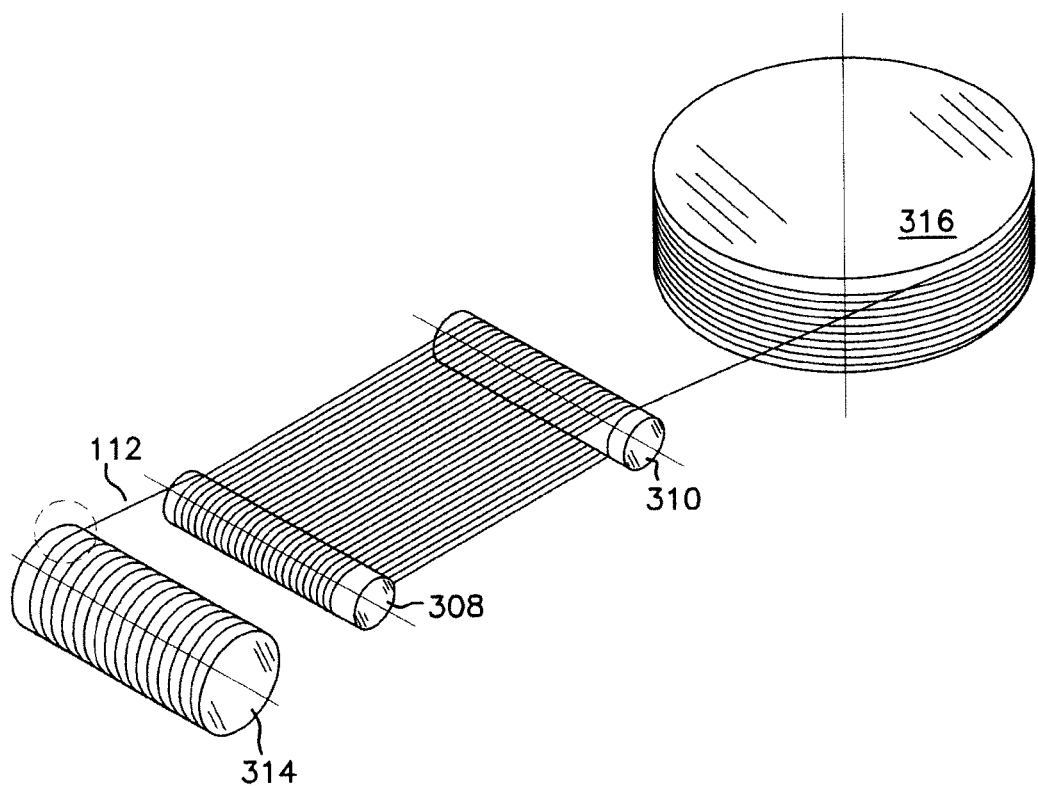
FIG. 31 is a perspective view of two rollers, a fiber, and two creels in a simplified view of the apparatus of FIG. 30.

FIG. 30 and FIG. 31 describe another method by which one might convert a commingled fiber into a consolidated printer filament 112. Commingled fibers are typically woven, but the novel step that converts the unconsolidated printer filament 420 to consolidated printer filament 112 is beneficial in that the process is compatible with roller systems by which large collimated fiber reinforced polymer rods 88 could not be as easily produced given their typical much larger diameter. The unconsolidated printer filament 420 can be thought of as a printer filament that contains both the fiber filaments and polymer in some form, but has yet to consolidate into a consolidated printer filament. Therefore, the step after commingling is the filament processing step, which effectively consolidates the printer such that the fiber filaments are distributed throughout the matrix with has few voids as possible. Once this consolidated printer filament is produced, the printer lament is ready to be used by the three-dimensional printing apparatus.

Referring next to FIG. 30, a perspective view is shown of panels 300, which can be acrylic, a creel 314, which is a reel for fiber tows, and another creel 316 of a much larger diameter. Shown is an assembly of rollers 308, 310 and unconsolidated printer filament guiders, two rollers 308, 310, and heating coils 311. Not shown are various mechanical and electrical components such as motors, circuits, and fasteners.

The panels 300 are joined to form a structure, which in this case is a box. The first creel 314 is fixed within the box at one end and can be hold unconsolidated printer filament 420, which may be a commingled fiber. The unconsolidated printer filament 420 may pass from the creel 314 over the rollers 308, 310 and wrap around the rollers 308, 310 multiple times. The roller guider assembly connects the unconsolidated printer filament 420 from these rollers 308, 310 to the larger creel 316. This roller creel 316 is positioned on top of the acrylic box. Additional mechanical and electrical components are connected to the rest of the apparatus in the way which enables its operation as will be described. There may be heating elements within the rollers 308, 310, and the two rollers 308, 310 may be wired such that the rollers 308, 310 are forming a circuit with the unconsolidated printer filament 420 if the printer filament 14 is electrically conductive. When carbon fiber is employed for the fiber filaments within the unconsolidated printer filament 420, the printer filament 14 is electrically conductive.

This figure illustrates an embodiment of a filament processor apparatus for performing the 'Filament Processor' step described in FIG. 29. The lower creel 314 will begin with some amount of unconsolidated printer filament 420 such as commingled fiber and as the printer filament passes over the rollers 308, 310 the printer filament will be heated by a heating element and consolidated. The unconsolidated printer filament 420 will be referred to as commingled fiber herein (as well as FIG. 31 and FIG. 32). The apparatus shown is the preferred embodiment for producing consolidated printer filaments. There is no particular amount of commingled fiber necessary, but the amount will typically be at least several hundred feet, and often more. Subsequently, the unconsolidated printer filament 420 will become a consolidated printer filament 112 and will be re-spooled onto the larger creel 316. It is beneficial that the larger creel 316 be of a sufficient diameter since the wet-out process that converts the unconsolidated printer filament to a consolidated printer filament that has a much larger diameter than that of the individual polymer filament or fiber filaments that comprise a commingled fiber. As a result, this larger diameter creel 316 is needed to prevent the consolidated printer filament from breaking under bending stresses. The minimum diameter of the larger creel 316 can be determined from a calculation of the minimum bending radius. Once the consolidated printer filament has made a few loops around the larger creel 316, the rotation of the creel 314 acts to pull the printer filament through the system. This means the rollers 308, 310 and lower creel 314 can be made to rotate freely.

Various heating methods can be used either individually or in conjunction with one another at the rollers. The coils 311 shown in the figure are used for inductive heating in accordance with the present embodiment, which is effective when the individual fiber filaments 90 are conductive. However, heating coils 311 are not strictly necessary, and if heating coils 311 are not present, the coils 311 shown should be understood to represent the heated polymer filaments, in accordance with other embodiments.

Another heating method suitable for use with the present embodiment is to heat the rollers 308, 310 for conductive heating of with a resistive heating element.

Another method of heating the polymer filament, when conductive fiber filaments 90 are employed (carbon fiber filaments are one such conductive material), is to pass current through the unconsolidated printer filament 420 using differing charges on each roller 380 that are precisely modulated, which beneficially heats each segment of unconsolidated printer filament 420 between the rollers 308, 310 over the entire length of the segment. The component of pressure in the processing system can result from the tension along the entire printer filament from the upper creel 316, which presses the printer filament against the roller 306. The roller itself can have smooth groves to guide the printer filament and to allow the individual fiber filaments 111, along with the polymer as a polymer filament or in another morphology, to spread out over the roller. Allowing the printer filament to deform into a tape-like shape as printer filament passes over the rollers 308, 310 can be beneficial in reducing the distance between the polymer and reinforcing fiber enhancing their ability to intimately bond. This tape-like cross section can even be maintained in storing the fiber on creels so that it can have a smaller bending radius.

Radiative heating can also be employed as an additional method for heating, as can any other practical heating method.

Regardless of the heating method chosen, precise control over the amount of heat that goes into the fiber is beneficial. This is because it is desirable to have the maximal amount of heat such that the heat is not causing damage to the polymer since this will give the polymer the maximal fluidity, which decreases the probability of any fiber filaments that are not effectively coated with the polymer. Therefore, all parameters that can be easily controlled are controlled with some electronic system. The electronic system allows parameters including, but not limited to, printer lament tension, speed, and temperature to be adjusted independently. The electronic system ensures that the heat that goes into the fiber is sufficient to effectively melt the polymer. The electronic system also ensures that the polymer is not heated to an excessively high temperature that could damage the polymer at a molecular level by chain scission or other heat-related degradation mechanisms.

Referring next to FIG. 31, shown is a perspective view of an apparatus having two rollers 310, a fiber, and two creels 314, 316.

The unconsolidated printer filament 14 is wrapped around a creel 316 with one end making several turns extending along the parallel rollers 308, 310 before wrapping around the other creel 316.

This is a simplified view of FIG. 30. The figure shows the essence of the functionality and shows how the fiber 112 might be wrapped. In operation, a plurality of rollers 308, 310 may be used to transform the loose bundle that is the commingled fiber on the smaller diameter creel 314 to the well consolidated fiber on the larger creel 316. Passing over rollers 308, 310 in tension with heat is one such embodiment, but others are contemplated, and will be appreciated by skilled artisans based on the description here. Other embodiments optionally have some of the elements of that described in FIG. 30.

Figure 32:
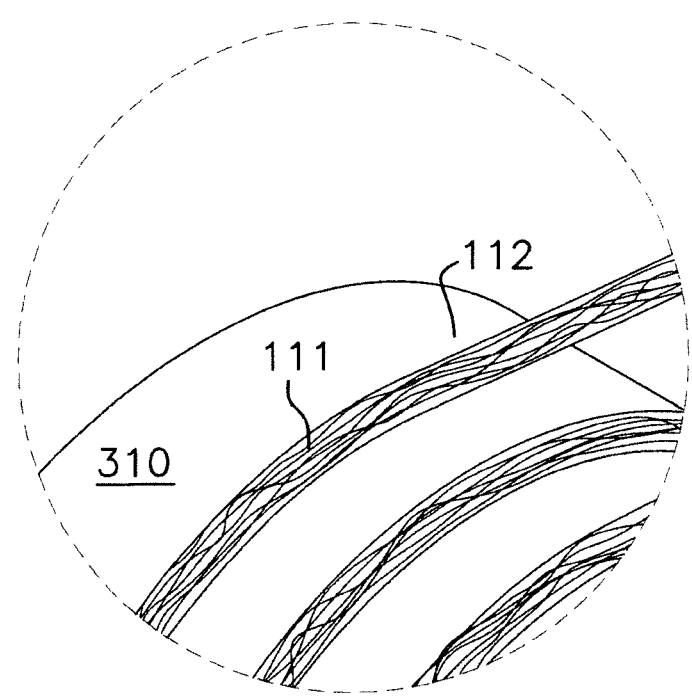
FIG. 32 is a magnified view of a consolidated printer filament in accordance with one embodiment of the present invention.

Referring next to FIG. 32, a close-up (magnified) view is shown of a consolidated printer filament 112.

The magnified view shows that within the coiled printer filament 112, the individual reinforcing fiber filaments 111 can be seen continuously along the consolidated printer filament 112.

This figure shows the basic structure of a consolidated printer filament 112, but the following is also relevant to reinforced printer filaments 298. These consolidated printer filaments 112 are produced by any of the methods suggested in FIG. 28. The fiber filaments have a distribution that is near uniform with some variation possible due to stochasticity and a tendency for alignment of reinforcements along the center of the printer filament. Depending on the exact processing method employed, the distribution can vary. This uniformity is highly beneficial in that the structure enables many other aspects of the additive manufacturing process to work effectively including the part 48 optimization and simulation processes. Simply having fiber filaments surrounded by a polymer matrix 114 (see the core shell definition provided in reference to FIG. 11) does not suffice, not only because the core shell structure does not allow one to consider a unit cell building block approach in computational models, but because the core shell structure is also detrimental to any part 48 produced. This uniformity of fiber filaments 111 or other reinforcements, where the polymer fills nearly all of the space beneficially allows for the shear force to transfer loads from the weaker matrix to the stronger reinforcement or fiber filament within a part 48, and the complete saturation of the fiber filaments 111 with polymer 114 helps prevent concentrated point stresses that might otherwise result in part damage under impact, compression, or repeated loading that causes fatigue.

Figure 33:
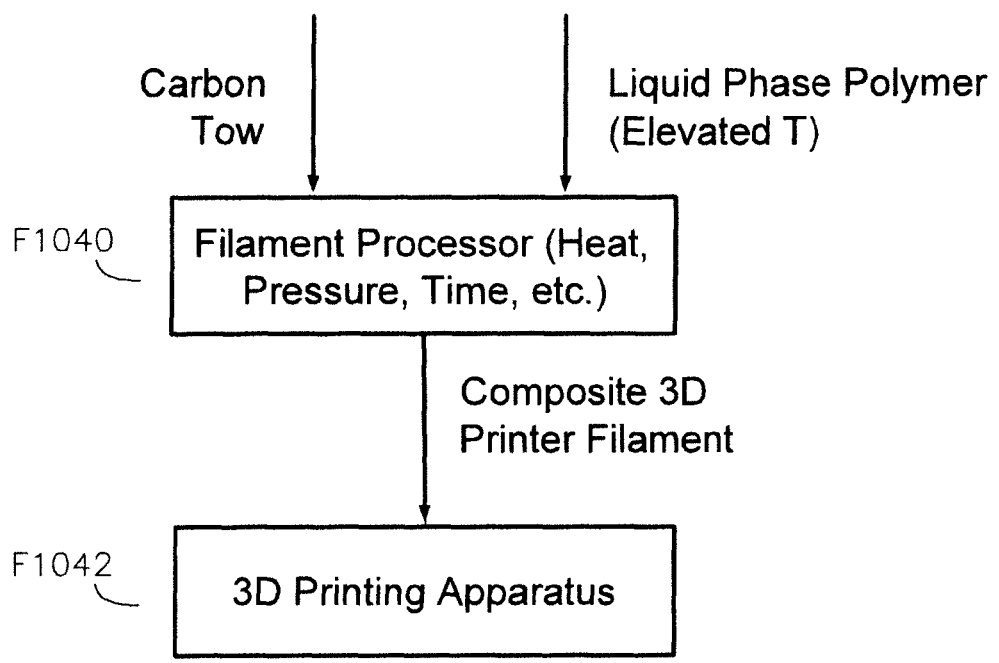
FIG. 33 is a flow diagram for a composite printer filament production method in accordance with one embodiment of the present invention.

Referring next to FIG. 33, shown is a flowchart comprising labeled boxes 600 and arrows 800, as well as words near arrows. The labels and words are specified in the structure.

The connections between the boxes 600 are shown to define a process and words next to arrows 800 specify the form of the material at each stage. The first set of words are 'carbon tow' and 'liquid phase polymer (elevated T)', which each serve as inputs for the filament processor (heat, pressure, time, etc.) 1040. 'Carbon tow' and 'liquid phase polymer' should more generally be taken to mean ' fiber tow'. The filament processor generates a composite three-dimensional printer filament, and feeds it to three dimensional printing apparatus 1042 (another term for additive manufacturing machine), where the arrow is labeled with the phrase 'composite 3D printer filament 112' (another term for consolidated printer filament 112).

The filament processor step 1040 can include a plurality of rollers to guide the tow or printer filament 14, some of which can be conically shaped with positive curvature outward normal in order to most effectively spread the fiber tow. The rollers can have various openings that allow the polymer to permeate the tow from the roller side.

In operation, this flowchart represents a consolidated printer filament 112 production method that combines a polymer in a liquid state with a fiber 312 tow. A liquid state in this case will not be defined such that the definition would require a phase transition since amorphous thermoplastics considered do not undergo cold-crystallization in which case melting is ill-defined or must be assigned an imprecise value. The exact embodiment of this process can vary. One method is to have a bath of molten polymer with the fiber 312 tow passing through the bath. The rollers over which the printer filament 112 passes may beneficially reduce the distance the polymer in the melt must travel to thoroughly wet all fiber filaments within the fiber 312 tow. When exiting the polymer bath, the consolidated printer filament 112 can pass through a constriction to remove excess polymer and to form a cylindrical cross section so the printer filament 112 is ready to go to the printer.

A flattened cross-section can also be used for ease of winding since in any consolidated printer filament 112 manufacture process it could be beneficial to wind the consolidated printer filament 112 and later feed the printer filament 112 to the printer than having the consolidate printer filament 112 fabricated as the printer is running. Another configuration that directly combines molten polymer with fiber tow 388 is that of a modified extrusion process. In this method the fiber tow 388 is pulled through a constriction while the molten polymer is added circumferentially with pressure. Any of these methods would result in a consolidated printer filament 112 that has a uniform distribution of fiber filaments within the polymer matrix 114. This last method is beneficial in that achieving sufficient wetting to have this uniform distribution with a consolidated printer filament of the diameter that is desirable for the additive manufacturing machines described occurs quickly enough at reasonable temperatures and pressure to allow much faster linear tow speeds than when using much larger or multiple combined tows. This is beneficial in maintaining a sufficient throughput volume for economic viability.

Figure 34:
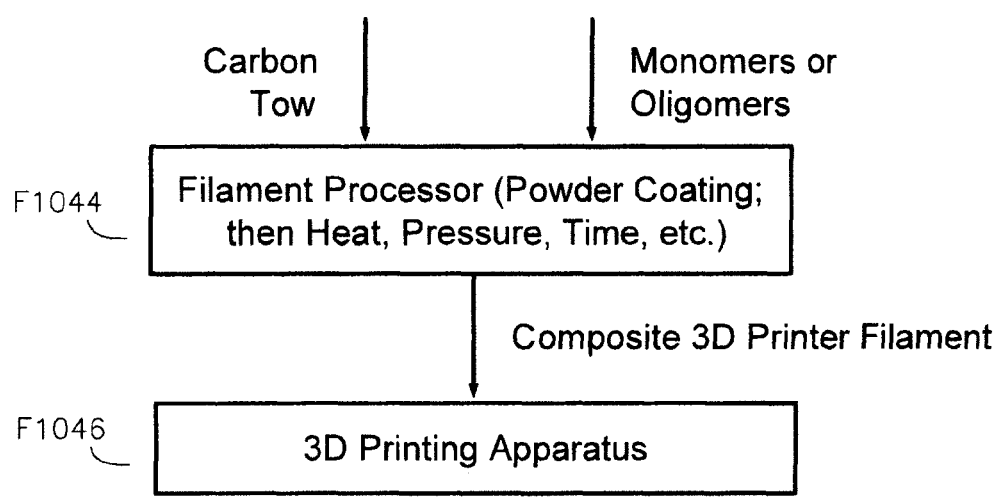
FIG. 34 is a flow diagram for a composite printer filament production method in accordance with another embodiment of the present invention.

Referring next to FIG. 34, shown is a flowchart comprising labeled boxes 600 and arrows 800, as well as words near arrows. The labels and words are specified in the structure.

The connections between the boxes 600 are shown to define a process flowchart and words next to arrows 800 specify the form of the material at each stage. The first set of words are 'carbon tow' and 'powdered polymer', which are inputs to a filament processor (heat, pressure, time, etc.) 1044. 'Carbon tow' can, more generally, be taken to mean 'fiber tow'. The output of the filament processor 1044 generates a 'composite three-dimensional printer filament 14' or composite printer filament that is input to the three-dimensional printing apparatus 1046 (another term for additive manufacturing machine).

In operation, this is a process for filament production that can be implemented in two methods. Both methods result in a fiber 312 tow that has small polymer particles distributed throughout in the desirable volume ratios as an intermediate step. After this step, heat and pressure are used to melt these particles, which, already being fairly uniformly distributed, allow rapid consolidation of the filament into the final form of uniformly distributed fiber filaments within a polymer matrix 114. In one method, particles are sprayed or adhered electrostatically to the tow. During this coating process, the tow can be passed over rollers 308, 310 that expose a greater number of the tow filaments to direct contact with the particles. The other method involves having the polymer particles in a low-temperature fluid medium or a solvent, in which case it may be incorrect to describe the polymer material as being particulate. The tow passes through this fluid and polymer adheres to the tow. Subsequently, the fluid or solvent medium might need to be removed to achieve optimal properties. The powder coating that occurs in air or other gaseous environment is beneficial in that there is no need to remove any residual solvent.

Figure 35:
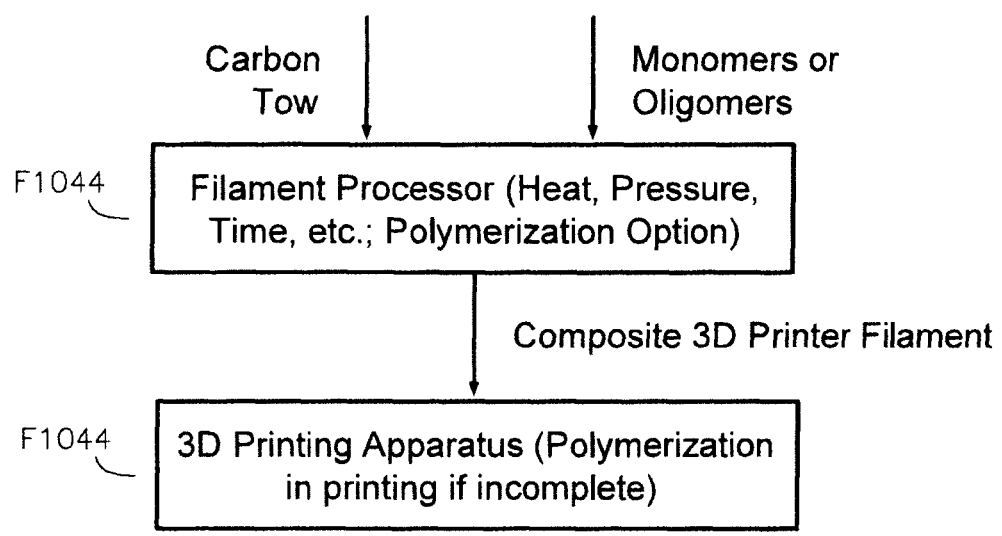
FIG. 35 is a flow diagram for a composite printer filament production method in accordance with yet another embodiment of the present invention.

Referring next to FIG. 35, shown is a flowchart comprising labeled boxes 6000 and arrows 800, as well as words near arrows. The labels and words are specified in the structure.

The connections between the boxes 600 are shown to define a process flowchart and words next to arrows specify the form of the material at each stage. The first set of words are 'carbon tow' and 'monomers or oligomers', which each serve as inputs to a filament processor (heat, pressure, time, etc.; polymerization option) 1044. 'Carbon tow' can more generally be taken to mean 'fiber tow'. The output of the filament processor 1044 is a composite three-dimensional printer filament, which serves as an input to the three-dimensional printing apparatus (polymerization in printing if incomplete) 1046 (another term for additive manufacturing machine).

The final method suggested for fiber filaments 90, involves oligomers and/or monomers. The methods to utilize these materials instead of polymers is similar to the ones mentioned above and is a combination of the different elements from those methods. However, there are many benefits from not beginning with a polymer. What is common among all these processing methods is the application of heat and pressure for some amount of time somewhere in the process. These are the physical processes generally needed to effectively form the final consolidated printer filament 112. The heat and pressure must be sustained such that all or most of the fiber filaments are effectively permeated with polymer 114 and the limiting factor for this process can be the inherent high viscosity of thermoplastic polymers.

Oligomers and monomers on the other hand are beneficial since those pre-polymeric materials can have orders of magnitudes lower viscosity and easily wet out the fiber filaments such that there is a uniform, albeit heterogeneous (since reinforced printer filament 14 and consolidated printer filament 14 are composite materials), distribution looking at the cross section. Once the fiber tow 388 has an even distribution of oligomers and/or monomers with the correct weight ratio, heat and pressure may be applied to form the final consolidated printer filament 114. The step with heat application sees the oligomers and monomers polymerize, and the materials is then a polymer of similar or identical characteristics to those typically used in non-reactive processing methods. This can be beneficial in reducing the processing time or resulting in a better final consolidated printer filament 14 than is possible by any other method. Furthermore, this processing method could be the most beneficial for in-situ consolidated printer filament formation where the step from unconsolidated printer filament to consolidated printer filament 112 is directly integrated into the additive manufacturing machine rather than spooling the material onto creels and later unspooling the printer filament as the printer filament feeds into the printer.

Referring next to FIG. 36, shown are several polymeric molecules 360. Shown are molecular bonds 362. Shown are a pair of arrows 364 with labels.

The arrow labels represent increasing or decreasing temperatures. The system shown on the left and right are the same and the arrows indicate transitioning from one state to another. Molecular bonds 362 in between the polymer chains is only shown on the right. It should be noted that this diagram is not meant to be an accurate scientific representation of a polymer system, rather it highlights one aspect of polymer systems for which this representation is not too abstract.

In operation, this shows a system that exhibits properties of both thermoset and thermoplastic polymers, which are typically considered non-overlapping classes of materials. However, there is no inherent reason a hybrid system could not exist and such a system would have many benefits. In a thermoplastic, the molecular structure maintains the appearance of the image on the left, where the polymers are held together by intermolecular forces rather than covalent bonds. As the temperature rises, the kinetic energy exceeds that of the intermolecular forces and these molecules begin to slide past each other in a liquid-like state. When the system cools, the polymer re-solidifies. Provided that the temperature reached is not excessive, this heating cycle can be repeated many times with virtually no damage to the polymers. On the other hand, thermosets undergo a permanent chemical reaction where covalent bonds connect the polymer chains together. After this reaction, the thermoset cannot be re-melted. Thermosets often exhibit beneficial properties such as higher hardness and strength. Furthermore, thermosets often have a very low viscosity before curing (3 orders of magnitude lower than thermoplastics, typically). Thermoplastics have the benefit of reprocess ability, which is beneficial when one might want one processing step that forms a consolidated printer filament 14, and then a subsequent step of additive manufacturing.

In operation, the system shown achieves the benefits of both thermosets and thermoplastics. As the temperature decreases as indicated by the arrow pointing right, covalent bonds form between the polymer chains. However, as the temperature rises, as indicated by the leftward pointing arrow, the covalent bonds break allowing the polymer system to enter a liquid-like state instead of burning as would be the case with a standard thermoset. FIG. 37 through FIG. 41 show in more detail how such a polymer system might be applied to additive manufacturing systems that include reinforcement. The polymer chemistry is only one component, therefore aspects of applications of these reversibly-thermosetting polymers are contemplated as they can be implemented in additive manufacturing systems in a general sense are also described within these figures.

In additive manufacturing, printer filament 14 connect to each other to form a part. As described in FIG. 2, the segment of lament being added from the nozzle 10 connects to the subset of the part that can be found on the build plate 42, having already been fed from the nozzle 10. The most recent segment of printer filament 14, as it exits the nozzle 10, is at a higher temperature than the solid 'sub-part' it connects to. When this segment of printer filament 14, which is typically in a molten state, contacts the sub-part, heat transfers from the most recently fed printer filament 14 to the section of the sub-part with which it makes contact. In this contact area, the heat transfer is often sufficient to melt the surface of the sub-part such that the recently fed printer filament 14 bonds to the sub-part, which is the iterative process by which the part forms. However, as previously contemplated, this thermal bond is not as strong as those bonds within the bulk of the polymer within the printer filament 14. Having a sufficiently strong inter-printer-filament bond is of greater benefit for the higher performance reinforced printer filaments and consolidated printer filaments described herein because this inter-laminar bond can become a limiting factor that prevents attainment of the higher performance properties. For a printer filament 14 of a typical thermoplastic polymer, a temperature hot enough for perfect bonding that is also feasible from a mechanical and thermal degradation perspective does not exist. This impossibility to achieve a perfect bond is due to the large size of thermoplastic polymers and that the bonding process, known as reptation, requires the polymer chains to move and intertangle substantially. This has long been a problem facing additive manufacturing, especially when reinforcing materials are used.

In contemplating the prior paragraph, lower viscosity is not the sole benefit of applying reversibly-thermosetting polymers to the additive manufacturing systems described. Reversibly-thermosetting polymers, have attributes of thermosets that include lower molecular weight and their bonding process is different than that of thermoplastics. Instead of needing to reptate, or intertwine long chains as in a thermoplastic, reversibly-thermosetting polymers can form covalent bonds at the interface that have comparable properties to the bulk of the polymer. This 'complete bonding' would occur when the printer filament 14 contacts the sub-part. The kinetics are orders of magnitude apart. The complete bonding of reversible-thermosetting based printer filament 14 would beneficially allow more useful implementations of reinforcing materials in additive manufacturing. One of the properties that quantifies this effect is interfacial shear strength, which is known to be lower in thermoplastic composites that are additively manufactured than those thermoplastic composites produced by other methods such as press forming.

Another problem posed by the high viscosity of thermoplastics is that additively manufactured parts comprising thermoplastic materials contain voids between the individual printer filament 14. As with imperfect bonding, voids are most detrimental when one wants to improve performance with reinforcement because voids can create a limiting factor. Reversibly-thermosetting polymer in printer filament 14 can beneficially address this problem by more effectively filling these voids and lower the overall void percentage of the final part.

There are potentially several other benefits from using reversibly-thermosetting polymers for the described applications. Thermoset parts are more effective than thermoplastic at preventing creep, which is one of the major factors limiting their use in high performance composites applications. Furthermore, reversibly-thermoset parts could be recycled with far more ease than thermoplastics especially if a discontinuous as opposed to continuous reinforcement is implemented. For the same reason that reversibly-thermoset based parts could more easily be recycled, those parts could also be reformed into new shapes more easily. Another benefit is that the fusion welding reinforced or unreinforced additively manufactured parts comprising a reversibly-thermosetting polymer would be more effective and easier to implement than with thermoplastics. Fusion welding is essentially what occurs in additive manufacturing at a small scale so this would make sense. Fusion welding is beneficial since it removes the need for fasteners 74, which increases integrity and performance of the overall structure. Furthermore, fusion welding is even more beneficial for composites since their properties decrease at attachment points due to joints such as those involving holes or fasteners more so than metal alloys. It is also contemplated that all the aforementioned benefits can also apply to injection molded parts comprising short reinforcements in a reversibly-thermosetting matrix material.

Figure 37:
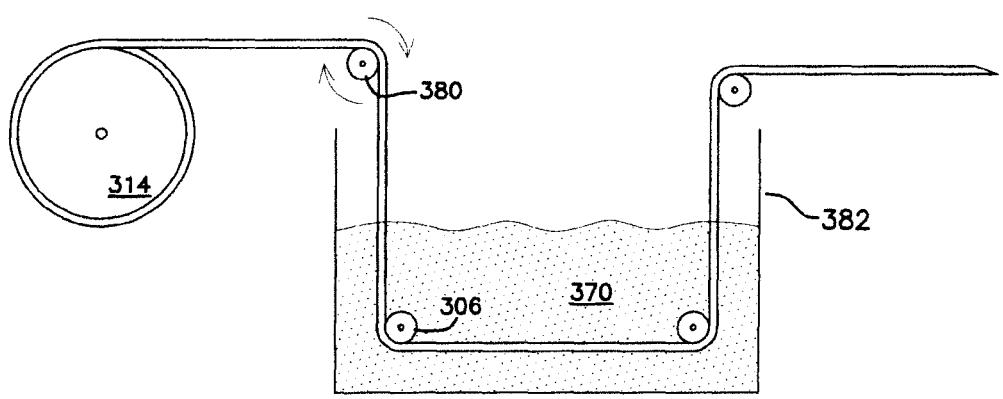
FIG. 37 is a cross sectional view of a segment fiber tow from a creel passing through a fluid medium in a container in accordance with one embodiment of the present invention.

Referring next to FIG. 37 is a cross sectional view of a creel 314 of fiber tow as well as a segment of the fiber tow, a container 382, a fluid medium 370, and a plurality of rollers 380.

The segment of fiber tow is connected to the creel 314, and passes over each roller 380. The container 382 holds the fluid medium 370, and in passing over the rollers, the fiber tow segment passes through the fluid medium 370.

In operation, the container 382 heats the fluid to an elevated temperature that is a compromise between optimizing fluidity and polymer degradation since the fluid is a polymer bath. The fiber tow can be a carbon fiber tow, and for this process multiple creels can be combined such that there are more total fiber tows in each bundle. A single fiber tow of a lower fiber filament count is more likely to be implemented when the subsequent consolidated printer filament 112 is to be used directly in an additive manufacturing machine. Some of the benefits of consolidated printer filament 112 as opposed to reinforced printer filament 398 have been stated, but this polymer also allows an increase in beneficial applications that utilize short reinforcement 90. Larger tows or multiple tows are more likely to be used if the output of this process is used to make a reinforced printer filament 398 that utilizes a polymer of the type described in FIG. 36.

This seems similar to an implementation of that which was suggested in FIG. 33, however it is different in that this process is an implementation that uses the polymer described in FIG. 36. Using this polymer has several benefits. The lower viscosity is beneficial in allowing the fiber filaments to be wet out more easily by the polymer. This means the process can be improved. It is also possible to lower the tension in pulling the fiber filaments over rollers since less tow spreading might be needed for the polymer to fully permeate the tow. This is beneficial in reducing the probability of fiber filament damage. Furthermore, it might be easier to reach the temperature to enable fully wetting the tow without a risk of heat degradation of the polymer. Another benefit is that since wetting out would occur much more rapidly, the entire process can be accelerated to achieve higher throughput.

Figure 38:
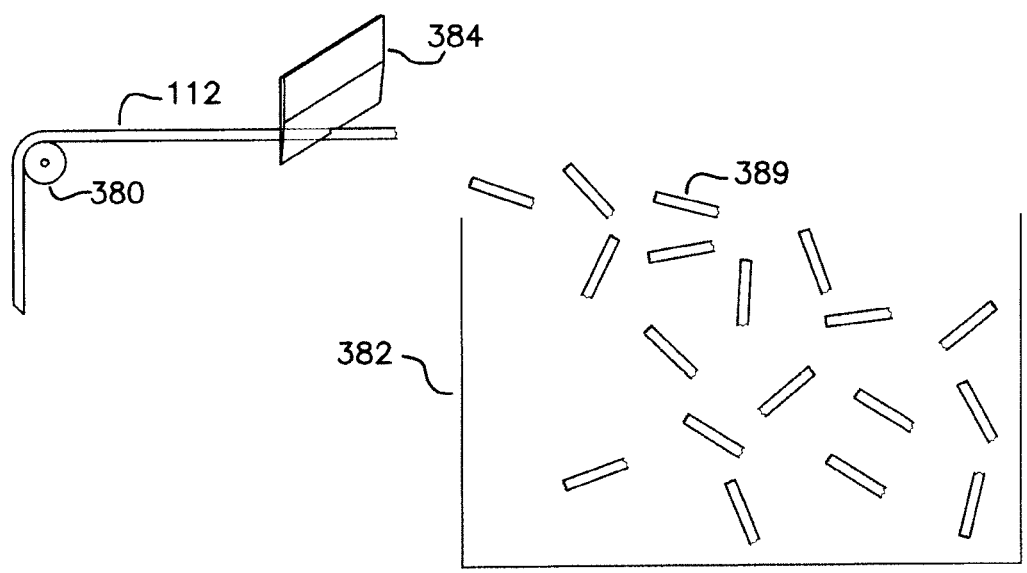
FIG. 38 is a schematic view of a last part of the fiber tow segment of FIG. 37.

Referring next to FIG. 38, a schematic view is shown including a last part of the fiber tow segment from FIG. 37. Since this fiber tow is that of FIG. 37, which has been wet out with polymer 114, it is technically a consolidated printer filament 112, although for this method the printer filament 112 might be of a larger diameter than would desirable were the printer filament 112 to be used directly in an additive manufacturing machine. Shown is a roller 380. Shown is a cutting blade 384. Shown are a plurality of short pieces 389 of the consolidated printer filament 112. Shown is a container 382.

The end of the consolidated printer filament 112 is passing over the roller 380. The cutting blade 384 is near the end of the consolidated fiber filament. The chopped pieces 389 are in front of the cutting blade and most of them are within the container 382.

In operation, this represents an addition to the process from the prior image where instead of spooling continuous fibers onto creel 316, the fiber is cut into short pieces 389 that might be collected in a container 382. This is a method by which one would obtain a reinforced printer filament 112 instead of a consolidated printer filament 398. Reinforced printer filament 398 are beneficial since those printer filaments can be used with additive manufacturing machines that have nozzle 10 ends with a diameter smaller than the diameter of the printer filament. The length of these pieces (or pellets) can be varied depending on ideal processing parameters. Their diameter is determined in the method of FIG. 37 which can be estimated four factors: total filaments in all tows that get brought together (can be as few as one), overall fiber volume percent, and the densities of the constituent materials. These pellets contain reinforcements that are discontinuous fibers as implied by FIG. 37 involving fiber tows, and it is feasible to have the discontinuous fiber be several times longer than the critical length, which has the benefit of maintaining most of the mechanical properties that continuous properties exhibit. Pellets of the polymer of FIG. 36 produced by methods other than that of FIG. 37 that comprise other reinforcement can also be beneficial for FIG. 39 and FIG. 40, which follow.

Figure 39:
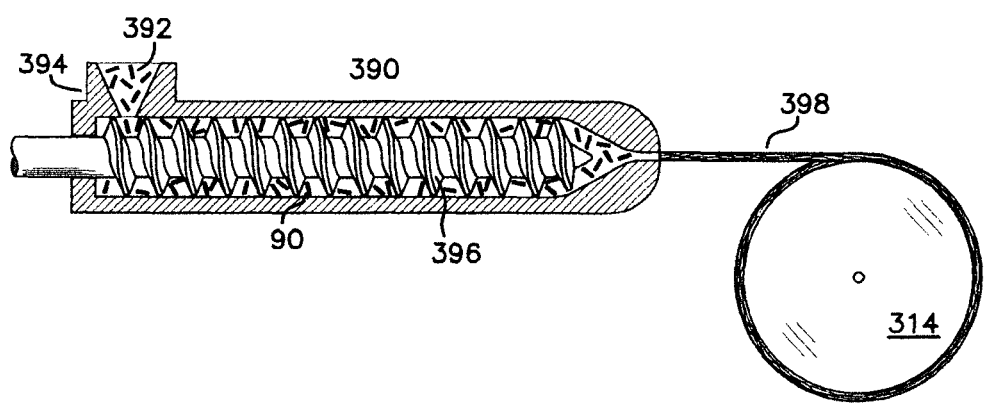
FIG. 39 is a cross-sectional schematic view of a constant diameter screw extrusion machine in accordance with one embodiment of the present invention.

Referring next to FIG. 39, a cross-sectional schematic view is shown including a constant diameter screw extrusion machine 390, pellets 392, a hopper 394, a screw 396, short reinforcements 90, reinforced printer filament 398, a reel 314, and an outer piece of the extrusion machine.

Some of the short reinforcements 90 are in the pellets 392, others are suspended within the fluid in the extrusion machine 390, and others are in the reinforced printer filament 398. The outer part of the extrusion machine 390 surrounds the fluid and has a screw 396 in the middle. The hopper 394 is positioned on one end of the apparatus and contains the pellets 392. The other end of the apparatus has the reinforced printer filament 398 and the creel 314. In between, the pellets 392 become the melt pool containing short reinforcements within the extrusion machine.

The general process by which one would make a reinforced printer filament 398 is shown. This process is a representation and various other components either can optionally be included such as heater bands, a cooling bath, sensors, controllers, winders, etc. The hopper allows pellets to fall into the screw mechanism as space becomes available between threads. The pellets can be produced with a process of the type described in FIG. 35. The screw tapers as shown. This taper crushes the pellets against the inner walls of the extrusion machine. If the screw doesn't taper, the flutes/threads of the screw can provide sufficient pressure to crush the pellets. The screw is rotated to feed the pellets along a pipe. The end of this pipe has a hole that can vary in diameter. This hole is designed to produce the shape of a filament or object. Extrusion machines operate such that this crushing of pellets that creates viscous shear forces causes the majority of melting, and any heater bands contribute a much smaller amount of heat. This has many benefits for the ease of injection molding and reinforced printer filament 398 production.

However, the introduction of reinforcement in injection molding and printer filament production is often less effective than desired. These viscous shear forces that melt the pellets through crushing are highly deleterious to the short reinforcement and are known to cause length attrition when the reinforcements are fibers. The average fiber length coming out can be an order of magnitude lower than that going in. The shorter fibers results in significantly worse material properties than would be attained were the length of the fibers to be preserved. However, since it is the viscous shear that induces fiber damage, lower viscosity is highly beneficial. Therefore, by using the pellets of FIG. 37, that utilize the polymer of FIG. 36, it is possible to both produce reinforced printer filament 14 for additive manufacturing as well as injection mold parts, with fiber reinforcement where there is a substantially less fiber length attrition, due to the far lower viscous shear force required in processing. This means injection molded and three dimensional printed parts can be made with strength, stiffness, and other properties, several times better than the state of the art. Furthermore, if there were any other polymer with a sufficiently low viscosity, it could also be used in this process.

Figure 40:
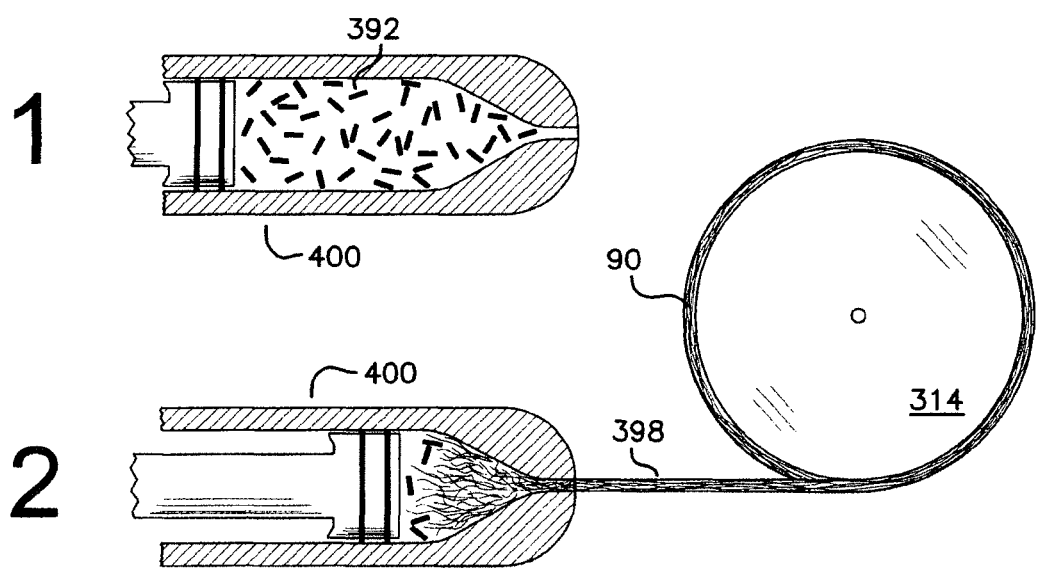
FIG. 40 is a cross-sectional schematic view of a pressure-based extruder shown at two different times in accordance with one embodiment of the present invention.

Referring next to FIG. 40, shown is a cross-sectional schematic view of a pressure-based extruder 400. Shown are pellets 392, numbers '1' and '2,' a pressure-based extruder, short reinforcements 90, a melt pool, a reinforced printer filament 298 and a creel 314.

The numbers are shown adjacent to the apparatus at times '1' and '2'. In the top image, pellets 392 are within the pressure-based extruder and the majority of the pellets 392 are still within a pressure-containing volume. In the lower image, the pressure has caused the short reinforcements shown to form a profile in front of the pressure chamber. This pressure can be applied using a piston, bladder, viscous fluid, or any method of applying pressure that causes the pellet-derived-melt-tow to tow from the tip of the extruder. Reinforced printer filament 398 extends outward from the end of the extruder, and is shown spooled onto a reel 314.

In operation, the pressure-based extruder extrudes reinforced printer filament 398 for additive manufacturing. This style of process can be used similarly to that of FIG. 39. This process has the benefit of not using a screw mechanism. In this system a greater amount of heat can be delivered through conduction. Microwave or other forms of radiation are also contemplated in accordance with other embodiments. The pressure-based extruder is not as effective as screw-extruders for injection molding with typical thermoplastics, which is why the piston-extruder is not typically used, but since reinforced printer filament 398 production requires pushing material through at a volume 180 four orders of magnitude slower than in injection molding, it makes sense to consider the benefits of producing reinforced printer filament 398 with a piston style extruder if fibers are being used for the short reinforcement. If a low melt-viscosity polymer such as that of FIG. 36 is used, it is possible to obtain reinforced printer filament 398 with even less fiber length attrition than by the process described in FIG. 39. If this process is used with an ordinary high melt-viscosity thermoplastic, it is possible to also prevent a large amount of the fiber length attrition associated with the screw process. It is beneficial to be able to use thermoplastic polymers with a lower viscosity. Typically, in polymer science, any polymer composition is a compromise among various properties and thus each engineering application may require a unique composition. It is also contemplated that embodiments of the piston based extruder, rather than producing filament for printing, could be directly integrated into a large-format additive manufacturing machine where it would operate as a nozzle, which beneficially allows for increased material deposition rates and a more integrated overall system.

Figure 41:
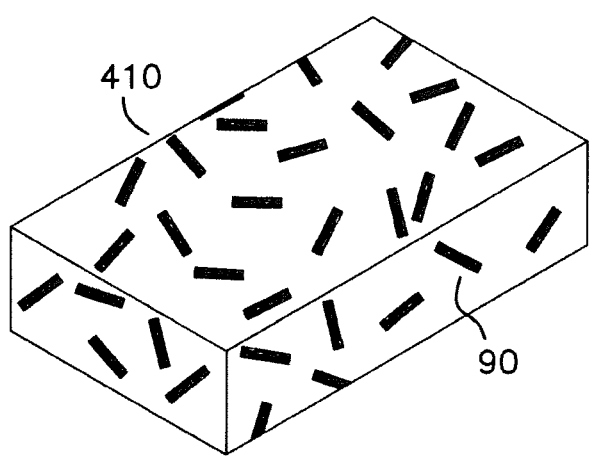
FIG. 41 is a perspective view of a matrix block in accordance with one embodiment of the present invention.

Referring next to FIG. 41, a perspective view is shown of a matrix block 410, and reinforcement fibers 90 that can also be whiskers 412 or reinforcement materials of other morphologies. Reinforcement fibers 90 are contemplated in their general sense as described in FIG. 9.

The reinforcement fibers 90 are distributed throughout the matrix of the fiber matrix block 410.

The fiber matrix block 410 represents a fiber matrix composite produced by additive manufacturing, but the fiber matrix block 410 is fundamentally different from the fiber reinforced polymer composite previously described in FIG. 18. The fiber matrix block 410 is not a polymer matrix composite, but a ceramic matrix composite. Ceramics are beneficial in withstanding extremely high temperature and pressure while retaining hardness and other properties, which makes ceramics among the most refractory materials. Their refractoriness is many times higher than metallic alloys and even more times higher than polymers, which have low refractoriness. Composites with a variety of matrix materials are often beneficial in engineered systems, and it is beneficial to utilize both ceramic matrix composites and polymer matrix 114 composites in similar additive manufacturing platforms. It is possible to three-dimensionally print ceramics by mixing a ceramic powder into a polymer and then baking the final structure, but this results in porosity, which limits the applications. Porous ceramics have poor mechanical properties including strength and damage tolerance. Fully dense ceramics are beneficial for engineering application, whereas porous ceramics are not suitable for much more than dinner plates.

FIG. 35 points out how one could additively manufacture with monomers or oligomers instead of polymers. Monomers could contain the primary elements or molecules that are precursors to ceramics. These would become pre-ceramics polymers prior to becoming ceramics. One would print this material into a complex structure. That structure could be baked at a high temperature, which would remove the functional groups and leave a high-performance ceramic that is virtually free of porosity.

However, to truly capture the benefits of ceramics, one can utilize various aspects of fiber reinforcement described herein. While one might utilize different fiber materials and other fiber forms such as whiskers 412, the principles are the same. Being able to three-dimensional print high performance ceramic matrix composites is highly beneficial and is a good complement to polymer matrix 114 composites within complex multi-material systems. If one generalizes this concept further, it shows that the principles of substituting novel constituent materials into the processes described herein can apply to virtually any materials that can be three dimensional printed in a similar fashion to fused deposition modeling. As new materials are developed, whether matrix or reinforcement, the systems and methods described herein provide a straightforward path by which the additive manufacturing systems can beneficially move from lab to industrial scale manufacturing through a universal and highly adaptable processing system. It is contemplated that the use of multiple materials could be extended to a more general automated manufacturing process that includes components such as sensors that could even be built directly out of the constituent materials.

Another embodiment to produce ceramic matrix composites would be with a UV-curing pre-ceramic oligomeric, monomeric, or polymeric bath three-dimensional printer with the addition of short reinforcements that can be suspended in the bath. It is contemplated that such a ceramic composites additive manufacturing machine would not function for all embodiments of UV-curing-based three-dimensional printing methods known in the art since the short reinforcement could block the UV radiation, preventing polymerization of the polymer in its 'shadow', particularly if a self-propagating waveguide is used instead of polymerizing only the layer of the bath near the surface as the upside-down platform moves upward.

Figure 42:
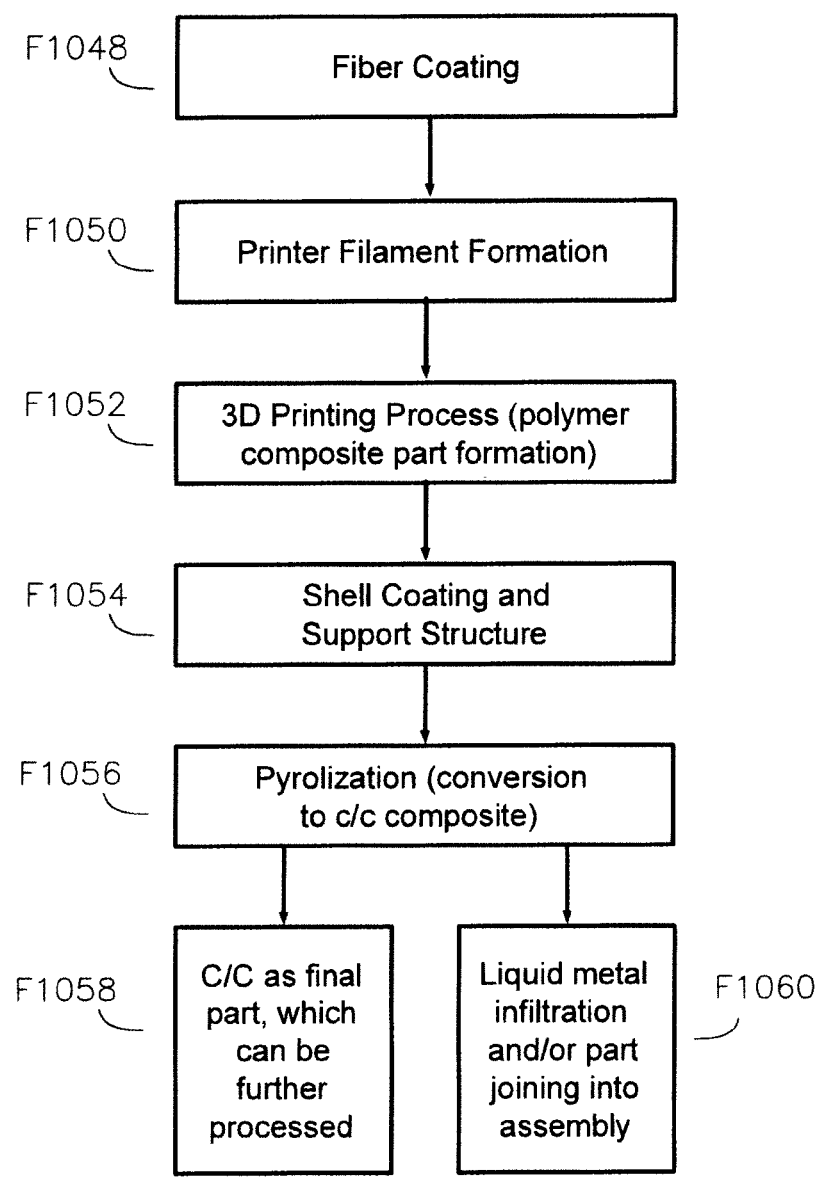
FIG. 42 is a flow diagram for a set of processes for converting a polymer matrix composite into a ceramic matrix composite in accordance with one embodiment of the present invention.

Referring next to FIG. 42, a flowchart is shown having a plurality of boxes connected by arrows.

The boxes each contain a set of operations and the arrow connectors indicate the ordering of these sets of operations.

In operation, this figure demonstrates the overall set of processes that can be used to convert a polymer matrix composite into a ceramic matrix composite. It is particularly beneficial for carbon fiber reinforced thermoplastic parts, including those that are three dimensional printed with the methods described herein.

Ceramic matrix composites operate differently from polymer matrix composites at a fundamental micromechanical level. In polymer matrix composites, loads are transferred from the weak and ductile matrix material to the strong, stiff, and brittle fibers, and these loads are transferred at the fiber matrix interface through shear stresses. Therefore, polymer matrix composites benefit from a strong interfacial shear strength. Ceramic matrix composites have a matrix that is also strong, stiff, and brittle. The ceramic matrix of a ceramic matrix composite can take a useful load and the fibers serve the different purpose of bridging cracks, which would otherwise cause the material to fail at much lower loads. Therefore, it is beneficial for the ceramic matrix composite to have a weak fiber matrix interface that allows the matrix to slip from the fiber. This prevents the material from becoming a monolithic ceramic. This necessitates a coating for treatment to the carbon fiber prior to it being formed into a printer filament. Coating and fiber treatment methods are disclosed in detail in FIG. 43.

The following step of forming a suitable printer filament can be accomplished with the same methods as those described in other figures. The only notable difference is that when the coating is thick enough that the bend radius is significantly reduced, printer filaments with the reinforcements being discontinuous can be beneficial since it allows sharp angles in the movement of the printer head during a three-dimensional printing operation without breaking or otherwise damaging the printer filament as could occur with a higher bending radius continuous reinforced printer filament.

Once the printer filament is produced, a polymer composite part is formed by any of the three-dimensional printing methods described herein.

Pyrolization can be used to convert a polymer matrix composite into a carbon ceramic matrix composite. Pyrolization involves heating the polymer matrix composite, and pyrolization occurs at a higher temperature than the glass transition temperature and higher than the melting temperature. With a thermoset-based polymer matrix composite this is not a problem since melting does not occur due to the crosslinked molecular structure. Therefore, it can be beneficial to include another step prior to pyrolization in which a non-thermoplastic coating is applied to the thermoplastic part to prevent part deformation from melting during pyrolization. This coating process and the subsequent pyrolization is disclosed in detail in FIG. 44.

After pyrolization, the resultant material is a carbon carbon ceramic matrix composite. Following this, the carbon carbon composite can be used as is, which may involve several subsequent processes that can be beneficial depending on the application. Some of these processes might require novel modifications due to the variations between typical carbon composites and those produced with the methods described herein. Alternatively, it might often be beneficial to carry out liquid metal infiltration on these carbon carbon parts, which requires multiple novel elements as disclosed in FIG. 45, due to the novel method that is used to form the initial carbon carbon composite.

Aside from minor operations such as machining in between certain steps, this process outlines an entirely novel and complete manufacturing process to obtain ceramic matrix composite parts and structures. The combination of all these processing methods poses numerous benefits with consideration both to the performance and properties of individual parts, and to the viability of complex systems and assemblies that hitherto have not been realizable due to economic or engineering factors.

Considering the attainable properties at the part level, many of the benefits are similar to those disclosed for polymer composite parts. Currently, ceramic composite parts have the same limitations in fiber orientations as polymer composites, but this system enables a vast design space with consideration for fiber orientation. Furthermore, whereas moderate geometric complexity is possible in polymer composites, ceramic composites have even more manufacturing limitations resulting in even lower levels of geometric complexity. This process enables an even larger jump in complexity in ceramic composites than that of polymer composites. Due to the aforementioned micromechanical slip-model with crack bridging/arresting in ceramic matrix composites, the ability to tailor fiber orientations to particular applications could be even more beneficial than in polymer composites. In addition to improved properties related to load-bearing such as strength and toughness, tailored fiber orientation could be implemented to produce parts with near-zero coefficients of thermal expansion at a macro-scale. Very low thermal expansion is beneficial in applications such as satellite components where Invar is currently used. Ceramic composite parts provide the benefit of reduced weight and possibly even lower thermal stability, as well as lower cost. Tailored fiber orientations for toughness can offer one of the largest benefits in ballistic armor applications. Jet engine components could have their weight reduced by switching from super alloys to these components, as could thermal protection systems for hypersonic vehicles, including UAVs and missiles. In both applications, it is beneficial to be able to produce highly complex shapes. Furthermore, this three-dimensional printing process is beneficial by allowing a large number of design iterations due to the absence of the cost for a machined mold. This is particularly useful when implemented in conjunction with the computational methods described herein for part optimization.

Figure 43:
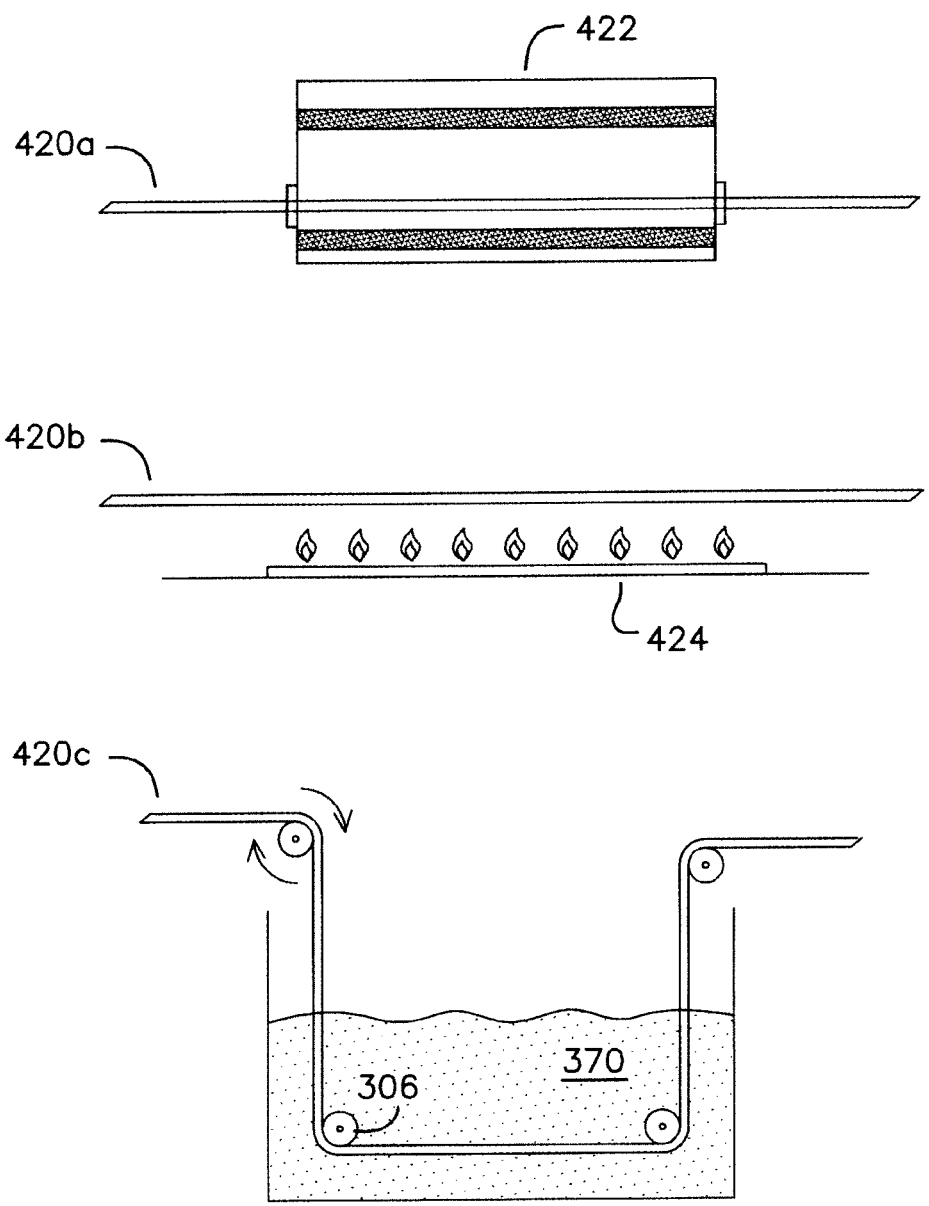
FIG. 43 is a side cross-sectional view showing a fiber tow being passed through an oven, over a flame, and then passing through a liquid in accordance with one embodiment of the present invention.

Referring next to FIG. 43, shown is a side cross-sectional view showing a coating on the carbon filaments prior to consolidating into a continuous filament for the printer. Shown is a fiber tow 420a and an oven 422; shown is a fiber tow 420b and a flame 424; shown is a fiber tow 420c, rollers 308, 310, and a bath 370; arrows are shown.

The fiber tow is shown to pass through the oven; the fiber tow is shown to pass over a flame; the fiber tow runs over the upper lowers and under the lower rollers, allowing it to pass through the liquid in the bath. The fiber tows are bundles of carbon fiber filaments without a matrix material. These could be 1K, 3K, 6K, 12K tows, or some other tow size.

In operation, the fiber tow is passed through an oven; the fiber tow is passed over a flame; rollers are used to pass the fiber tow through a liquid bath. These three operations, independently or in some combination, allow for a large number of methods to apply a coating or treatment to the carbon fiber, but it is not exhaustive.

The liquid bath is a common method for applying a coating that is commonly known as a sizing. A phenolic sizing could form a layer of pyrolytic carbon on the carbon fibers to protect them during liquid metal infiltration. For instance, when silicon is the metal being used, this beneficially prevents the silicon from attacking the carbon fiber itself and keeps the ceramic part from becoming monolithic. If a polymer sizing with a higher percent char residue such as polyarylacetylene is used, there can be an even greater benefit due to a denser layer of protective pyrolytic carbon. Other polymer coatings could be pre-ceramic to obtain interphases at the fiber matrix interface other than pyrolytic carbon. Boron nitride, silicon nitride, and silicon carbide are some of the beneficial coatings that could be obtained during pyrolization with pre-ceramic coatings. A polycarbosilane coating would be a good option for converting the carbon fibers to silicon carbide fibers during pyrolization. The particular coating used is beneficially selected based upon the final application since oxidative damage to some ceramic materials can reduce the maximum use temperature.

Coatings or treatments that are not polymeric or pre-ceramic can benefit from methods other than the liquid bath sizing. The step with a flame can be thought of to represent a wide variety of coating methods that can involve physical deposition, chemical deposition that can be reactive, or a purely reactive process such as oxidation. These processes can occur in air, a vacuum, or inert atmospheres such as nitrogen or argon. For instance, Chemical Vapor Reaction, or CVR, is a method of converting carbon fibers into silicon carbide fibers, which have a silicon carbide coating. CVR is beneficial since it can produce far thinner coatings than those in typical silicon carbide fibers, which allows a lower bend radius, enabling three-dimensional printing of discontinuous or continuous fibers. Other coatings such as boron nitride can also be applied in this process. Part of this figure shows an oven, which can be used in conjunction with the other steps in this figure, but it is meant to emphasis the heat treatment aspect. Heating the fiber can alter the surface, and depending on the atmosphere, this can remove functional groups on the fiber surface. This has the benefit of decreasing interlaminar shear strength in the polymer composites, which can be used instead of an additional fiber coating to reduce interlaminar shear strength in the ceramic composite, although it can also be used as a step that precedes adding a coating to the fiber.

Figure 44:
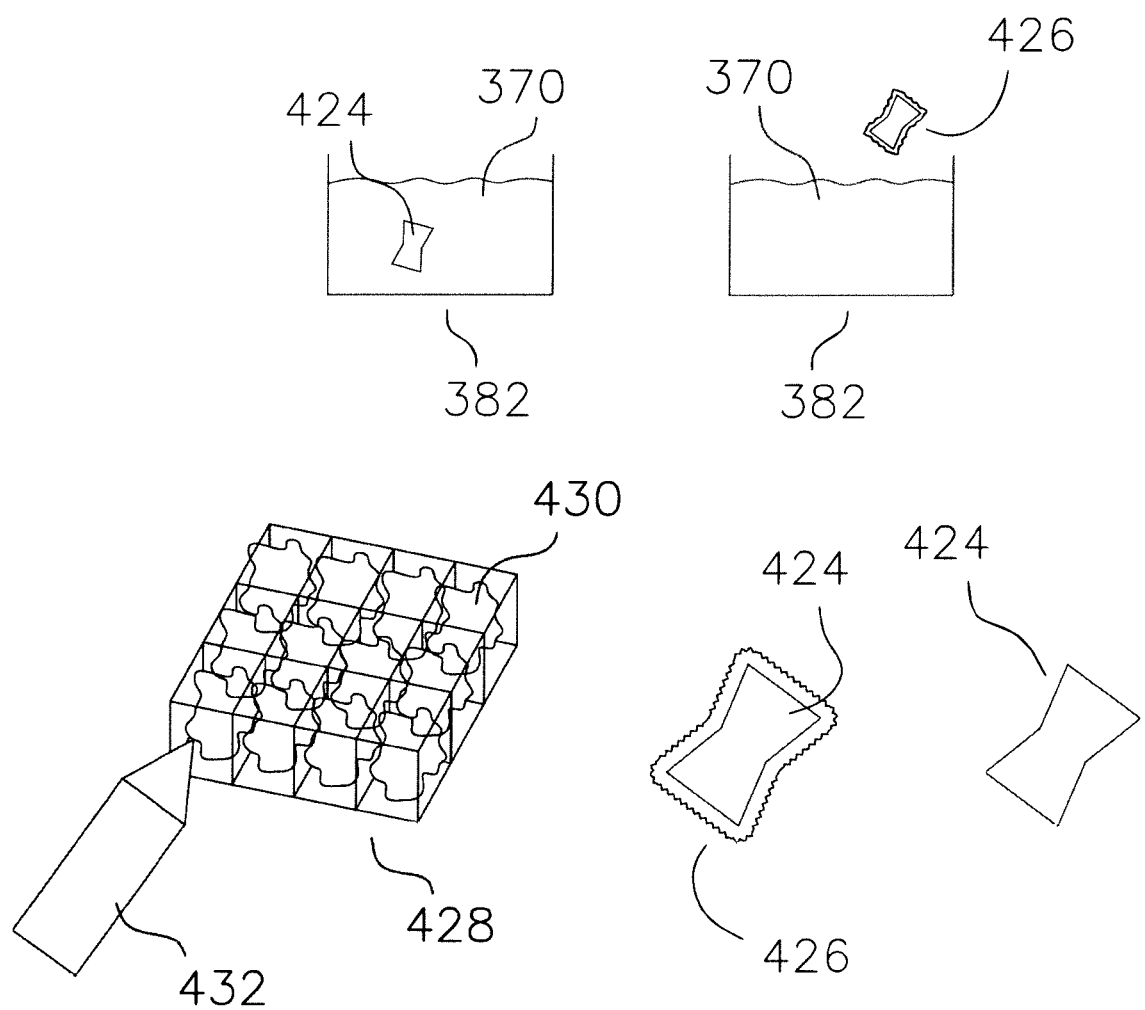
FIG. 44 is a schematic diagram showing a coating applied to a printed polymer composite part, and filling hollow portions with foam, prior to pyrolization in accordance with one embodiment of the present invention.

Referring next to FIG. 44, a schematic diagram is shown showing a coating 428 applied to a printed polymer composite part 424, and filling hollow portions with foam, prior to pyrolization as an option to mitigate part deformation and subsequent removal. Shown is a container 382, a liquid 370, a part 424, and a coating 426 is shown; a honeycomb structure 428, along with foam 430 and an injection nozzle 432 is shown; a part 424 and a coating 426 is shown, and a part 424 without a coating is shown.

The liquid 370 is held in the containers, and the part 424 is initially submerged in the liquid container 382. Subsequently, the part 424 is shown with a residual coating above the surface of the liquid 370. Then a honeycomb structure 428 is shown, which has non-closed cells, each containing foam 430, originating from the injection nozzle 432. Then a coated part 424 is shown followed by an uncoated part 424.

FIG. 44 shows a system for performing the method described in reference to FIG. 42 to prevent part deformation during pyrolization. The initial coating application is one possible method for applying a thermoset coating to the part, which might then require thermal crosslinking. Thermal crosslinking could be a separate step preceding pyrolization, or it could be possible to have the thermoset cure during the pyrolization process. Reactive crosslinking that occurs at standard conditions is also an option. The coating could be a material other than a typical thermosetting polymer. If a refractory material such as a ceramic can instead be applied, it will provide even greater rigidity to prevent deformation during pyrolization, and since the refractory material does not pyrolize along with the polymer matrix material it is easier to remove in the final step where the coating is removed after pyrolization. However, a thermoset polymer coating is beneficial when its contraction during pyrolization can be made to match the contraction of the internal composite part. If the shrinkage rate of the thermoset coating is made to match the composite part during the initial stages of pyrolization, but then decrease could optimally allow for structural support while the thermoplastic is still malleable, but then separate to allow easy removal.

In three-dimensional printing, it is often beneficial to produce hollow internal structures to reduce weight. These sorts of structures are not present in existing ceramic composite parts. There is a risk that during pyrolization the internal structure could collapse or cause deformation. Therefore, it can be beneficial to introduce a lightweight internal support structure. Various foams could be introduced into the structure, which would pyrolize at low temperatures, thus forming a low-density support structure. Once any coatings or foams are applied the part is pyrolized, after which the coating can be broken or machined of, if desired.

Figure 45:
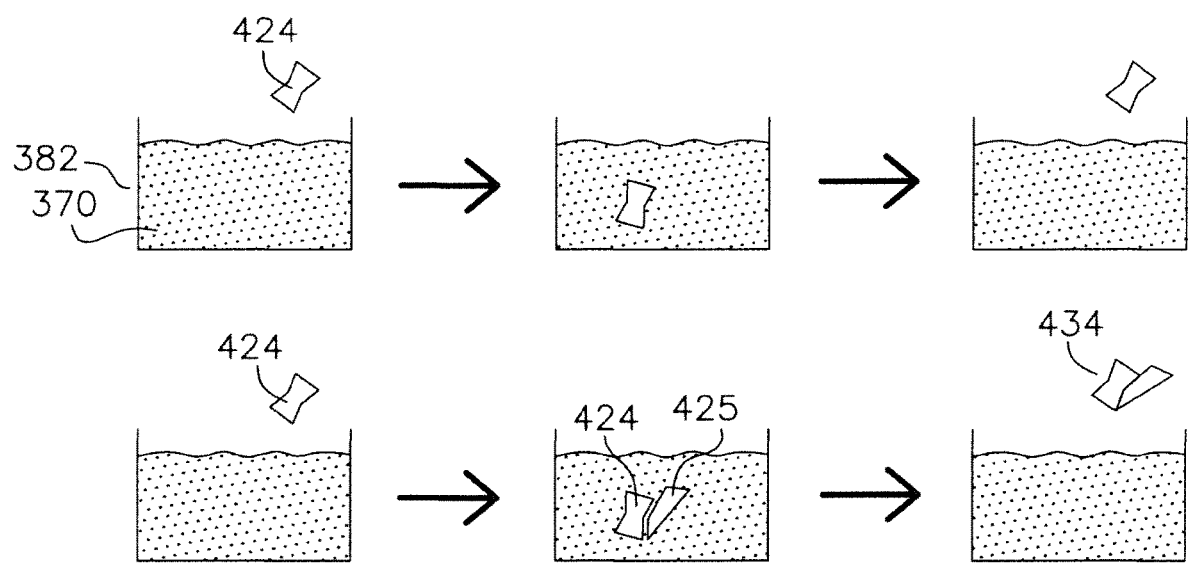
FIG. 45 is a schematic diagram showing infiltration of a pyrolized part with silicon and joining in accordance with one embodiment of the present invention.

Referring next to FIG. 45, a schematic diagram is shown showing infiltration of pyrolized part with silicon and joining. Shown is a part 424, a container 382, and a liquid 370. Shown is an additional part 425 and a joined part 434.

The first diagram in a sequence shows liquid 370 in the container 382 with the part above the liquid 370. Two different steps can follow this one. Either the part 424 is submerged into the liquid 370 or it is submerged into the liquid 370 together with a second part 425. Finally, the part 424 or joined parts that form a single part 434 are removed from the liquid 370.

In operation, this is the liquid metal infiltration step described in reference to FIG. 42. Silicon is the preferred metal for this step and it converts the matrix material from carbon into silicon carbide, forming a dense ceramic matrix. It is worth noting that the three-dimensional printing processes disclosed throughout, by leaving voids between the printed filaments, can result in micro-channels that fill with silicon. These channels of silicon could be highly beneficial—during operation of the part at elevated temperatures that exceed the melting temperature of silicon, the silicon channels would be able to flow, and this flowability would be present throughout the part. The reflow of the silicon could allow cracks to be filled as well as reactive bonding depending on the surfaces encountered by the silicon. This effectively allows the part to self-heal when heated to these temperature, which is highly beneficial for the survivability and durability of the part and structure since ceramic composites absorb energy through micro-cracking that overtime worsens the parts properties.

The infiltration process to produce the silicon carbide matrix ceramic is executed by dipping the carbon carbon part into a bath of liquid silicon. Since this is a reactive process it is possible to form larger or more complex parts by melt-infiltrating parts positioned next to each other. It is also possible to join parts after this process by reactive or non-reactive melt joining. Furthermore, it is beneficial if the joining process involves other materials such as molybdenum disulphide that provide a superior barrier to high temperature oxidation when the carbon fibers are not silicon carbide fibers. Combining such a coating with the continuous carbon three-dimensional printing process is beneficial in that there are fewer fiber ends per fiber length as compared to parts formed from woven fiber mats. This reduces the area that can suffer oxidation at elevated temperatures. The three-dimensional printing process further benefits the infiltration process since the voids that run parallel along all the printer filaments allow a path for the infiltrating metal to enter into more complex or thicker structures. Silicon effectively wicks through carbon carbon composite parts, but once the silicon reacts with the pyrolized carbon matrix, it forms a dense ceramic impeding the further flow of silicon, and the micro-channels can effectively overcome this impediment.

Novel Airframe Structural Paradigm for Lightweighting Enabled by 5-Axis Continuous Carbon Fiber 3D Printing
1. Materials Class/System
1.1 Materials Class Identification The material class being addressed is polymer matrix composites, more specifically continuous carbon fiber reinforced high temperature thermoplastic composites. In considering methods to improve system performance, there are two main approaches:

1. The materials science approach seeks to improve fundamental properties, but from a structural materials perspective, there are slow and diminishing returns as is seen by the fact that the strength of carbon fibers has only doubled in the past half century and supposedly stronger nanomaterials have never seen this "strength" translated into useful structural parts in a way that supplants the performance of carbon fibers.

2. The manufacturing approach more reliably improves baseline properties by modifying existing manufacturing processes since this assures that the material level changes will be relevant and feasible. This results in materials level process refinement, but will lead to evolutionary rather than revolutionary improvements.

There already exist a large number of initiatives in these areas, but incremental improvements alone will not provide definitive superiority. However, the development of revolutionary structural materials with properties that can be translated into a system for substantial improvements is possible with the development of novel manufacturing processes using traditionally underutilized materials. Carbon fiber is such a material and the full properties of carbon fiber have never been realized due to the limitations of the composite laminate design paradigm.

Carbon fiber has weight specific properties many times higher than that of metals, even when fibers are laminated in multiple directions for uniform strength (quasi-isotropic), but the parts and structures are not several times lighter and knockdown factors due to higher variability in properties is responsible for only a small fraction of this discrepancy. The two massive knockdowns arise from two fundamental problems when designing composite laminate structures:

1. Matrix cracking at failure strains 3-4 times lower than fiber failure strain.
2. Thin laminates are prone to buckling and sandwich panels have many design limitations that make them a suboptimal solution to this problem.

1.2 Mantis Composites Approach

Figure 46:
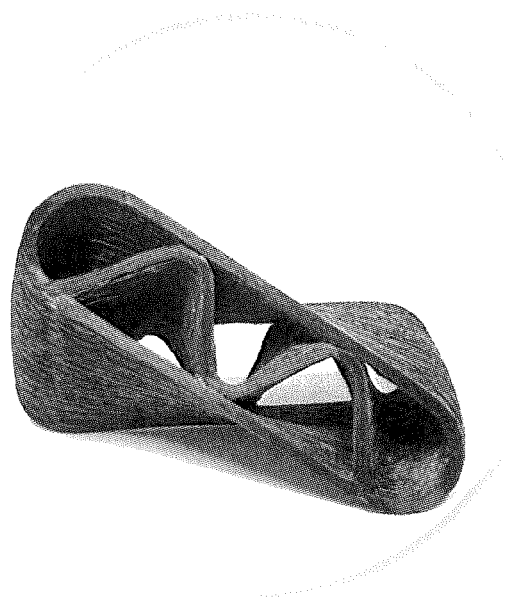
FIG. 46 is a photograph of an exemplary carbon fiber composite part in accordance with one embodiment of the present invention.
Figure 47:
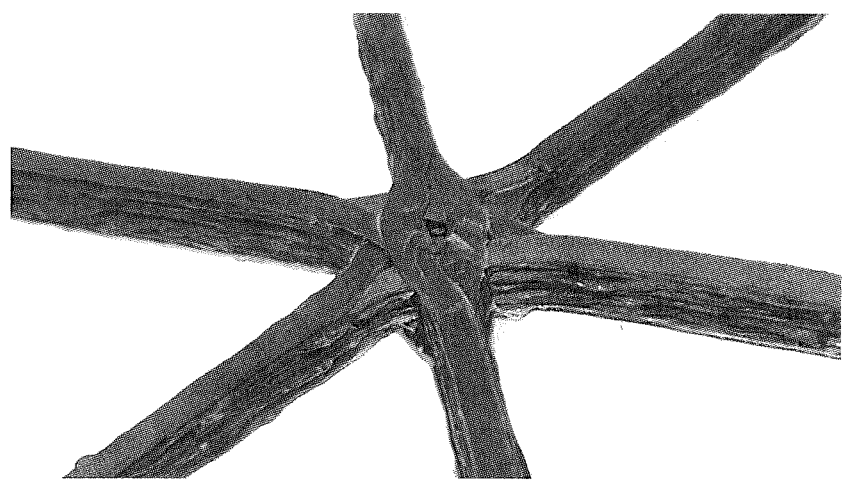
FIG. 47 is a photograph of a node of an exemplary carbon fiber composite part in accordance with one embodiment of the present invention.

Mantis Composites, has proven the viability of a new manufacturing process that can overcome these limitations to realize the full potential of carbon fiber composites [FIG. 46]. The production platform to enable this is at its core a 5-axis/6-axis continuous carbon fiber 3D printer. The ability to produce parts with arbitrary fiber paths enables a shift from designing with laminates to designing with grids or lattices, which solves the matrix cracking problem and it helps avoid buckling-driven design limitations. Isogrids and anisogrids were studied extensively for large simple structures, but limitations in the nodes, where the fibers intersect, prevented these structures from being developed beyond a handful of programs in space launch vehicles [FIG. 47]. Mantis Composites' printing process effectively solves this problem by preventing a build up in node height and applying higher amounts of pressure than is possible in automated tape laying due to the small filament width. An example part that cannot feasibly be made by any other method is shown in FIG. 46. An image of an isogrid node utilizing continuous fibers is shown in FIG. 47.

Figure 48:
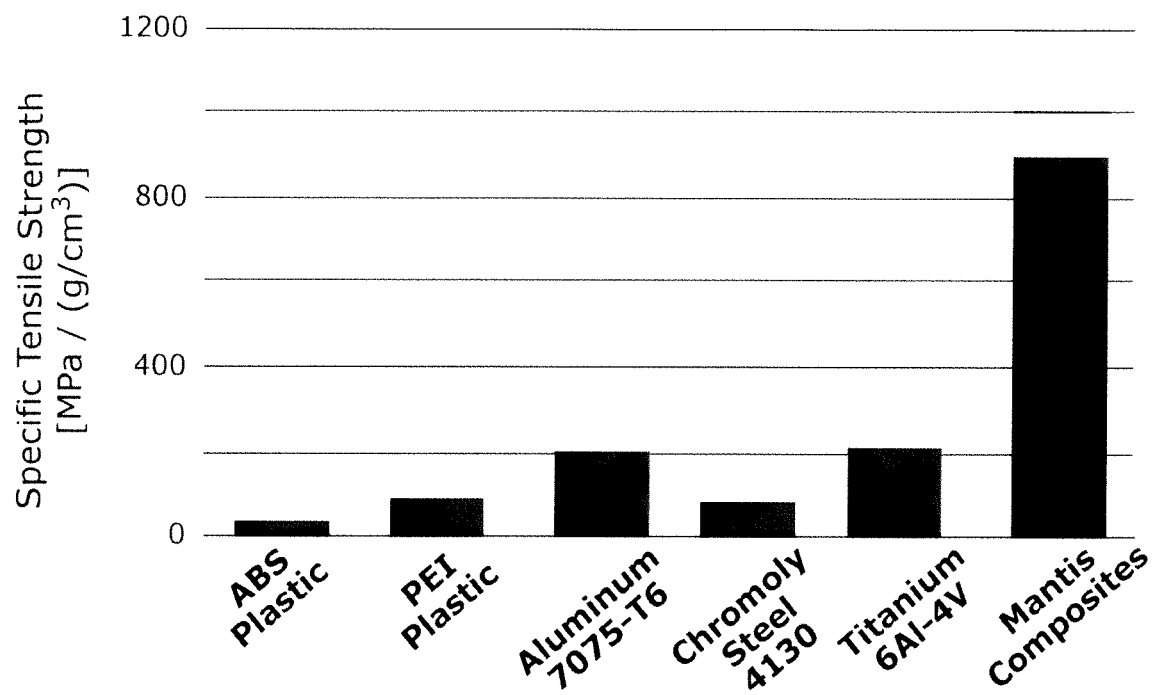
FIG. 48 is a chart showing specific tensile strengths for various materials.

The unidirectional performance achieved in this process is excellent from a rule of mixtures perspective, with a tensile strength of 1330 MPa, and tensile modulus of 74 GPa, using a 4900 MPa strength, 240 GPa modulus fiber at 30% fiber volume [FIG. 48]. The bonding between layers was validated with a short beam strength exceeding 130 MPa. Fiber volumes at 50% have been determined to print even more effectively, however, initial testing at this fiber volume was carried out with very high modulus fibers that had such poor interfacial adhesion that no useful test data could be obtained, other than an even higher "yield point" during short beam strength testing. We have a 51% fiber volume IM7 PEEK filament that will be tested in the next few weeks, which should definitively confirm higher materials level performance, with a tensile strength that should exceed 2200 MPa, and a tensile modulus that should exceed 125 GPa. A chart showing specific tensile strengths is shown in FIG. 48.

1.3 Lattice and Grid Performance

Regardless of the exact materials level performance, the advantages are at the structural level. For instance, a research study demonstrated that for the fuselage of a commercial aircraft, the benefits of a composite laminate skin resulted in only a 1.2× weight reduction, which was inferior to third generation lithium aluminum alloys. In comparison, they showed that an anisogrid stiffening structure with a thinner skin, would enable a further 3× weight reduction over the lithium aluminum skinned fuselage. The second comparative study that demonstrates the structural efficiency improvements in non-laminate structures is that of Maypole braiding, which is effectively a method for producing unidirectional composite lattices, but only in the shape of a tube. Braided tubes of the same linear density were compared to a traditional "roll-wrapped" carbon fiber tube. It was found that when the braided tube was optimized for axial, torsion, or bending stiffness, max load increased by a factor of 4.7, 4.6, and 39.5, respectively.

Considering a rectangular cross-section of varying depth, flexural strength increases with the square, flexural stiffness with the cube, and buckling resistance with the 4th power. Additionally, the matrix cracking in transverse plies brings down design loads by a factor of 4 in tension and 3 in compression, and this can be determined simply by looking at the failure strains in tension of compression for unidirectional and transverse composites. These are the fundamental factors that enable the weight reduction. In the same way that varying the geometry in metal structures is used to optimize structures, further optimizations will be possible since our process is not limited to tubes and gently curving panels.

Figure 49:
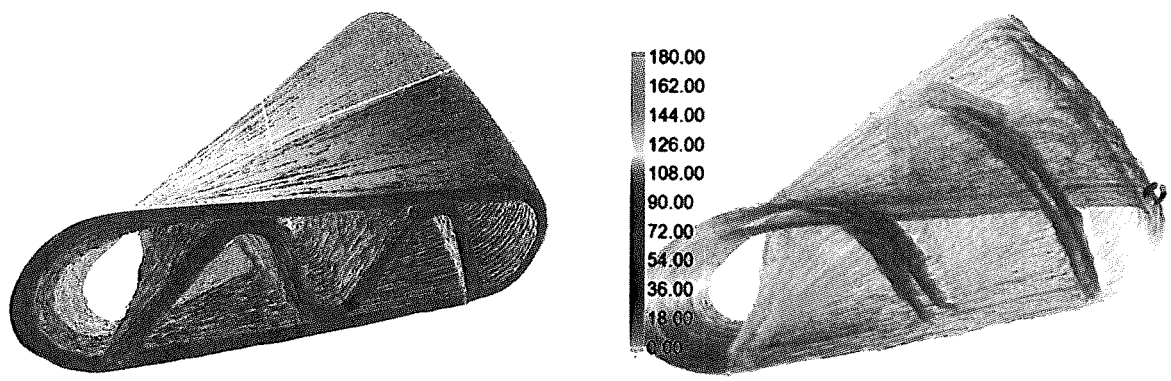
FIG. 49 is an image showing an exemplary carbon fiber composite part and CT scan data for the part.

There are, broadly speaking, three other categories of knockdown factors for FAA or CMH-17 compliance for composites: strength variation, hygrothermal effects, and damage tolerance. Qualifying the scatter in properties will be integrated into the extensively monitored and controlled printing process and could even be correlated to CT-scans on printed components, which should enable lower variation than in traditional batches. FIG. 49 shows CT scan data showing topography and fiber direction within the part. Effects of moisture and temperature are catastrophic for sandwich panels as well as laminates, and can cause crack propagation throughout the entire structure, whereas lattices and grids hold up far better, in part because cracks are localized to individual ribs since they are arrested at fiber intersections. Finally, the high temperature thermoplastic matrix improves damage tolerance. Thin-ply laminates are used to improve homogenization, which improves toughness, but with a grid structure, it is as if each 'ply' were infinitely thin, further improving damage tolerance. Therefore, it will be possible to implement qualified structures that result in weight reductions several times over existing systems for primary structures, and small machined metal components. This technology then represents a much bigger leap in materials and structures than any previous use of composites in aerospace.

Carbon fiber is often touted as a lightweight material that can be used to improve fuel economy in aviation, but with the development of Alcoa's 3rd generation lithium aluminum alloys this is no longer the case, indicating the advantage provided by composites for aircraft is less than the difference between two alloys. The reason for this is that even a composite-intensive airframe design is only using carbon fiber structure in the skins, that have to be supported by heavy metal stiffening structures to prevent buckling. On top of that, composite laminates are a poor structural concept since matrix cracking in transverse layers of the composite mean the structure is designed off of an allowable load that provides only a fraction of the strength of carbon fiber. These structures only exist because they are relatively easy to manufacture and the performance of carbon fiber is so high, it still provides an advantage, but sometimes barely.

Mantis Composites has developed a new method to manufacture carbon fiber that will finally be able to take full advantage of the high specific strength and stiffness of carbon fibers with optimized geometrical structures instead of laminates. The core of this process is a 5-axis continuous carbon fiber reinforced PEEK 3D printer, which yields the highest specific strength of any 3D printing process, and coupled to the geometrical advantages, when designing complex parts for maximal stiffness with constant weight, it will be able to produce the strongest parts in existence in absolute terms.

This lends itself well to aircraft structures since it (uniquely, at this time) could enable carbon fiber composite grid/lattice stiffening structures at a fraction of the weight of metal stiffeners, along with thinner skins, which would lead to a cascading effect of weight reduction vastly exceeding the impact on fuel economy of material choice in skins while maintaining almost entirely the same structural design. The implementation of these structures would require a larger part count and bonded components.

One alternative would be to pursue a single layer grid structure, but while this might be effective in reducing costs and simplifying assembly compared to dual layer, it reduces the performance advantage since properties scale non-linearly with thickness. A single layer could be made thicker, but then the individual nodes would buckle, whereas a double layer can have wider nodes, with a profile that is closer to an optimal square rib. From a project perspective, a full aircraft demonstration would be cost prohibitive.

The novel concept of double layer grids as opposed to single layer are proposed since airplanes are limited by buckling and buckling resistance grows with the cube of thickness. With a double layer grid, it becomes possible to increase thickness significantly.

The double layer grid is a novel structure enabled by this printing process. First, the center of the nodes can be enlarged while having curved paths around the center, which ensure fast printing and result in an empty circle in the node center. It is then possible to take two grids, separate them as if they were facesheets, align the node centers, and then connect them with a tube whose outer diameter is close to the inner diameter of the node centers, and of the length that is necessary to achieve the desired thickness of the sandwich structures. If the tube is slender, the core can shear, but if the diameter is sufficiently large, it will provide resistance to shear in addition to resisting compression. This core structure is stronger than a typical honeycomb in addition to the superior 'face sheets' that are in fact grids. For an aerostructure a thin laminate sheet can be used on one side for airflow purposes rather than for taking a large percentage of the structural load. This greatly increases thickness without substantially increasing weight, which improves flexural strength and rigidity, as well as greatly increasing global buckling resistance, which enables lighter aircraft structures.

The bonding of the tubes to the nodes can be automated. It could be thermal, ultrasonic, or adhesive bonding. In both single layer and double layer grids, the nodes can also be printed separately from the ribs. A joint interface can be designed and a robotic assembly process can be implemented. The ribs do not need to be rectangular, they could also have other shapes such as a C profile. It would be beneficial to pultrude these ribs and then the cost of the structure could be reduced dramatically. Curved pultrusion along with 5-axis printed nodes with curvature would enable smoothly curving grids, for connecting to a skin in an aerostructure. In non-smoothly curved sections, the skin could also connect at points or small regions.

1.4 Anticipated Defense Applications and Timeline

This technology is advantageous to any military platform where there is a significant need for any of the following items:

Weight reduction in aerial vehicles for increased payload capacity and increased endurance for subsonic vehicles (drag dominates when supersonic).

Improved stiffness and strength enabling higher maneuverability aircraft, and grid structures helping with faster supersonic vehicles since the skin can be actively cooled with airflow, unlike in a sandwich panel structure.

All the usual benefits attributed to 3D printing e.g. better buy-to-fly ratio, improvements from more design iterations, lower prototyping costs, production capability can scale smoothly, etc.

1.5 Advances to Defense Capabilities

With the increase in focus on electronic warfare and directed energy systems, the ability to have more of these systems in place in an aerial vehicle will help provide air superiority. For rotorcraft, the inability to achieve mission-specific payloads has become a significant problem. This has largely occurred due to the desire to take a single platform and extend its capabilities beyond the payload it was designed for. Platforms that have far lower structural weight will go a long way to fixing these issues since the trend toward multi-mission capability with modifiable systems is unlikely to reverse.

Massive increases in stiffness would allow far greater maneuverability, which would be relevant in the situation that low observability in enemy forces achieves parity with US stealth capabilities. The assessment as to Whether "dogfights" are predicted to become relevant again would probably require access to classified information. Additionally, in the situation where next generation fighters are unmanned or optionally manned, materials and structures that enable more aggressive maneuvers than a pilot can withstand might be relevant to survivability. Finally, it is possible that novel aerodynamic configurations will be made feasible with this material and manufacturing method.

The most dramatic benefit is arguably for UAVs. Considering the new US doctrine, persistent ISR is the key element to this. High altitude long endurance (HALE) or high altitude pseudo-satellites (HAPS) will need increase payload capacity, but the first challenge is developing systems that can effectively loiter continuously with solar power. These systems are therefore binary in whether it is possible to achieve for a given payload, and having the lightest structural systems will advance US capabilities beyond variations in battery technology. Rotorcraft would also benefit from increase range, as would next generation fighters that are supersonic, but fly long distances at subsonic velocities.

The defense capabilities of lightweighting are not trivial, but regardless of how much weight is saved, increased payload could just as easily be achieved by doubling the number of vehicles. That is where the economic factors of defense come into play. From a commercial market perspective, our technology is extremely valuable on fuel costs alone, such as in commercial aviation or satellite launches. Considering that at $1.5T, the F35 will be the most expensive military project in history, having the same payload in one plane that used to be carried in two might not cut that number in half, but it will reduce costs significantly. Therefore, the ability to reduce a dramatic amount of weight may seem relatively simple compared to more complex advancements, but is clearly the most cost effective way to implement the third offset strategy and maintain military superiority.

Another embodiment involvers converting the parts into ceramic matrix composites. The ability to produce carbide-based ceramic matrix composites that support an even higher temperature carbon/carbon skin with an environmental barrier coating could result in improved structural performance.

Small-scale high power and energy density rotary engines and high performance small scale turbine for UAVs would benefit greatly from higher temperatures and lighter weight enabled by these components. There is currently no feasible way to make those structures with continuous fiber ceramic composites. Ceramic composites would reduce weight and enable much higher operational temperatures, which would greatly increase engine efficiency.

2. Printing System, Materials, and Meta-Material Structures

Figure 50:
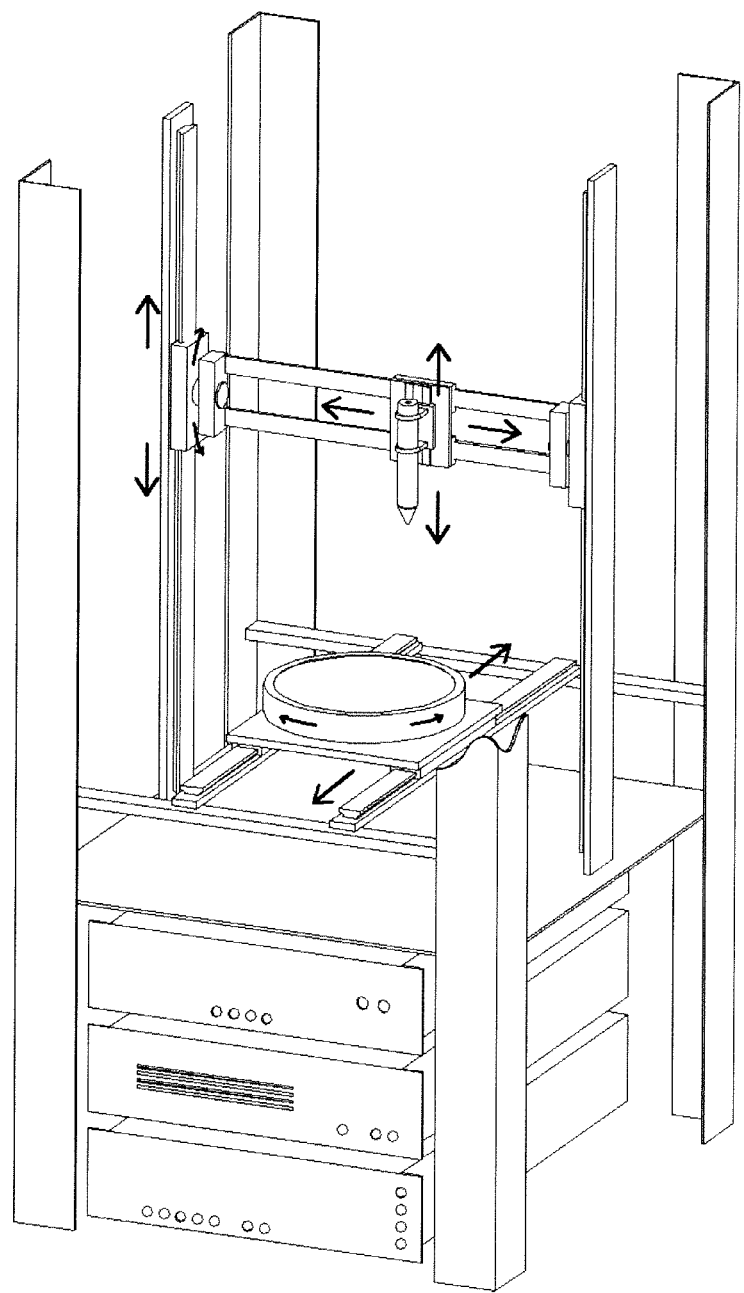
FIG. 50 is a perspective view of a multi-axis 3D printing system in accordance with another embodiment of the present invention.

Shown in FIG. 50 is another embodiment of the principles of axis separation for a multi-axis 3D printing machine previously disclosed. It can be thought of as an inversion of the nozzle with the rest of the printer-whereas in a previous embodiment shown, the nozzle and the translation axis can be thought of as remaining still with the rest of the machine sliding back and forth (relative motion), in this embodiment the nozzle slides back and forth instead, not just relatively, but in the way a reasonable person would perceive it with respect to reference points often considered stationary such as the ground. This embodiment is advantages in that it roughly halves the necessary length of the translational axis closest to the nozzle, and it allows it to be supported at both ends, rather than the middle so it is no longer cantilevered. This further improves the stiffness, which is one of the benefits of axis separation. Additionally, it is seen in this embodiment that the rails onto which the nozzle connects are themselves on a rotational axis, rather than having the nozzle rotate by itself. This embodiment of axes that does not require a robotic arm enables a build plate diameter that is nearly the width of the container in which it is enclosed, whereas robotic arms typically have keep out areas many times larger than their workspace/build envelope. Building the printer into a server rack is a novel implementation, which also aids in the integration of the electronic equipment that is needed for the increased complexity of a multiaxis composite printing process. This is also a beneficial configuration for setting up many printing units to run in parallel as part of an automated production facility.

Another aspect of this configuration of axes in a server rack is that it is beneficial for machining parts. Most 5-axis mills are also far larger in obtaining this build volume. The short length of the axes enables the necessary stiffness for machining, especially for post-machining surfaces of composite components. Since the build plate can be swapped out, this also enables an automated movement of a printed part to a machining unit, which will then have the part exactly located in space to begin machining, which would otherwise be a challenging problem. The build plate surfaces previously disclosed enable such high adhesion, that it is possible to machine parts without additional fixturing or clamping to prevent them from moving.

Figure 51:
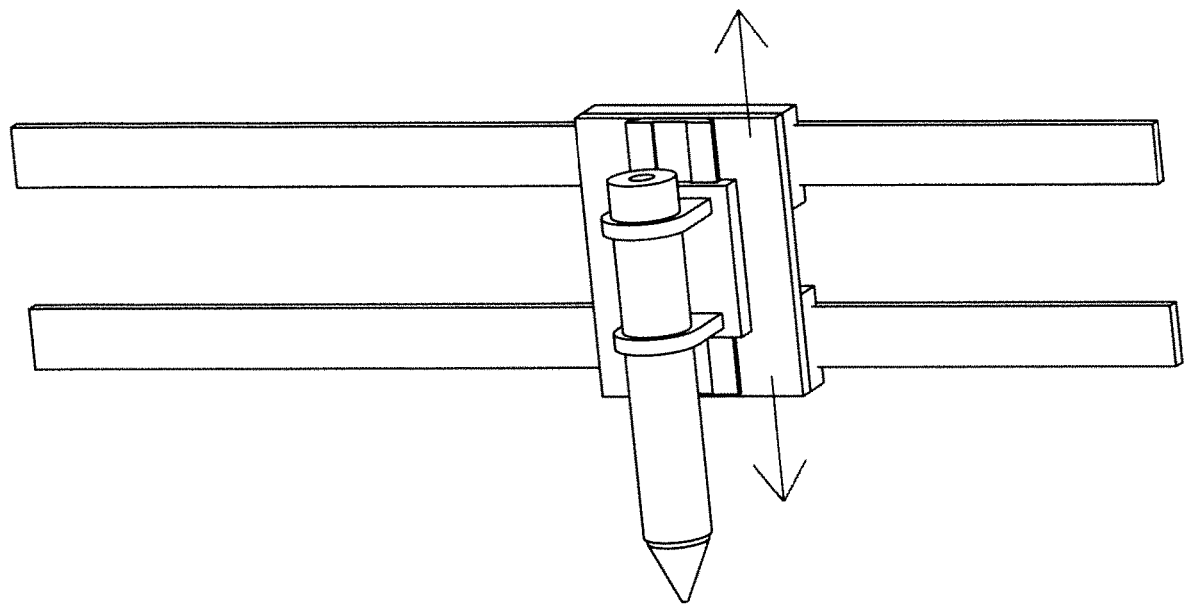
FIG. 51 is a perspective view of an actuated nozzle of the printing system of FIG. 50.

The 5-axis embodiment is sufficient to reach any point in space at any angle, and there are additional benefits of adding a 6th axis in the form of an actuated nozzle that can move along its center axis as shown in FIG. 51. Whereas most axis control and monitoring systems are based on position, this axis can have pressure/force sensing and control as well. This allows precise control of the pressure the nozzle applies during the print process, which is a critical aspect of obtaining optimal properties when printing fiber reinforced polymers. It enables effective consolidation of layers and promotes good bonding. It can also serve as one of the many continuously monitored data points that enable automated quality assurance of a part that is printed since the process parameters (along with composites) determined material properties and thus final part performance. The precise pressure control is also beneficial in allowing much faster print speeds. Another benefit is that in 5-axis printing, not all printing is the same—different pressures can be utilized whether it is the first layer being printed the nth layer, printing on the side of a part, or printing in a way that resembles winding. Finally, the nozzle actuation enables a cutting mechanism to be implemented at the nozzle tip, rather than above or near the top of the nozzle. Cutting at the top means filament is still left in the nozzle, but being able to cut at the bottom is beneficial when starting and stopping. The nozzle simple retracts upward and cutting tools come down onto the filament.

Figure 52:
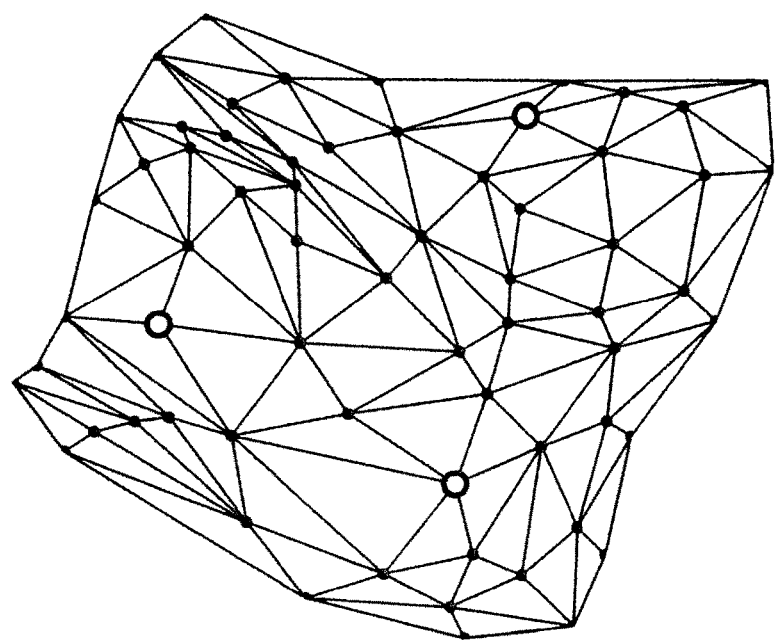
FIG. 52 is a perspective view of a grid/lattice with varied cell geometry and surface topology in accordance with one embodiment of the present invention.

Shown in FIG. 52 is a grid/lattice with varied cell geometry and a varied surface topology. Most of the nodes are compact, but three nodes have holes. This is an example of how mounting points can be incorporated into a grid. Whereas laminates have mechanical properties deteriorate from holes, grids are far more resilient.

Figure 53:
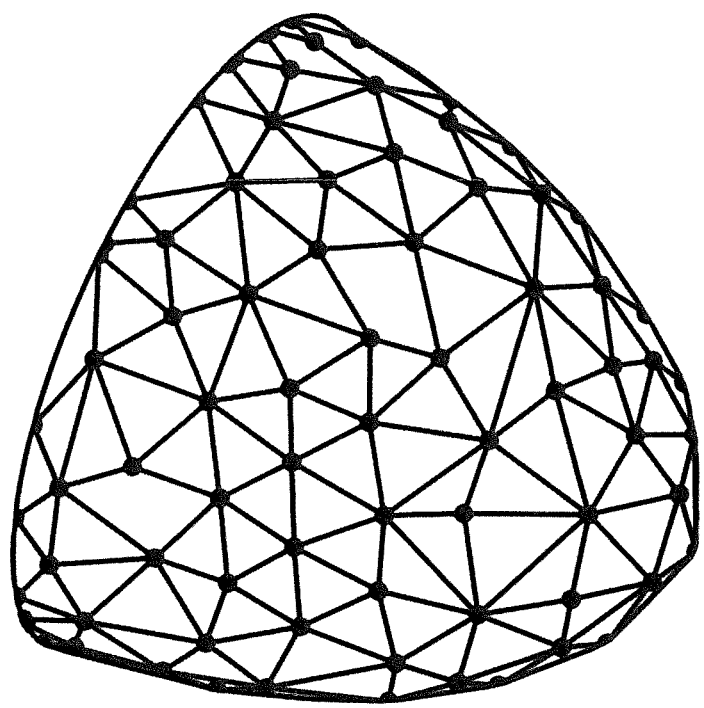
FIG. 53 is a perspective view of a grid/lattice with a curved cone shape in accordance with one embodiment of the present invention.

Shown in FIG. 53 is a grid/lattice of a curved cone shape. This structure could be formed by printing on support material. A more complex geometry could be enabled whereby it is necessary to wrap around the support material and this wrapping encloses the support in such a way that it cannot be mechanical separated from the part, in which case dissolvable support materials would be beneficial.

Figure 54:
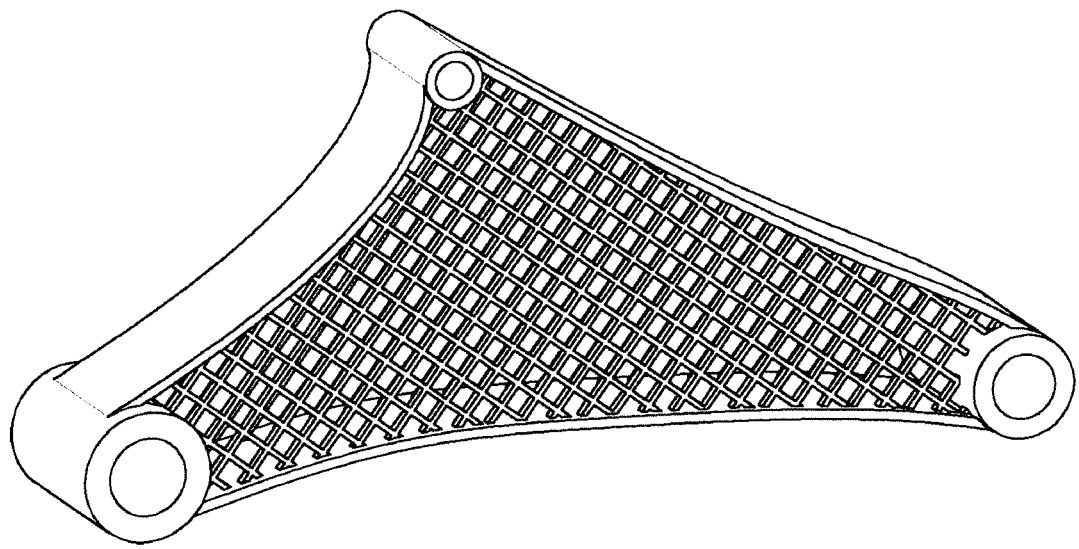
FIG. 54 is a perspective view of an exemplary part where the primary structural configuration connecting the attachment points is a grid geometry in accordance with one embodiment of the present invention.

Shown in FIG. 54 is a part with three holes for mounting where the primary structural configuration connecting the attachment points is a grid geometry. 3D printing of a grid can be considered a sort of metamaterial. This is a novel perspective that will have substantial benefits from a design perspective given the challenges of designing or optimizing components where there are a large number of possible filament paths that can fill a given geometry. Operating with a grid allows much simpler and tractable design approaches. Instead of determining the filament path for a part, the filament path can be determined for various grids or other topologies that form a meta-material. Then the grid can be manipulated as if it were a simple sheet of material, that can be curved in space, and have variable thickness. Then the topology optimization becomes closer to that seen in isotropic materials. This may work particularly well for an isogrid, where the properties are in fact uniform, but planar anisotropic grids are still a simpler problem than the general design problem. Any grid can be used such as square, orthogrid, or various others. With all the grids, there will be significant advantages in the 3D printing process compared to traditional isogrids, besides the fact that previous isogrids have been limited to very simple geometries. Typical isogrids are made in a winding process where the node is compacted through tension, which limits the normal force. A controlled pressure system will allow nodes of far greater structural integrity, which will enable improvements on the order of 2 to 4 times higher failure load both through stronger nodes and through not needing to reduce the fiber volume in order to effectively consolidate nodes as is done with traditional isogrids or anisogrids. The 5-axis capability allows the grid to be curved or even enclosed for complex parts as was previously described with reference to printing along contours.

Considering these grids as a metamaterial is sufficient when it is replacing a large structure such as a panel, but when it is being used on a smaller part or component, more consideration is needed for how that part connects to the rest of the system it is being used in. Therefore, a building block approach as was previously described can be taken. The blocks would include fastener locations or other types of attachment points/areas/regions, the blocks that connect those to the grid metamaterial, and the grid itself. These three categorical elements are all that is then needed to design a large variety of optimized parts that will result in massive weight reductions. This is also an enabling step for automating the design process from a filament pathing perspective, which would otherwise be an intensive semi-manual process. The only custom pathing that is needed is developed an optimized a single time, and it can then be used in any part. The part shown is a simple example of how bolt hole locations connect to a grid in order to form a usable part.

3. Machine Learning Software Optimization

Figure 55:
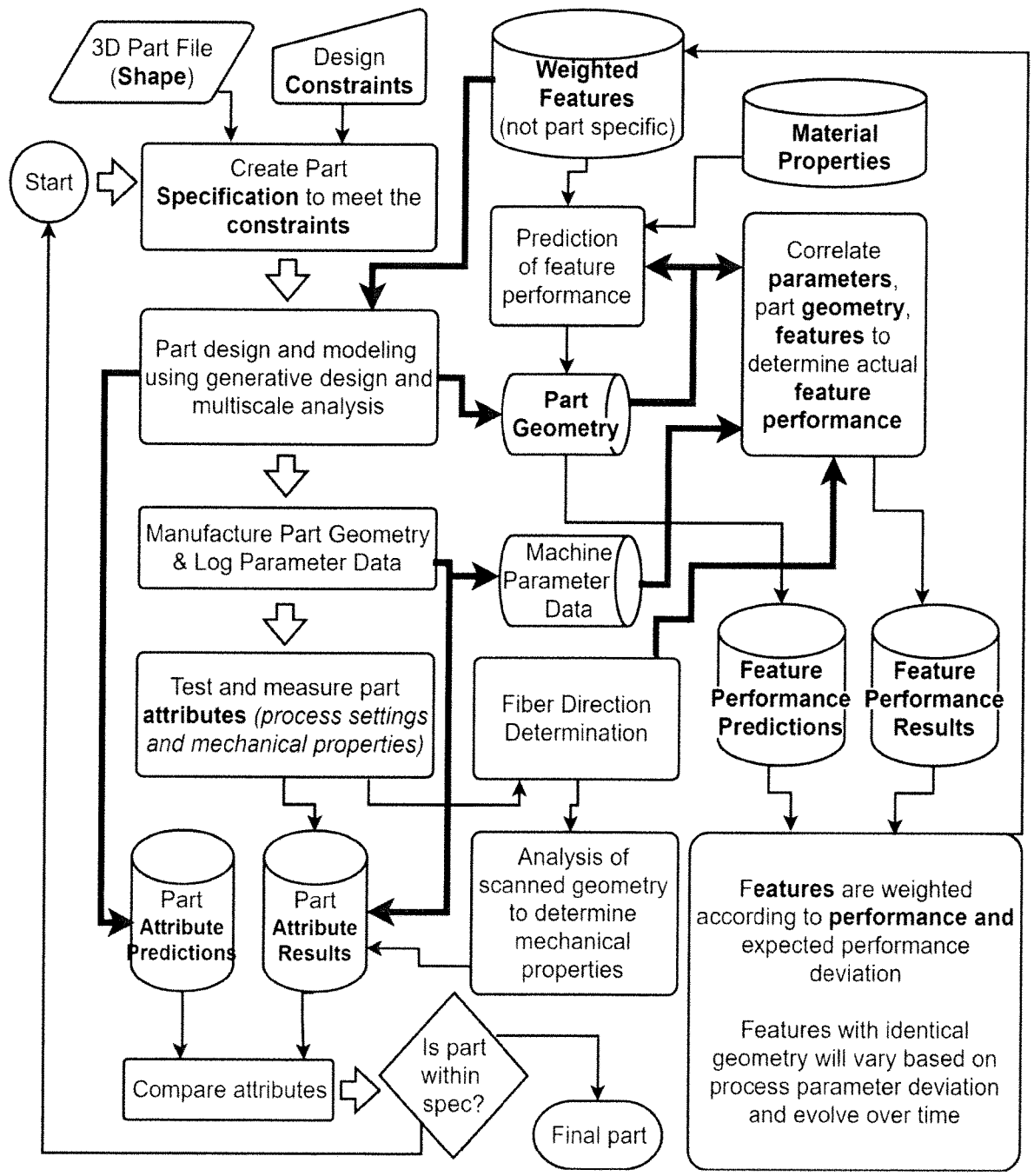
FIG. 55 is a flow diagram for a method for determining how to optimally print the parts in accordance with one embodiment of the present invention.

FIG. 55 is a flowchart for determining how to optimally print the parts. The process takes as input a 3D CAD file and a specification of the loading points on the geometry specified therein.

4. Gear Example

Carbon fiber gears offer the potential to reduce weight and increase efficiency in applications such as automotive transmissions, turbines, and various other aviation gears. Even electric vehicles typically have a single-speed gear system, so weight reduction that can increase vehicle range will also speed up the adoption of electric vehicles.

This will address lightweighting for automotive and aviation applications, with a primary initial focus in the mechanical-mechanical mission area topic of transmission. If successful, this project will enable a massive weight reduction in automotive transmissions. Automotive and aviation gears are commonly steel alloys with densities around 7.8 g/cm3. This is undesirable since weight, especially rotational weight, decreases efficiency. Moreover, metal gears experience greater wear than is theoretically achievable with composites. Finally, designs such as the double herringbone gears are too expensive to machine for automotive applications, which results in secondary thrust loads when single herringbone gear profiles are used instead.

The new idea is that with carbon fiber 3D printing, it would be possible to produce composite gears. These gears would be much lighter than steel, and could even be internally hollow for additional weight reduction. The low density would allow for designs with wider gears that decrease contact pressure, thereby decreasing reducing losses through the transmission. Additionally, PEEK (polyetheretherketone) carbon fiber composites have vastly superior abrasion and wear properties compared to steel.

Gears have previously been fabricated out of PEEK with chopped fiber composite, but the stiffness and strength is far lower than with continuous fibers. Thick laminates of PEEK carbon fiber could be machined to a gear profile, but this would not work since the properties are dependent on fiber orientation. With 3D printing, it is finally possible to produce a composite gear with radially symmetrical fibers, including fibers paths that follow the contour of each tooth. Until now, the technology to fabricate this sort of structure has not existed, so this has never been attempted.

In order to print this part, a capable printer is required. Mantis Composites has developed an optimized 3D printing system that is capable of printing a composite material that has both continuous carbon fibers and high temperature thermoplastics. With this machine we are able to obtain the highest specific tensile strength out of any material that has ever been 3D printed (>1300 MPa). This was achieved with a standard modulus fiber at only 30% fiber volume. We have recently demonstrated that 45% fiber volume prints just as well, so it should be possible to obtain even higher tensile strengths.

The fiber orientations and external geometries need to be designed. Replacing a metal gear with a carbon fiber one of the same shape that has no hollow sections would cut weight by a factor of 6. The gear teeth will need to be post-machined for surface finish, and coatings might need to be developed for optimal efficiency.

Thermal conductivity can be addressed through the use of carbon nanofibers or carbon nanotubes in the matrix to increase thermal conductivity. The addition of nanoreinforcement would result in improvements in wear-rate and efficiency as well. Nanotubes or graphene applied on the individual carbon fiber or on the composite filament would improve mechanical properties, such as transverse tensile and interlaminar shear strength. Using pitch based carbon fibers or high modulus carbon fibers would improve thermal conductivity. The method of producing ceramic matrix composites disclosed here would certainly enable sufficient thermal conductivity and refractoriness for gears.

From an economic perspective, we will first look at motorcycles, which go through more gear changes where the gears spin up and down, and would see more of a performance improvement due to the gearbox being a larger percentage of total weight.

5. Motor Rotor Example

The proposed technology would lead to a weight reduction in electric motorcycles and hybrid vehicles. Presumably, electromagnetic generators are meant to suggest an interest in the inverse electric motor as well within the electrical-mechanical mission area. This project will substantially reduce the rotating mass in electric motors, which will result in a decrease in the energy required to accelerate, higher efficiency of the full drivetrain, and higher peak power due to lower rotor mass and decreased electromechanical losses. The higher peak power can also be traded for higher torque by increasing rotor size, which can result in large reductions in drivetrain losses (10%) This will allow designers to produce lighter motors, lighter frames, and lighter support structures, causing a cascading weight reduction making this a very high impact part to target.

Currently electric motor rotors are made from laminated plates of electrical steel. Most of the innovation surrounding motors does not target the composition of this component. Steel is undesirable because it has a density of 7.8 g/cm3. Electric motor rotors make up a substantial amount of a motor's weight. They weigh around 4 kg for a motorcycle, and an electric car motor rotor can weight around 17 kg.

Using the systems and methods disclosed herein, electric motor rotors can be fabricated out of a carbon fiber high temperature thermoplastic composite.

In order to print this part, a capable printer is required. Mantis Composites has developed an optimized 3D printing system that is capable of printing a composite material that has both continuous carbon fibers and high temperature thermoplastics. With this machine we are able to obtain the highest specific tensile strength out of any material that has ever been 3D printed (>1300 MPa). This was achieved with a standard modulus fiber at only 30% fiber volume. 45% fiber volume prints just as well In other embodiments the tensile strengths are higher.

The loads for the electric motor rotor occur entirely in a plane, so this part can be printed with a 3-axis rather than a 5-axis design, which will significantly reduce development time. However, for a part that takes simple loading, its geometry would make it impossible to make with conventional composite manufacturing techniques. Moreover, since most of the loads are radial tension, this part is easy to optimize, and will enable as much as a 96% weight reduction since electrical steel is about 4 times weaker and 6 times heavier. This estimation does not even consider that the forces are also lower due to the lower mass. It is uncommon to see such large weight reductions when switching to carbon fiber. Finally, our composite parts have a beneficial structure for reducing electromagnetic losses due to eddy currents. These electromagnetic effects in motors mean that materials like aluminum, which are good electrical conductors, but have poor magnetic permeability, cause massive losses in motor efficiency when used, making them impractical. However, with our parts, they are even less conductive than steel in the directions in which eddy currents are produced, and will therefore result in very little loss even when compared to electrical steel. This in turn enables lower cooling requirements, which have a direct impact on the constant speed efficiency of a vehicle. Due to the need to expel excess heat, radiators must be used which induce drag. Our process could help to reduce the size of radiators needed and reduce drag as a result.

6. Bionic Lattice Exoskeleton Chassis Example

Figure 56:
FIG. 56 is two images of an example of an exoskeleton part produced by the systems and methods disclosed herein in accordance with one embodiment of the present invention.

An example of an exoskeleton part produced by the systems and methods disclosed herein is shown in FIG. 56. The previously disclosed systems and methods can produce a lightweight and easily customizable lattice-based demonstration exoskeleton subframe that is provisioned to accommodate standardized actuation and armor systems.

Using this manufacturing technology, the customizable 3D printing capabilities integrate standardized hardpoints with customized surfaces for perfect fit and mobility at a low cost. Continuous carbon fiber lattices ensure the highest possible strength and rigidity while maintaining very low weight. A full subframe ready for actuator and armor integration can be produced.

The system supports automated lattice design for components, mechanical integration of wedge/bearing joint systems. Wedge/bearing joints like those used in NASA hardshell space suits with carbon fiber 3D printing are combined with intelligent design software to produce a modular3D scanning of subjects, physical and digital model construction. Preliminary digital design of subframe.

In this embodiment the system includes automatic size selection software and toolpath and hardpoint standardization for actuators and armor, and integration of all elements to produce full-body subframe ready for actuator and armor integration for selected special forces representative.

7. Continuous Fiber Reinforced Printing as a Route to Ceramic Matrix Composite Components Liquid silicon infiltration is a cost-effective method to produce ceramic matrix composites from carbon-carbon composites (C/C->C/C-SiC). Usually, a phenolic matrix is utilized, but researchers have recently discovered that high temperature thermoplastics such as PEEK and PEI can also function as matrix precursor materials for C/C composites, which can be subsequently liquid silicon infiltrated. This allows for more easily manufactured complex green bodies through a 3D printing process. However, the use of thermoplastic matrix precursors has so far only been implemented on simple flat panels, resulting in the following two technology requirements to make this production process viable:

1. Low cost methods of producing carbon fiber reinforced thermoplastic parts (green bodies) with continuous fibers and complex geometries-machined molds greatly increase cost.

2. Methods to pyrolize the green bodies without deformation. Low heating rates are required to prevent cracking or residual stresses, which means the thermoplastic passes the glass transition and begins melting before pyrolysis begins.

To address the first problem, we have developed a 5-axis carbon fiber additive manufacturing platform that runs continuous high temperature thermoplastic carbon fiber reinforced filament in any direction to deliver tailored properties. This allows the production of complex carbon fiber parts with the low upfront cost easier design iterations enabled by additive manufacturing. As illustrated by the process steps of FIG. 57, the software interface allows rapid design iteration.

Our innovations to allow pyrolization without deformation s include elements such as sacrificial thermoset coatings that set below the thermoplastic's glass transition temperature and lightweight foams that can support internal structures.

Every CMC part is limited to the geometries that can be first produced with a CFRP (or woven preform). The ability to 3D print CFRP for CMCs will overcome these barriers bringing two key advantages: a) allow for integration of multiple components within sub-assemblies; b) allow for design challenges to be met through more easily modified geometry, instead of having to modify the material system or a complex assembly.

The first item reduces challenges with joining, which accounts for a substantial portion of the engineering challenges facing high performance mechanical systems. Moving from metal to polymer composite to ceramic composite systems, joining increasingly becomes a greater limiting factor.

Beyond increasing component integration, complex geometries can address challenges such as high temperature exposure with methods such as integrated cooling channels along a contour that cannot be feasibly manufactured with any other method. Instead of having to switch to something like hafnium carbide, which might require many years of developing and qualification, our technology will enable a large number of problems to be addressed with the same or similar materials systems reducing the necessary scope of research and qualification. Additionally, the ability to produce structures with fibers in arbitrary three dimensional paths will enable interesting mechanical, vibrational, and thermal properties.

Costs are also reduced dramatically at an individual part and assembled-system design scale. Liquid silicon infiltration is known to be the most cost-effective method for producing ceramic matrix composites, and 3D printing further brings down these costs. Instead of costly hand lay-ups that often require the use of machined molds, a new CAD design can be printed the same day the design is received using low cost machines.

The combination of continuous carbon fiber 3D printing with pyrolization and liquid silicon infiltration will not only enable lower cost and more customiz-able versions of the CMC parts necessary for the creation of hypersonic UAVs, missiles, and kill vehicles, but also enable more efficient propulsion systems. Complex ceramic structures such as engine blocks, blades, or housings could be produced to decrease weight, increase efficiency, and expand operating ranges on current systems limited by propulsion system performance. While temperature resistance in C/C-SiC systems is of concern in some applications, the drastically lower costs and accessibility to a customizable low CTE material enable a wide variety of applications. The flexibility of our overall production methodology is also well-suited to rapidly integrate novel coatings and materials (e.g. Casalegno's "mo-wrap" for joining and part coating or Semchenko's et al. phenolic nano-reactor method to form SiC fibers in-situ) that will increase operating temperatures and widen potential applications.

The only thermoplastic composite parts pyrolized thus far have been simple flat laminates. A complex shape could melt and deform as it is heated, prior to pyrolization, so we plan to apply a thermoset or plaster coating that holds the shape of the part during pyrolization. In conjunction with the coating, we use low density sacrificial expanding foam scaffolding to support any internal structures to prevent collapse of internal walls of cellular structures if necessary. Depending on the coating thickness, the coating is either chipped off (if low adhesion), machined off, or retained to finalize the C/C part. The final step of silicon infiltration is similar to existing method for C/C derived from other green bodies.

We have developed an extrusion process to produce discontinuous carbon fiber reinforced high temperature thermoplastic filaments that minimizes fiber length attrition via a screw-less plunger design. The addition of a moving platform under this extruder to transform it into a 3D printer will be far simpler than other 3D printers we have built.

An effective implementation of scaffolding is achieved with a thin layer of plaster, and a subsequent encasement in phenolic foam. Another method is mixing the plaster with foam beads so that it can be easily removed from the carbon/carbon part after pyrolysis. More generally, a material is needed that will easily separate from the surface of the part, and if that material is thin, additional material such as phenolic foam may be used for additional support to prevent deformation. It can be advantageous to match shrinking properties on the support material since pyrolysis causes approximately a 10% contraction of the composite part in the through thickness direction. Additionally, it can be advantageous that the support materials are porous to so that offgases do not become trapped and so that nitrogen may flow through when a vacuum is not being used for pyrolysis.

An outer coating or layer on the fiber is necessary to prevent liquid silicon from reacting with the fiber surface and permit some amount of slip. A number of systems exist, the simplest, as suggested by Reichert in his paper on thermoplastic derived CMCs, is heat treating the carbon fibers to reduce adhesion. If that fails, we would use a thermoset sizing with high char residue percentage such as polyarylacetylene, which would produce a protective pyrolitic carbon coating. The low-cost option we would attempt first is a preceramic polymer coatings to enable in-situ formation of SiC fiber coatings during temperature of 1000 degrees C. Multiple layers of different interfacial coatings would help enable the highest levels of slipping needed for crack deflections.

The highest level of fiber protection would be with a silicon carbide (SiC) coating, however typical SiC are very expensive and have a larger radius and higher modulus than carbon fiber, which would limit the capability of the material to be 3D printed.

Another method to obtain an interphase coating would be to simply start with a carbon fiber or silicon carbide coated in boron nitride, but this may pose challenges when forming a composite filament or when 3D printing. Therefore, another approach would be a novel dip coat method, where boron is deposited onto the fiber, but instead of forming a boron nitride coating right away, the polymer composite part is formed first, pyrolyzed, and then only in the late stages of pyrolysis that could be carried out in a nitrogen flowing furnace, when the temperature could reach 1200 C would the boron nitride be formed. This gets around any problems of processing the composite with a ceramic coating. One method of applying a boron source is simply dipping the fiber tow into boric acid once or multiple times. Urea or ammonia can also be used in the dip coating process.

Our 5-axis machine operates with high precision due to jerk control rather than acceleration control as is found in typical 3D printers.

It should be noted that every single part, structure, or design approach such as those involving grids and lattices would also be of great benefit to ceramic composite components that will be obvious to those skilled in the art. For instance, a grid design could be used in the primary structure of a hypersonic vehicle and the enhanced stiffness of this geometry would help support the massive acoustic loads. Entire jet engines or combustion engines could be made out of ceramic composite components with this manufacturing process.

Of course, other material compounds could be used in variations of this process, including other metals for metal infiltration, as well as slurry infiltration. One variation would be applying first a slurry of titanium carbide and then liquid silicon infiltrating to form a matrix that includes the ternary carbide (MAX phase) titanium silicocarbide. This has been shown to increase mechanical properties such as compression strength as well as enhancing absorption of radio and microwave frequencies for stealth applications.

8. Tailorable Contours, Fiber Orientations, and Cellular Structures in Ceramic Matrix Composites for Lightweight Ballistic Armor The mantis shrimp is a marine animal known for its dactyl club that is capable of breaking through shellfish shells with repeated blows that do not damage this club. These capabilities exist due to a combination of the helicoidal orientation of the chitin reinforcement fibrils and the multi-axial reinforcements throughout the bulbous club. Finally, with the systems and methods disclosed herein, it will be possible to combine these geometric attributes with advanced ceramic fibers and matrices.

Figure 59:
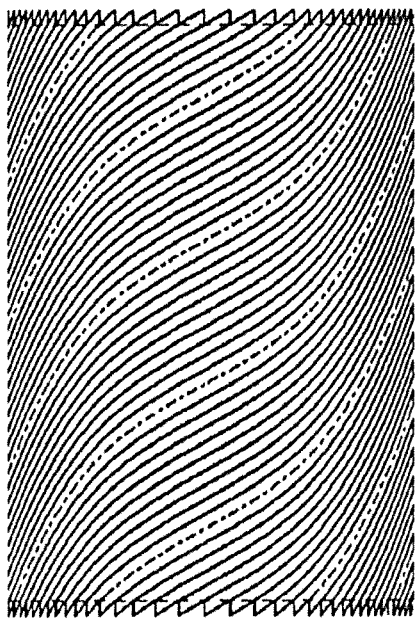
FIG. 59 is images of a variable stiffness laminate and a spirally anisotropic structure.
Figure 59:
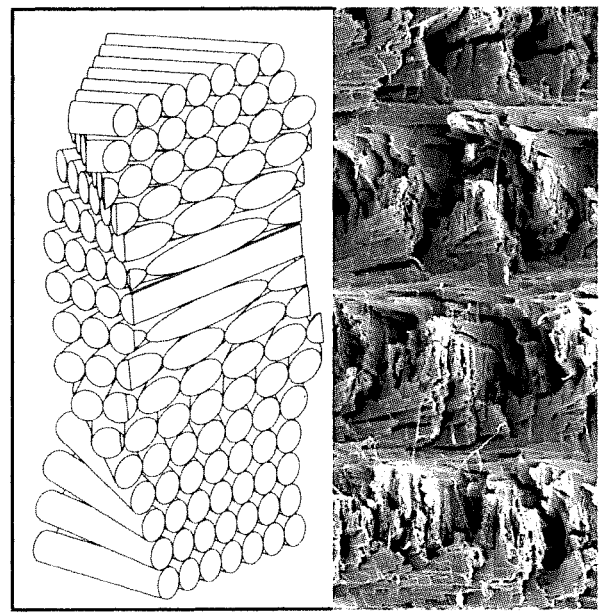

As shown in FIG. 59, variable stiffness laminates (left) can also increase toughness, and could be combined with a spirally anisotropic structure (right).

The printing machine is built for 5-axis printing, which allows us to not just orient fibers in any direction, but also from any angle. This means we can effectively print curved laminates without needing a mold for complex surfaces such as shoulder pads or helmets. Combining this with inexpensive 3D scanning would allow us to produce custom fitting armor for each soldier, which will enhance mobility and more effectively dissipate impacts.

In addition to curvilinear fiber orientations on a contoured surface, we can also fabricate lattices and honeycombs directly out of the same material as the laminate, which is impossible to do with any other composite manufacturing method. Cellular structures offer the possibility to reduce areal weight for a given thickness while integrating other material systems to increase shockwave damping. For instance, a lattice structure could be filled with phenolic foam prior to pyrolyzation, which not only prevents thermoplastic deformation, but also leaves a carbon foam. Rather than removing the carbon foam before liquid silicon infiltration, it could be left in place to form a silicon carbide foam between the primary inner and outer layers of fiber reinforced silicon carbide. Then this foam could be infiltrated with a polymer to form an interpenetrating composite core, supporting the ceramic composite lattice struts or honeycomb walls.

Liquid silicon infiltration is known to be the most cost-effective method for producing ceramic matrix composites, and 3D printing further brings down these costs. Instead of costly hand lay-ups that often require the use of machined molds, a new CAD design can be printed the same day the design is received using our low cost machines. For an armor system with comparable performance at the same weight, nothing else even comes close to being economically viable. Finally, high toughness thermoplastic composites can be offered at an even lower cost for applications where hard armor is not a requirement.

The only thermoplastic composite parts pyrolized thus far have been simple flat laminates. A complex shape could melt and deform as it is heated, prior to pyrolization, so we apply a thermoset or plaster coating that holds the shape of the part during pyrolization. In conjunction with the coating, we use low density sacrificial expanding phenolic foam scaffolding to support any internal structures to prevent collapse of internal walls of cellular structures if necessary. The final step of silicon infiltration is similar to existing method for C/C derived from other green bodies.

An outer coating or layer on the fiber is necessary to prevent liquid silicon from reacting with the fiber surface and permit some amount of slip. A number of systems exist, the simplest, as suggested by Reichert in his paper on thermoplastic derived CMCs, is heat treating the carbon fibers to reduce adhesion. If that fails, we would use a thermoset sizing with high char residue percentage such as polyarylacetylene, which would produce a protective pyrolitic carbon coating. The low-cost option we would attempt first is a preceramic polymer coatings to enable in-situ formation of SiC fiber coatings during pyrolization. Semchenko et al. developed a phenolic resion coating combined with silicon alkoxides, which effectively formed a layer of SiC nanoreactors at the relatively low temperature of 1000 degrees C. Multiple layers of different interfacial coatings would help enable the highest levels of slipping needed for crack deflections.

9. Future Interceptors: Machining and Surface Coatings

The systems and methods disclosed herein 3D print continuous carbon fiber reinforced high temperature thermoplastic composites with a 5-axis machine for unprecedented geometric complexity and performance. This allows significant weight reductions on parts that would traditionally be too intricate to make out of anything except machined metals. Utilizing this capability to produce monolithic interceptor subsections allows for significantly higher packaging densities while managing weight to maintain or improve overall performance.

The current state-of-the-art for interceptor design integrates metal and composite parts into a cohesive whole that is effective at carrying out the mission of the vehicle. That being the case, the fundamental limits of these materials is often the key factor that limits the performance and capabilities of the system.

Carbon fiber composites have fundamentally changed these performance limits. With a specific strength and stiffness far greater than metals when used correctly, carbon fiber composites have become a key part of vehicles that operate on the limits of performance, including interceptors. This being the case, carbon fiber composites have significant limitations that prevent their use throughout the entire structure of an interceptor. The manufacturing methods that can be used to create high performance composite parts severely limit the complexity of the structures that can be created. While parts that are composed of fairly simple sheet structures are possible, parts that involve complex internal or external features are often cost-prohibitive, if not impossible to produce. In addition, these manufacturing methods require complex and expensive molds, a factor that significantly limits their utility during prototyping or iterative design phases. Lastly, fiber directions and layup patterns are very difficult to control at the level of detail required to effectively interface with fastening techniques ranging from adhesives to bolts. While this is manageable for large, simple structures, the complexity of smaller, integrated interceptor systems often eliminates composites as a feasible design choice for all but large simple structures such as cowlings. Despite these shortcomings, composites are used extensively due to the weight benefits they provide.

In parts where composites are unable to reach the detail required, metals are still the go-to material. Whether you are machining, forging, casting, or 3D printing, metals are predictable materials capable of being formed into very complex shapes. In addition to complexity benefits, the isotropic nature of metals means they do not require complex layup patterns to effectively implement. Most metal manufacturing methods are fairly easy to prototype with, and the wide variety of metals available means that properties are easy to tailor toward a variety of design goals. These advantages make metals a good choice for implementation of interceptor systems, but they come with a cost: weight. Although the complex shapes and fasteners required to make compact and integrated structures in interceptors are possible with metals, the overall vehicle performance penalties of utilizing metals in this way makes a fully integrated monolithic system very difficult to achieve. As packaging density increases with shrinking interceptor size, it becomes increasingly difficult to control system density and forces sacrifices in performance and capabilities.

Figure 57:
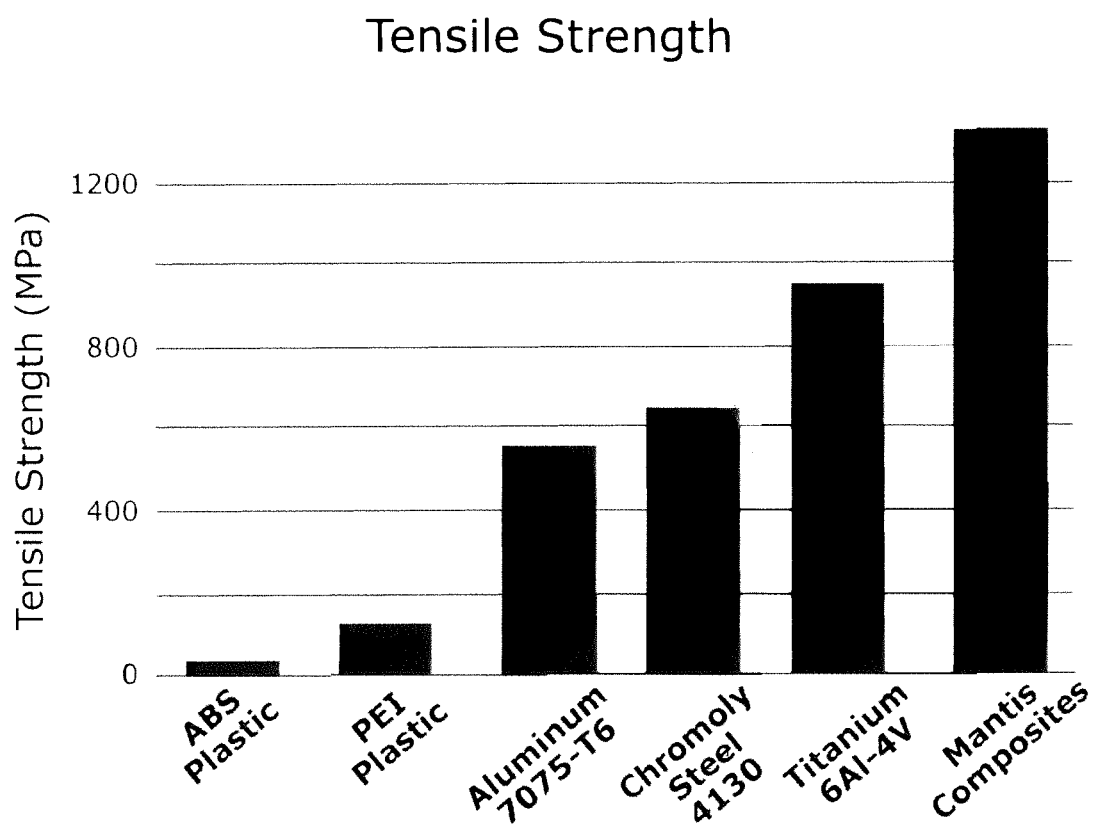
FIG. 57 is a chart showing tensile strengths for various materials.

The systems disclosed herein that bring the weight reduction capabilities of carbon fiber composites to parts that would normally be impossible to produce using anything other than a heavy metal part. We do this by 3D printing continuous carbon fiber. The technology is not just designed to make stronger prototype arts, but instead to significantly reduce weight on end-use parts in production. By using high-temperature thermoplastics (most commonly PEEK) with anywhere from 30% to 50% by volume continuous carbon fiber we are able to produce parts with equivalent or higher strength and stiffness requirements with anticipated weight savings of 15-30% compared to a metal alternative—however, the inherent advantages of geometrical freedom to increase resistance to moments would suggest a variety of parts in which the percent weight savings are far greater than that seen when a flat metal panel is replaced by a traditional composite. High temperature thermoplastics also improve solvent resistance over other metal or composite parts while increasing toughness and temperature resistance over traditional epoxy resins. This tough-ness means we can reduce many of the fastener and machining restrictions of traditional composite parts. The charts in FIG. 48 and FIG. 57 show some key properties that we leverage to improve performance in parts that are currently made using alternative materials.

In addition to geometric complexity, the components we aim to replace do not have simple loading. A traditional composite layup made using successive sheets of carbon fiber cannot effectively reinforce in the number of directions required to take the types of loading metal parts often endure. To ensure our parts are capable of accommodating these loads we print using a 5-axis machine. This allows us to not only run fiber in external sheets, but also print vertically or in any other direction required to reinforce a part to accept a complex load.

The machine uses a fully-impregnated continuous carbon fiber composite wire as a feedstock, which it re-heats and then places on the part to produce features. Parts can be produced anywhere within our 18" diameter and 20" high cylindrical build volume, which is tailored to include the majority of the metal components we currently focus on. Significant development has enabled us to produce parts with good layer adhesion and reliable corners within parts without sacrificing fiber volume percentage or part strength.

In addition to the mechanical advantages of our process, it also brings the advantages of a fully software-controlled system. We can collect massive amounts of data during the printing of each part, which comes from two primary sources. First, we have 25 key environmental and process variables that are recorded 100 times per second during the printing process. This data allows us to identify areas within a part were properties may be affected by a change in processing parameters or other perturbations. This is combined with automatic micro-CT scan processing capabilities that allow us to both inspect the part for dimensional accuracy and identify the three key failures we see: voids, delaminations, or broken fibers. Because our parts are made out of low density materials the CT scanning process is fast and relatively inexpensive while providing very accurate and predictable results. An example of CT scan data showing topography and fiber direction within part is shown in FIG. 49.

Our carbon fiber 3D printing process, combined with extensive data collection and evaluation allow us to produce high performance parts that are ready to be put in use as key elements of interceptors. Data can be stored and reviewed at any point in the future to ensure parts are in spec and compliant with any new standards that may come into effect. Because the process is completely software defined, we can also produce parts for project support far after the end of mass fabrication or for any modifications that may occur to interceptors after initial fielding to improve or maintain capabilities. Lost molds or processes and the resultant expensive replacement units are not a concern.

In addition to these advantages in production, our process also brings significant advantages in the prototyping environment where we can make parts in production runs of 1 with approximately the same difficulty as production volumes of 50 or 500. This not only allows us to reduce development timelines and costs, it also enables rapid iteration and further weight reduction as a result.

Our production system as a whole forms a drop-in replacement that improves on all aspects of the current metal machining process. We can produce parts with lower weight, higher complexity, higher traceability, and improved prototyping flexibility.

Post-machining may be required for some parts manufactured by the system. When parts come off of our carbon fiber the surface finish is fairly rough. This takes the form of striations due to successive layers as is common with many 3D printing methods. This surface can be manually post-sanded to +/−0.007" with an acceptable surface finish for most applications, but +/−0.007" may not be acceptable for the high precision environments necessary to effectively integrate into an interceptor. A post-sanding process may be used and is fairly fast (under 20 minutes for each part). In other embodiments abrasive blasting technique may be used.

Diamond saws may be used when we need close tolerances, which works well for test coupons with simple geometries. Other suitable post-machining processes may also be used.

Close tolerances alone do not allow for effective integration of parts into a complex system such as an interceptor. Surface coatings are a key enabler for our parts, or any part, to effectively interface with other surfaces or environments. For interceptors specifically, parts and systems must be capable of storage for long periods of time without corrosion or degradation. When called on to perform, they also incur significant aerodynamic load and thermal load that effective use of surface coatings can mitigate. Polymer-based and metal-based surface treatment techniques may be used. The polymer side includes galvanic isolation, electrical property modification, thermal mitigation, and fiber damage prevention. metal plating techniques include conductivity improvements, thermal radiation reflection, and shielding properties.

Although composite machining is common, machining with a thermoplastic matrix is less common. Thermoplastics are tougher than thermosets, and also have a tendency to flow or gum up in tools that are not made to machine them. Carbon fibers also complicate these requirements by necessitating a edge geometry that breaks the carbon fibers in place without pulling them out of the matrix.

Carbon fiber also has the tendency to wear tools excessively, meaning diamond coatings or brazings may be necessary to achieve close tolerances in a production environment.

Due to these requirements, there are only a handful of tooling suppliers that have off-the-shelf products capable of machining our PEEK/continuous carbon fiber parts. We have initially narrowed down the list to two tooling manufacturers (RobbJack Corporation [Lincoln, Calif.] and Kyocera Precision Tools, Inc. [Henderson, N.C.]) that have off-the-shelf products that can machine our material effectively.

The design of the 5-axis printer can also be used for a 5-axis machining unit. If there is not enough space for tool changing, multiple units can be used, each with a different tool. The networked 5-axis printer arrays in one embodiment would all have exchangeable build platforms. This would allow automated swapping of build plates from printer to machining unit. The build plate systems disclosed are effective in adhering the part to the build surface such that additional fixturing would not be needed. This is also beneficial in precisely maintaining the location of the part, which would otherwise cause challenges in the machining step. The automated part movement process with build plate swapping could also be used for quality control where the part is automatically passed through a CT-scanning unit, or any other additional process such as coating or prepping for pyroylysis in the case of ceramic matrix composite parts.

A wide variety of polymer-based surface finishes are available for carbon fiber parts that fulfill specific requirements that the interceptor environment presents. These include the following key areas:

Temperature resistance: Because we use PEEK thermoplastic, our maximum operating temperature is around 250 C, which is sufficient for most applications within an interceptor. That being the case, some applications would benefit from being able to handle brief spikes where this temperature might be briefly exceeded. High temperature polymer-based surface coatings can be used to insulate the top layers of composite from these spikes and enable much higher temporary operating temperatures (note, by polymer coatings we are including both high temperature polyimides and polymer suspensions of high temperature powders and pre-ceramic polymers).

Electrical insulation: Carbon fiber composites are neither a good conductor nor a good insulator since the fiber conducts and the matrix insulates. As a result our parts can be mildly conductive in areas (such as circuit boards) where conductivity could present problems. Preventing this requires a very thin layer of non-conductive material. Sections of our parts can be electrically insulating to increase the possible packing density of electrical components in and around our parts.

Corrosion prevention: Due to the intrinsic properties of carbon fiber and thermo-plastic, our parts are more resistant to corrosion than almost any other metal alloy it will replace. That being the case, the small amount of conductivity through the part could cause galvanic corrosion with metal parts if stored for a long time (as could be the case with an interceptor). The prevention method for this is to electrically insulate the parts, and this layer must be able to hold up with mechanical fastening methods such as bolts.

In addition to polymer-based coatings, metal plating methods could also bring significant improvements to our capabilities. Metal plating can be used for:

Higher operating temperatures: The thermal conductivity and IR reflectivity of metals means that they can effectively distribute heat around a part, while preventing a significant amount of radiative energy from hitting the part. This can significantly increase the operating temperature of our parts such that they could be more fully integrated into hot zones near engines in interceptors. The plating materials for this would be primarily be Nickel-based.

Conductivity: If preventing conductivity between parts (as is possible using a less expensive polymer-based method) is not feasible in a design, then a copper-based or other highly conductive coating could permit common-grounding or fulfill another con-duction need. Understanding the degree to which these coatings improve conductivity can open significant spaces where our parts would be usable within an environment that has very difficult packaging restrictions.

Shielding: Carbon fiber alone is not particularly effective at shielding sensitive electronics from RF or magnetic interference that may cause errors. Given our parts could significantly reduce the weight of electronic enclosures, the ability to shield those enclosures is significant. Shielding plating techniques would also likely revolve around copper depending on supplier capabilities.

The machining and surface finishing techniques developed in this proposal are key elements in the production system we are building. These techniques can be modified and expanded upon to serve a more general production line that can support interceptor needs while maintaining production line reliability.

10. Modular Kill Vehicles

The 3D printing of continuous carbon fiber reinforced high temperature thermoplastic composites with a 5-axis machine as disclosed herein allows for unprecedented geometric complexity and performance. This allows significant weight reductions on parts that would traditionally be too intricate to make out of anything except machined metals. Utilizing this capability to produce modular components for kill vehicles allows for significantly higher packaging densities while managing weight to maintain or improve overall performance and maintainability. Composite parts can be integrated into modular kill vehicle systems.

By providing low cost, customizable manufacturing of detailed carbon fiber parts, the design constraints on nearly any high performance part can be lifted significantly. Supplying a manufacturing technique that can produce nearly any shape with varying strength properties throughout a part structures enables innovative, higher performance, and more efficient structures than anything currently achievable.

The current state-of-the-art for kill vehicle design integrates metal and composite parts into a cohesive whole that is effective at carrying out the mission of the vehicle. That being the case, the fundamental limits of these materials is often the key factor that limits the performance and capabilities of the system.

Carbon fiber composites have fundamentally changed these performance limits. With a specific strength far surpassing metals when used correctly, carbon fiber composites have become a key part of vehicles that operate on the limits of performance, including kill vehicles. This being the case, carbon fiber composites have significant limitations that prevent their use throughout the entire structure of a kill vehicle. The manufacturing methods that can be used to create high performance composite parts severely limit the complexity of the structures that can be created. While parts that are composed of fairly simple sheet structures are possible, parts that involve complex internal or external features are very expensive, if not impossible, to produce. In addition, these manufacturing methods require the production of a mold, a factor that significantly limits their utility during prototyping or iterative design phases. Lastly, fiber directions and layup patterns are very difficult to control at the level of detail required to effectively interface with fastening techniques ranging from adhesives to bolts. While this is manageable for larger simple structures, the complexity of smaller modular systems often eliminates composites as a feasible design choice. Despite these shortcomings, composites are used extensively due to the weight benefits they provide.

In parts where composites are unable to reach the detail required, metals are still the go-to material. Whether you are machining, forging, casting, or 3D printing metals are predictable materials capable of being formed into very complex shapes. In addition to complexity benefits, the isotropic nature of metals means they do not require complex layup patterns to effectively implement. Most metal manufacturing methods are fairly easy to prototype with, and the wide variety of metals available means that properties are easy to tailor towards a variety of design goals. These advantages make metals a good choice for implementation of modular systems in kill vehicles, but they come with a cost: Weight. Although the complex shapes and fasteners required to make efficient modular structures are possible with metals, the overall vehicle performance penalties of utilizing metals in this way makes a fully modular system very difficult to achieve. In a highly modular system the weight penalties involved with implementation of the modular systems not only increases the weight of the sub-system they are part of, but also the key structural elements that must support that load and the fuel that is needed to propel it.

The 3D systems and methods disclosed herein bring the weight reduction capabilities of carbon fiber composites to parts that would normally be impossible to produce using anything other than a heavy metal part. The technology is not just designed to make stronger prototype arts, but instead to significantly reduce weight on end-use parts in production. By using high-temperature thermoplastics (most commonly PEEK) with anywhere from 30% to 50% by volume continuous carbon fiber we are able to produce parts with equivalent or higher strength and stiffness requirements while reducing weight by anywhere between 15% and 30% over a metal alternative. By using high temperature thermoplastics we are able to get greater solvent resistance than other metal or composite parts while increasing toughness and temperature resistance over traditional epoxy resins. This toughness means we can reduce many of the fastener and machining restrictions of traditional composite parts. FIGS. 48 and 57 show some key properties that we leverage to improve performance in parts that are currently made using alternative materials.

In addition to geometric complexity, the components we aim to replace do not have simple loading. A traditional composite layup-made using successive sheets of carbon fiber can not effectively reinforce in the number of directions required to take the types of loading metal parts usually endure. To ensure our parts are capable of accommodating these loads we print using a 5-axis machine. This allows us to not only run fiber in external sheets, but also print vertically or in any other direction required to reinforce a part to accept a complex load.

The machine uses a fully-impregnated carbon fiber and thermoplastic wire as a feedstock, which it re-heats and then places on the part to produce features. Parts can currently be produced anywhere within our 18" diameter and 20" high cylindrical build volume, which is tailored to include the majority of the metal components we currently focus on. Significant development has enabled us to produce parts with good layer adhesion and reliable corners within parts without sacrificing fiber volume percentage or part strength.

In addition to the mechanical advantages of our process, it also brings the advantages of a fully software-controlled system. We can collect massive amounts of data during the printing of each part, which comes from two primary sources. First, we have 25 key environmental and process variables that are recorded 100 times per second during the printing process. This data allows us to identify areas within a part were properties may be affected by a change in processing parameters or other perturbations. This is combined with automatic micro-CT scan processing capabilities to get a part that allow us to both inspect the part for dimensional accuracy and identify the three key failures we see: voids, delaminations, or broken fibers. Because our parts are made out of low density materials the CT scanning process is fast and relatively inexpensive while providing very accurate and predictable results.

The combination of our carbon fiber 3D printing process with extensive data collection and evaluation allow us to produce high performance parts that are ready to be put in use as key elements of kill vehicles. Data can be stored and reviewed at any point in the future to ensure parts are in spec and compliant with any new standards that may come into effect. Because the process is completely software defined, we can also produce parts for project support far after the end of mass fabrication or for any modifications that may occur to kill vehicles after initial fielding to improve or maintain capabilities. Lost molds or processes and the resultant expensive replacement units are not a concern.

In addition to these advantages in production, our process also brings significant advantages in the prototyping environment where we can make parts in production runs of 1 with approximately the same difficulty as production volumes of 50 or 500. This not only allows us to reduce development timelines and costs, it also enables rapid iteration and further weight reduction as a result.

The system as a whole forms a drop-in replacement that improves on all aspects of the current metal machining process. We can produce parts with lower weight, higher complexity, higher traceability, and improved prototyping flexibility.

Parts manufactured with the system disclosed herein can be used with fastening systems common in kill vehicles and other high performance aerospace structures. properties and types of fasteners can be manufactured that are key to the development of highly modular systems that must operate after long storage times in environments with high vibration and thermal fluctuation.

There are three primary fastening techniques for kill vehicles: adhesive joints, threaded fasteners, and through-hole fasteners.

Manufacturing of through-hole bolts and rivets (both common when creating modular structures within kill vehicles or otherwise) using the disclosed system includes filament paths that are optimized for distributing load from hole-centric fasteners to the rest of a part. Different filament pathing strategies (standard code "blocks") can be used for integration of fasteners.

Figure 58:
FIG. 58 is an image of a plug made of consecutive layers of spiral filament in accordance with one embodiment of the present invention.

A plug, shown in FIG. 58 is made of consecutive layers of spiral filament that are effective at transferring moment and pull-out loads from a fastener to a part. Effectively, the plug increases the surface area which the bulk of a part can interface while preventing cracking or delamination Hollow Node: A hollow node is effectively a grid-node of intersecting filament paths that has space for a fastener at the inside of the cross-over point. It more effectively distribute load within a part that has less dense walls or fill around the fastener. Grid nodes can be used as fastener locations within a grid, or the node can be used as a standalone component as an insert for a traditional laminate based sandwich panel where it can more effectively distribute load and reinforce the otherwise weakened laminate. A node utilizing continuous fibers is shown in FIG. 47.

We currently have capabilities to work with threaded fasteners using at least two methodologies:

Bonded Insert: Just as you would bond a threaded insert into a traditional composite part we can print a reinforced hole within our parts that can accept an adhered tube insert with solid threads. This can be a laborious process (especially in a production environment) but is more familiar to traditional composites manufacturing systems.

Helcoil: Because we can precisely steer fiber around an area of interest within a part, and have very tough thermoplastics, we have investigated using helicoil threaded inserts (image below). The advantage of these inserts is that they require no cure time and are easy to place with a high degree of precision. We have developed toolpaths that are reinforced specifically for this loading scenario and are designed to prevent stress cracking due to high thread load.

The ability to bond our carbon fiber parts to each other brings a number of key advantages to a modular kill vehicle environment. Post-bonding allows for very large structures to be made that would otherwise be impossible to make. Although this is possible with bolts, the weight reduction associated with an adhesive joint where it does not affect the modular capability of the system is significant.

In addition to the production of larger parts, post bonding can significantly reduce production costs. As with many types of 3D printing, our process requires support structures to be built up under key overhanging elements. Although the overhang angles and bridging capabilities of our machine exceed almost any other printing method, the production and removal of these support structures is not a trivial element of the manufacturing process. In some cases, a post bonding process between our parts will reduce cost due to a reduction in support material and associated processing systems cost.

The type of post finishing and adhesive used can be varied in a few iterative steps to establish a reliable and high performance process. Surface preparation techniques can be used to improve bonding. This includes methods that we are already using or planning to bring in-house such as sanding, wet-abrasive blasting and air-abrasive blasting.

Given our parts are made using a thermoplastic they can also be thermally welded.

Parts manufactured can also be bonded to traditional carbon fiber reinforced thermoset parts and/or metallic components.

Like traditional composites, the procedure used to reinforce areas where through-hole fasteners are used is key to ensuring good and reliable performance of the joint. Unlike traditional composites, we have a significant amount of control over the fiber direction near a through hole fasteners. This, in combination with thermoplastic matrices that are better equipped to take point loads in fastening situations, means that we should be able to control our process to the point where the knock-down factors required when using through-hole fasteners with composites are significantly reduced. To this end, we have developed standard toolpath blocks (the plug and node mentioned in the technical objectives section) that begin to allow these capabilities within our parts.

Fastening techniques developed herein can be modified and expanded upon to serve a more general production line that can support kill vehicle needs while maintaining production line reliability.

While the invention herein disclosed has been described by means of specific embodiments, examples and applications thereof, numerous modifications and variations could be made thereto by those skilled in the art without departing from the scope of the invention set forth in the claims.

What is claimed is:

1. A 3D printing apparatus for depositing a fiber-reinforced polymer filament comprising:
    a nozzle configured for the filament to pass axially through the nozzle and out an end of the nozzle, the nozzle comprising:
        a filament guide tube configured for the filament to pass axially through;
        an outer structure located at the nozzle end, wherein the outer structure defines an interior radiative chamber and wherein the filament guide tube passes through the radiative chamber; and
        a cooling chamber including a main nozzle shaft around the filament guide tube, the cooling chamber extended along an exterior of the filament guide tube distal to the end of the nozzle such that the filament guide tube extends through the cooling chamber, wherein the main nozzle shaft of the cooling chamber extends downwards into the radiative chamber such that a portion of the filament guide tube below the downward extent of the main nozzle shaft is exposed to the interior radiative chamber.

2. The 3D printing apparatus of claim 1 wherein the filament guide tube protrudes below the extent of the outer structure.

3. The 3D printing apparatus of claim 1 further comprising:
    a radiative heat source coupled to the outer structure and directing radiative heat into the radiative chamber, whereby the portion of the filament guide tube below the downward extent of the main nozzle shaft receives radiative heat from the radiative chamber.

4. The 3D printing apparatus of claim 3 wherein the filament guide tube is transparent to radiative heat from the radiative heat source.

5. The 3D printing apparatus of claim 1 further comprising:
    a radiated heat sensor facing inward in the radiative chamber.

6. The 3D printing apparatus of claim 1 wherein an inside diameter of the filament guide tube contracts at the end of the nozzle.

7. The 3D printing apparatus of claim 1 wherein the outer structure of the nozzle end has a diameter of less than 2 inches for at least 2 inches from the end of the nozzle.

8. The 3D printing apparatus of claim 1 wherein the cooling chamber comprises a cooling fluid inlet configured to allow a cooling liquid to fill the cooling chamber and a cooling fluid outlet configured to allow a cooling liquid to exit from the cooling chamber.

9. The 3D printing apparatus of claim 1 further comprising:
    an active feeding mechanism coupled to the nozzle and configured for coupling to a filament source of the filament, wherein the active feeding mechanism is configured to control feeding of the filament from the filament source to the nozzle.

10. The 3D printing apparatus of claim 9 wherein the active feeding mechanism is configured to impart pressure along the length of at least a portion of the filament.

11. The 3D printing apparatus of claim 9 further comprising:
    a constriction through which the filament passes between the filament source and the nozzle end.

12. The 3D printing apparatus of claim 9 wherein the active feeding mechanism is configured to impart pressure along the length of at least a portion of the filament, wherein an amount of spreading of the filament is controlled.

13. The 3D printing apparatus of claim 1 comprising:
    a build plate configured to receive the deposited filament, wherein the filament is impregnated with a polymer matrix, wherein the received filament and the polymer matrix comprise a part.

14. The 3D printing apparatus of claim 13 wherein the build plate is removable, whereby the build plate is configured to be moved to another location for machining of the part.

* * * * *